(12) United States Patent
Fujiwara

(10) Patent No.: US 7,042,224 B2
(45) Date of Patent: May 9, 2006

(54) METHOD OF MEASURING IN-MEDIUM DIELECTRIC CONSTANT FOR ELECTROMAGNETIC PROBER, AND ELECTROMAGNETIC PROBER

(75) Inventor: Masahiro Fujiwara, Akashi (JP)

(73) Assignee: Cos Co., Ltd., Hyogo (JP)

( * ) Notice: Subject to any disclaimer, the term of this patent is extended or adjusted under 35 U.S.C. 154(b) by 52 days.

(21) Appl. No.: 10/380,318

(22) PCT Filed: Sep. 10, 2001

(86) PCT No.: PCT/JP01/07853

§ 371 (c)(1),
(2), (4) Date: Mar. 13, 2003

(87) PCT Pub. No.: WO02/23226

PCT Pub. Date: Mar. 21, 2002

(65) Prior Publication Data

US 2003/0169053 A1   Sep. 11, 2003

(30) Foreign Application Priority Data

Sep. 18, 2000 (JP) .............................. 2000-282230
Oct. 12, 2000 (JP) .............................. 2000-312145

(51) Int. Cl.
*G01V 3/08* (2006.01)
*G01V 3/10* (2006.01)
*G01V 3/12* (2006.01)

(52) U.S. Cl. ........................................ 324/337; 342/22
(58) Field of Classification Search ................ 324/642, 324/326, 327, 328, 329, 332, 341, 337, 334; 342/22

See application file for complete search history.

(56) References Cited

U.S. PATENT DOCUMENTS

| 5,420,589 | A | * | 5/1995 | Wells et al. ................... 342/22 |
| 5,455,516 | A | * | 10/1995 | Jean et al. ................... 324/639 |
| 5,563,848 | A | * | 10/1996 | Rogers et al. ................ 367/99 |
| 5,990,760 | A | * | 11/1999 | Yoshida et al. .............. 333/161 |
| 6,377,201 | B1 | * | 4/2002 | Chu ............................ 342/22 |
| 6,496,136 | B1 | * | 12/2002 | Mucciardi .................... 342/22 |
| 2002/0010546 | A1 | * | 1/2002 | Roberts ........................ 702/2 |

OTHER PUBLICATIONS

John P. Warhus et al., Aug. 27, 1994, Advanced Ground Penetrating Radar, website publication at www-eng-x.ln-ll.gov/dsed/documents/em/gpirhardware.html, all pages.*
Fundamentals of Physics, Halliday et al., 1997, John Wiley & Sons, Inc., 5th ed., pp. 402-405.*

* cited by examiner

*Primary Examiner*—Bot Ledynh
*Assistant Examiner*—Kenneth Whittington
(74) *Attorney, Agent, or Firm*—Wood, Phillips, Katz, Clark & Mortimer

(57) ABSTRACT

An electromagnetic prober comprising a transmission antenna, a reception antenna, a reception signal processing section for generating an analytic signal on the basis of a detection signal of the reception antenna, and an analytic processing section for performing a predefined analytic process on the basis of the analytic signal, wherein the analytic processing section divides the analytic signal into a plurality of time-based ranges and performs a predefined computation on average cycle periods in the respective time-based ranges of the analytic signal to calculate average dielectric constants in depth ranges of the medium corresponding to the respective time-based ranges.

15 Claims, 31 Drawing Sheets

PHASE CORRECTION

AMPLITUDE CORRECTION

DIFFERENTIAL SIGNAL DETECTION

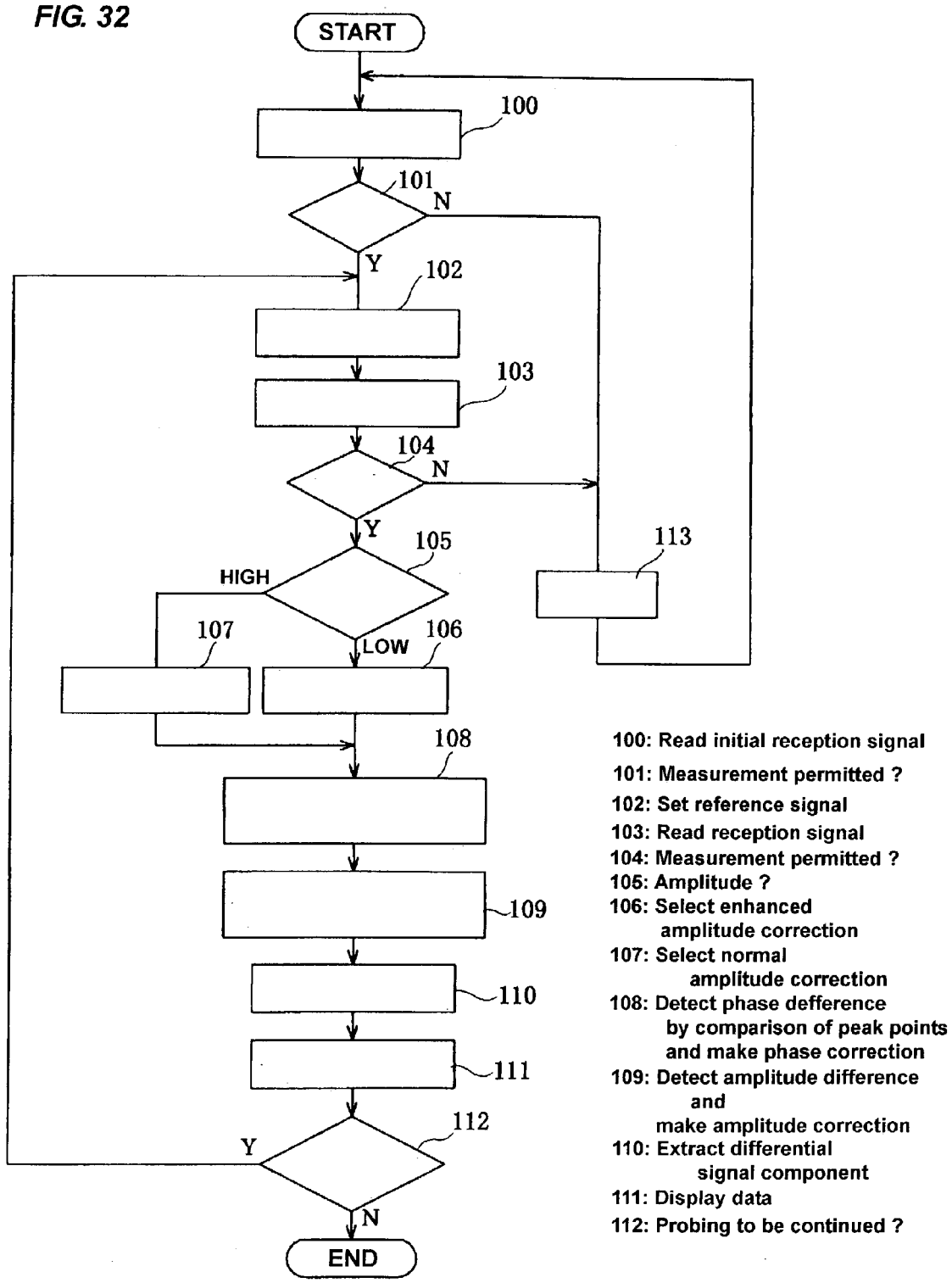

FIG. 32

100: Read initial reception signal
101: Measurement permitted ?
102: Set reference signal
103: Read reception signal
104: Measurement permitted ?
105: Amplitude ?
106: Select enhanced amplitude correction
107: Select normal amplitude correction
108: Detect phase defference by comparison of peak points and make phase correction
109: Detect amplitude difference and make amplitude correction
110: Extract differential signal component
111: Display data
112: Probing to be continued ?

METHOD OF MEASURING IN-MEDIUM DIELECTRIC CONSTANT FOR ELECTROMAGNETIC PROBER, AND ELECTROMAGNETIC PROBER

TECHNICAL FIELD

The present invention relates to a method of measuring an in-medium dielectric constant for an electromagnetic prober, and to an electromagnetic prober.

BACKGROUND ART

Electromagnetic probers which perform an exploratory survey by radiating electromagnetic radiation from an antenna, receiving an echo from an object and analyzing the echo have conventionally been developed, and employed for survey of buried objects such as buried pipes and landmines. Unfortunately, none of the conventional electromagnetic probers have the function of measuring a dielectric constant at each depth level in the ground.

However, it is necessary to measure dielectric constants in an electromagnetic wave propagation medium on a case-by-case basis for the determination of a depth at which an object such as a buried pipe or a landmine to be surveyed is present, because the propagation speed of the electromagnetic radiation differs depending on the dielectric constant in the propagation medium.

There is also known a technique for determining the depth of an object to be surveyed by employing a synthetic aperture radar method. However, the exploratory survey employing the synthetic aperture method is difficult for unskilled persons, so that everybody cannot easily carry out the survey.

It is therefore an object of the present invention to permit even an unskilled person to easily measure a dielectric constant at each depth level in a medium to determine a depth at which an object to be surveyed is present without employing the synthetic aperture method.

DISCLOSURE OF THE INVENTION

The inventor of the present invention has found that a certain correlation is established between the cycle period of a reception waveform and the specific dielectric constant in a medium by significantly narrowing the transmission band (e.g., to a bandwidth of about 20 MHz where a center frequency is 1 GHz), detecting an echo of the electromagnetic radiation in the narrow band by a reception antenna and detecting the resulting detection signal by a predetermined detection circuit. The present invention provides a novel dielectric constant measuring method based on the signal waveform obtained on the basis of such a principle.

That is, the present invention provides a method of measuring a dielectric constant in a medium for an electromagnetic prober for non-invasively probing into the medium by radiating electromagnetic radiation from a transmission antenna, receiving echoes by a reception antenna, generating an analytic signal on the basis of a detection signal and analyzing the analytic signal, the analytic signal having an alternating waveform which has an amplitude varying with time with its time axis corresponding to a depth in the medium, the method comprising: dividing the analytic signal into a plurality of time-based ranges; and performing a predefined computation on average cycle periods in the respective time-based ranges of the analytic signal for calculating average dielectric constants in depth ranges of the medium corresponding to the respective time-based ranges. According to the inventive measuring method, an approximate dielectric constant at each depth level in the medium (in the ground) at a single site can be calculated only on the basis of an echo reception signal obtained at the site, so that even an unskilled person can easily and speedily determine the in-medium dielectric constant.

The in-medium dielectric constant measuring method according to the present invention is advantageously used with an electromagnetic prober which provides a linear relationship between the average cycle periods in the respective time-based ranges of the analytic signal waveform and the square roots of the average dielectric constants in the depth ranges of the medium corresponding to the respective time-based ranges.

Further, the in-medium dielectric constant measuring method according to the present invention is advantageously used with an electromagnetic prober in which the electromagnetic radiation radiated from the transmission antenna has an occupied bandwidth narrowed by selectively removing a frequency component other than a component of a predefined target frequency, wherein the target frequency is not lower than 300 MHz and not higher than 2 GHz, and the occupied bandwidth is not smaller than 10 MHz and not greater than 100 MHz and is equivalent to not higher than 10% of the target frequency. A certain correlation is established between the cycle period of the reception waveform and the specific dielectric constant in the medium by thus significantly narrowing the transmission band (e.g., to a bandwidth of about 20 MHz where the center frequency is 1 GHz), radiating the electromagnetic radiation on a pulsed basis, detecting the echoes of the electromagnetic radiation in the narrow band by the reception antenna and detecting the resulting detection signal by the predetermined detection circuit. That is, the pulsed narrow-band electromagnetic radiation propagates in the medium at a propagation speed and an attenuation ratio according to the specific dielectric constant in the medium. Further, the echoes occur in any points in the medium, so that the reception wave is formed by combination of the multiplicity of echoes. It is herein assumed that the echoes occur in respective unit distance ranges defined along the depth in the medium. Since the echoes each propagate in the medium at a speed according to the specific dielectric constant in the medium, the echoes received by the on-ground reception antenna each have a certain phase shift according to the specific dielectric constant in the medium. The reception waveform formed by the combination of the multiplicity of echoes contains signal components corresponding to average specific dielectric constants at the respective probing depth levels. For example, each phase cycle period of the reception waveform varies depending on the average dielectric constant at each probing depth level, or a noise component at each phase of the reception wave corresponds to the average dielectric constant at each probing depth level. Therefore, a change in dielectric constant at each probing depth level can be monitored on the basis of these signal components.

In the in-medium dielectric constant measuring method according to the present invention, a reference cycle period may preliminarily be determined for a reference dielectric constant, and the average dielectric constants in the depth ranges of the medium corresponding to the respective time-based ranges may be calculated on the basis of the average cycle periods in the respective time-based ranges, the reference cycle period and the reference dielectric constant. This makes it possible to more accurately determine the dielectric constants in the medium because the references are clearly defined. More preferably, a signal processing circuit for generating the analytic signal is preliminarily adjusted so that the analytic signal waveform has the reference cycle period when a homogeneous medium having the reference dielectric constant is electromagnetically probed.

The in-medium dielectric constant measuring method according to the present invention may further comprise the step of displaying the calculated average dielectric constants in the respective depth ranges as a dielectric constant distribution diagram prepared by color-coding the average dielectric constants along the depth in the medium on a display device. This permits even an unskilled person to easily find the dielectric constants at the respective depth levels in the medium, e.g., in the ground, in view of the dielectric constant distribution diagram displayed on the display device, so that a geological structure, the presence or absence of underground water and the presence or absence of water leakage can easily be determined.

In the in-medium dielectric constant measuring method according to the present invention, the positions of amplitude peaks of the analytic signal waveform may be detected, and the analytic signal is divided at the peak positions. By thus dividing the analytic signal into a plurality of time-based ranges at the amplitude peak positions, errors in the measurement and the analysis can be reduced, because the detection of the amplitude peak positions is relatively easy.

The present invention further provides an electromagnetic prober, which comprises: a transmission antenna for radiating electromagnetic radiation; a reception antenna for receiving echoes; a reception signal processing section for generating an analytic signal on the basis of a detection signal of the reception antenna; and an analytic processing section for performing a predefined analyzing process on the basis of the analytic signal, the analytic signal having an alternating waveform which has an amplitude varying with time with its time axis corresponding to a depth in a medium; wherein the analytic processing section comprises in-medium dielectric constant calculation means which divides the analytic signal into a plurality of time-based ranges and performs a predefined computation on average cycle periods in the respective time-based ranges of the analytic signal for calculating average dielectric constants in depth ranges of the medium corresponding to the respective time-based ranges.

In the electromagnetic prober according to the present invention, the reception signal processing section may be adapted to establish a linear relationship between the average cycle periods in the respective time-based ranges of the analytic signal waveform generated thereby and the square roots of the average dielectric constants in the depth ranges of the medium corresponding to the respective time-based ranges.

In the electromagnetic prober according to the present invention, the transmission antenna is provided with an electromagnetic radiation absorber for selectively removing a frequency component other than a component of a pre-defined target frequency so as to narrow an occupied bandwidth of the radiated electromagnetic radiation, wherein the target frequency is not lower than 300 MHz and not higher than 2 GHz, and the occupied bandwidth is not smaller than 10 MHz and not greater than 100 MHz and is equivalent to not higher than 10% of the target frequency.

The analytic processing section may further comprise reference dielectric constant setting means for setting a reference dielectric constant, and reference cycle period setting means for setting a reference cycle period for the reference dielectric constant, wherein the in-medium dielectric constant calculation means is adapted to calculate the average dielectric constants in the depth ranges of the medium corresponding to the respective time-based ranges on the basis of the average cycle periods in the respective time-based ranges and a correlation between the set reference cycle period and the set reference dielectric constant. In this case, the reception signal processing section is preferably adjustable so that the analytic signal waveform has the reference cycle period when a homogeneous medium having the reference dielectric constant is electromagnetically probed.

The electromagnetic prober according to the present invention may further comprise a display device for displaying the calculated average dielectric constants in the respective depth ranges as a dielectric constant distribution diagram prepared by color-coding the average dielectric constants along the depth in the medium.

The in-medium dielectric constant calculation means may be adapted to detect positions of amplitude peaks of the analytic signal waveform and divide the analytic signal at the peak positions.

The present invention further provides a method of measuring an in-medium dielectric constant for an electromagnetic prober comprising a transmission antenna for radiating electromagnetic radiation and a reception antenna for receiving echoes of the radiated electromagnetic radiation, the method comprising the steps of: detecting all peak positions of an electromagnetic radiation propagation waveform; and sequentially measuring widths of time-based ranges defined between the respective peak positions, and determining a change in dielectric constant from the following expression:

Specific Dielectric Constant=(Measured Cycle Period/Reference Cycle Period)$^2$×Reference Calibration Specific Dielectric Constant The in-medium dielectric constant measuring method may further comprise the step of determining a dominant frequency for verification of a propagation cycle period in each of the ranges by performing a frequency spectrum analysis with signal components in the other ranges nullified and normalizing the analysis through calculation of sum of squares of maximum spectra (excluding DC components), and confirming a correlation between the dominant frequency and the calculated specific dielectric constant.

The in-medium dielectric constant measuring method may further comprise the step of displaying the specific dielectric constants determined for the respective ranges as a dielectric constant distribution diagram prepared by color-bar-coding the specific dielectric constants along the depth in a geological structure.

Other inventions attained in relation to the electromagnetic prober by the inventor of the present invention will be disclosed below, though not directly related to the present invention claimed in this application.

Calibration Process for Reception Circuit of Electromagnetic Prober

The inventor of the present invention and his associates developed a specific dielectric constant calibration method for an electromagnetic prober capable of monitoring a dielectric constant at each probing depth level on the basis of a reception waveform to ensure that the calibration for the specific dielectric constant can easily be achieved prior to probing.

In the specific dielectric constant calibration method for an electromagnetic prober which comprises a transmission antenna for radiating electromagnetic radiation, a reception antenna for receiving echoes of the radiated electromagnetic radiation, a reception unit for generating a reception signal on the basis of a detection signal of the reception antenna and a signal processing section for processing the reception signal to output an analytic signal, the signal processing section having a cycle adjusting section for converting the reception signal into an analytic signal having a different signal cycle period through frequency conversion, the cycle adjusting section having setting means for setting a frequency conversion constant, the setting means is adjusted so that the cycle period of the analytic signal obtained when the electromagnetic radiation is radiated from the transmission antenna in the air is matched with a reference period predetermined according to a reference specific dielectric constant. The aforesaid calibration method is advantageously applicable to an electromagnetic prober which establishes a predefined correlation between an average specific dielectric constant at each probing depth level and an average cycle period for each phase of an analytic signal waveform, and is more preferably used with an electromagnetic prober which has a signal processing circuit for generating an analytic signal waveform such that an average cycle period for each phase of the analytic signal waveform is generally proportional to a square root of an average specific dielectric constant at each probing depth level. Further, the aforesaid calibration method is advantageously applicable to a case where pulsed electromagnetic radiation in a narrow band is radiated by optimizing the transmission antenna and a transmission circuit. In the calibration method, the reception unit may essentially comprise a high frequency circuit, and the primary function of the reception unit may be the detection of the echoes. The reception signal outputted from the reception unit may range from a KHz band to a ten and several MHz band. The circuit structures of the reception unit and the signal processing section (signal processing circuit) may be provided on separate boards, or integrally provided on the same board.

The frequency conversion in the calibration method generally means processes for equivalently changing the frequency by changing a relationship between the analytic signal and the time axis, and includes a process for shifting the analytic signal per se along the time axis and a process for changing the unit time of the time axis. Where the analytic signal is an analog signal, for example, the frequency conversion of the analytic signal may be achieved by a frequency converting circuit such as a double balanced mixer. Where the analytic signal is represented by a digital data set obtained by A-D conversion of a reception signal, the frequency conversion of the analytic signal is achieved by handling the digital data set as sampled in different timing from actual sampling timing (in other words, by changing a unit time interval between data sampling points). The setting means for setting the frequency conversion constant may have any proper construction. Where the cycle adjusting means is constituted by the frequency conversion circuit described above, for example, the setting means may include circuit elements such as a variable resistor and variable capacitor provided in the circuit. Where the cycle adjusting means is constituted by a microcomputer operative on the basis of a predefined program, the setting means may include a rewritable memory, a program for rewriting data in the memory and input means such as a switch for data input.

The calibration for the specific dielectric constant in the prober means that the cycle period of a reception signal obtained from a medium having the specific dielectric constant is properly correlated with and the time axis.

Provided that the specific dielectric constant of the medium is $\varepsilon_r$ and the propagation speed of the electromagnetic radiation in the air is $C_0$, the propagation distance (depth) D of the electromagnetic radiation and the time t have a relationship represented by the following expression:

$$D = \frac{t \times C_0}{\sqrt{\varepsilon_r}}$$

That is, the propagation distance (depth) can be determined by determining the propagation time.

Where the analytic signal based on the reception signal, for example, an analytic signal containing a surface echo and an echo from a buried object is displayed as a reception waveform with the time and the amplitude plotted as abscissa and ordinate, respectively, waveforms of the echoes can be discriminated from each other, but the distance (depth) to the buried object cannot be determined on the basis of a time lag between the surface echo and the object echo without the calibration for the specific dielectric constant. This is because no reference is provided even though each phase cycle period of the analytic signal is correlated with the time axis on the display. Since the cycle period of the reception signal for the reference specific dielectric constant is not defined, the specific dielectric constant cannot be determined for a reception signal having a different cycle period. Therefore, the physical property analysis is impossible. That is, a reference period for the signal processing is not defined, so that the cycle period of the analytic signal cannot be correlated with the time axis in the signal processing section.

Therefore, the calibration is performed for a correlation between the time axis and the cycle period of an analytic signal based on an echo having passed through a medium having a predefined specific dielectric constant, whereby a propagation period between given points on the analytic signal waveform displayed on the display can be determined from the time axis. Thus, the cycle period of the analytic signal and the time axis can be correlated with each other in the signal processing section, so that the signal processing can be performed on the basis of the time axis subjected to the calibration.

According to the aforesaid calibration method, the setting means of the cycle adjusting section is adjusted so that the cycle period of the analytic signal obtained when the electromagnetic radiation is radiated in the air (the cycle period of the surface echo) is matched with the reference period, whereby the calibration is equivalently performed with the use of the medium having the reference specific dielectric constant.

According to this calibration method, the calibration process can be performed simply by adjusting the cycle period while displaying the analytic signal obtained by the in-air radiation, so that the calibration can accurately and easily be achieved at a probing site without the need for a special calibration device or procedure.

According to this calibration method, even if the cycle period of the analytic signal is varied due to temperature variations in the internal circuit of the prober, the calibration is performed so that the cycle period of the analytic signal is matched with the reference period in the varied state. Unless the temperature and the like are abruptly changed, variation errors in the cycle periods of the analytic signal depending on the specific dielectric constants are offset against each other, thereby ensuring less erroneous measurement. Since the calibration is performed by using the analytic signal obtained by the in-air radiation, the influence of any dielectric on the transmission antenna can be eliminated as much as possible for more accurate calibration.

When the cycle period of the analytic signal is matched with the reference period, the matching of the cycle period is preferably based on the surface echo. The surface echo obtained by the in-air radiation is based on the first reflection of the electromagnetic radiation radiated from the transmission antenna and includes, for example, reflection on an antenna board.

In the calibration method, the signal processing section may be adapted to generate and output the analytic signal having the predefined relationship between the cycle period and the specific dielectric constant on the basis of a reception signal having a cycle period varying according to specific dielectric constants in the medium.

Electromagnetic radiation passing through a medium having different specific dielectric constants has a propagation speed varying according to the specific dielectric constants in the medium, and the frequency (cycle period) of the reception signal correspondingly varies according to the specific dielectric constants in the medium.

Therefore, the analytic signal can be outputted which has been processed by the signal processing section so that the cycle period of the reception signal and the square root of the specific dielectric constant have a linear relationship.

Thus, the correlation between the cycle period of the analytic signal and the specific dielectric constant is clearly defined, so that average specific dielectric constants at respective depth levels can be calculated on the basis of the analytic signal, and the depth analysis can easily be performed on the basis of the average specific dielectric constants thus calculated.

A method of deriving the reference period in the specific dielectric constant calibration method may comprise: radiating electromagnetic radiation from the transmission antenna toward a reference dielectric material having a predefined specific dielectric constant and a predefined calibration distance; adjusting the setting means so that a time lag between an echo reflected on the surface of the reference dielectric material and an echo reflected at the calibration distance in the analytic signal is matched with a time required for the electromagnetic radiation to travel the calibration distance in the reference dielectric material; and then determining the cycle period of the analytic signal obtained by the in-air radiation from the transmission antenna as the reference period.

The time required for the electromagnetic radiation to travel the calibration distance in the reference dielectric material herein means a time required for the electromagnetic radiation to travel the calibration distance from the surface of the reference dielectric material and back to the surface.

According to the reference period deriving method, the calibration is performed with the use of the reference dielectric material, and the cycle period of the echo obtained by the in-air radiation in this calibrated state is employed as the reference period for the calibration.

The calibration method, which employs the reference period thus determined, is highly appreciated in that the cycle period of the analytic signal obtained by the in-air radiation through the calibration with the reference dielectric constant is employed as the reference period for the calibration.

Further, there has been provided an electromagnetic prober which comprises: a transmission antenna for radiating electromagnetic radiation; a reception antenna for receiving echoes of the radiated electromagnetic radiation; a reception unit for generating a reception signal on the basis of a detection signal of the reception antenna; a signal processing section for processing the reception signal and outputting an analytic signal; storage means for storing measurement condition data including a reference specific dielectric constant value; and computation means; the signal processing section having a cycle adjusting section for converting the reception signal into an analytic signal having a different signal cycle period through frequency conversion; the cycle adjusting section having setting means for setting a frequency conversion constant. In the electromagnetic prober, the setting means is adjustable so that the cycle period of an analytic signal obtained when the electromagnetic radiation is radiated from the transmission antenna in the air is matched with a reference period preliminarily determined according to the reference specific dielectric constant. Further, the signal processing section may be adapted to generate the analytic signal by correcting the reception signal obtained during the probing according to the specific dielectric constant, and the computation means may be adapted to generate analytic data by performing a predefined computation on the analytic signal on the basis of the measurement condition data stored in the storage means.

The aforesaid specific dielectric constant calibration method may be employed in the electromagnetic prober. Through the calibration for the specific dielectric constant by optimization of a predefined circuit constant of the signal processing section, a correlation between the analytic signal and the time axis can be calibrated for the specific dielectric constant. After the calibration, the signal processing section outputs an analytic signal generated by performing the cycle adjusting process on the reception signal according to the setting of the setting means. The cycle period of the analytic signal has a certain relationship with the specific dielectric constant in the medium, e.g., in the ground.

The analytic signal thus generated is outputted to the computation means, and subjected to a necessary computation on the basis of the measurement condition data stored in the storage means for generation of analytic data necessary for the display of the results of the probing. The measurement condition data include data such as reference specific dielectric constant values and programs for computations to be performed on the analytic signal according to a probing result display mode.

The signal processing section may be adapted to generate an analytic signal having a predefined relationship between the cycle period and the specific dielectric constant as in the electromagnetic prober which implements the aforesaid specific dielectric constant calibration method.

There are various methods for changing the cycle period of the reception signal through the frequency conversion in the cycle adjusting section. For example, the time axis for the reception signal is adjusted by the setting means of the cycle adjusting section with the reception signal fixed. Thus, the correlation between the reception signal and the time axis can be calibrated. As a result, the analytic signal can be generated through the frequency conversion of the reception signal.

Alternatively, the reception signal per se may be frequency-converted (cycle-converted) according to the setting of the setting means by the cycle adjusting section with the time axis fixed. Thus, the analytic signal can be generated with the correlation between the reception signal and the time axis calibrated.

There are various methods for frequency-converting the reception signal per se. For example, a heterodyne process may be performed on the reception signal for generation of an analytic signal having a different frequency. Alternatively, the reception signal may be once converted into digital reception data through analog-to-digital conversion, and then a digital process is performed on the digital reception data for generation of an analytic signal having a different frequency.

The transmission signal radiated from the transmission antenna and the detection signal of the reception antenna preferably belong to a micro wave band ranging from several hundred MHz to about 1 GHz, but this makes it difficult to perform the signal processing directly on the detection signal of the reception antenna per se.

Therefore, the reception unit may be adapted, for example, to repeatedly perform a process sequence of repeatedly sampling the detection signal of the reception antenna received in a predefined cycle a predetermined number of times while slightly shifting the sampling point of the reception antenna detection signal for the generation of the reception signal.

That is, the reception unit holds a peak value or an average value while sampling the amplitude of the reception antenna detection signal repeatedly received, and envelop-detects the peak value or the average value. Thus, the reception unit can generate a reception signal which has a frequency reduced as compared with the original reception antenna detection signal and is suitable for the signal processing. Then, the signal processing section can perform a cycle adjusting process on the reception signal thus generated for the calibration.

A pulsed control signal including a triangular wave signal (saw-teeth wave) for the sampling is outputted from a pulse controller, and the sampling of the reception signal is based on this control signal. By changing the rise time of the triangular wave signal in the control signal in association with a change ($\Delta V$) in the potential of the detection signal, the reception waveform can be monitored in a relatively long time frame (monitoring window) where the medium has a great specific dielectric constant and the reception signal has a long cycle period, and the reception waveform can be monitored in a relatively short time frame (monitoring window) where the medium has a small specific dielectric constant and the reception signal has a short cycle period. Besides, the reception circuit may employ a diode bridge including diodes (e.g., Schottky barrier diodes) which each have a frequency characteristic relatively greatly varying around a transmission frequency or a reception frequency, to shift the sampling points according to a correlation between the response characteristics and frequency characteristics of the diodes. By thus sampling the reception signal while sensitively detect the change $\Delta V$ in the detection signal, the reception waveform can be monitored in a relatively long time frame (monitoring window) where the medium has a great specific dielectric constant and the reception signal has a long cycle period, and the reception waveform can be monitored in a relatively short time frame (monitoring window) where the medium has a small specific dielectric constant and the reception signal has a short cycle period.

Where the calibration is performed on the basis of the predefined specific dielectric constant as described above, the analytic signal having passed through the medium having different specific dielectric constants has different cycle periods according to the specific dielectric constants.

Therefore, a correction data table indicative of a relationship between an analytic signal cycle period and an actual period may be prepared through preliminary measurement, whereby a period (depth) can be determined on the basis of the analytic signal by correcting the cycle period through conversion. Further, the correction data table may be retained in the signal processing section, whereby the analytic signal is generated by performing signal processing to provide the predefined relationship between the reception signal cycle period and the actual period.

Next, the method of deriving the reference period in the aforesaid specific dielectric constant calibration method will be explained in greater detail. In the explanation, the time required for the electromagnetic radiation to travel the calibration distance in the reference dielectric material means a time required for the electromagnetic radiation to travel the calibration distance from the surface of the reference dielectric material and back to the surface.

The time t required for the magnetic radiation to travel the calibration distance D back and forth in the reference dielectric material having the reference specific dielectric constant $\varepsilon_r$ is represented by the following expression, wherein $C_o$ is the propagation speed of the electromagnetic radiation in the air.

$$t = 2 \times \frac{D \cdot \sqrt{\varepsilon_r}}{C_0}$$

Therefore, the setting means is adjusted so that a time lag between an echo reflected on the surface of the reference dielectric material and an echo reflected at the calibration distance when the electromagnetic radiation is radiated toward the reference dielectric material is matched with the propagation time t required for the calibration distance D. Thus, the correlation between the analytic signal and the time axis is calibrated in the signal processing section. In this calibrated state, the reference period is determined by determining the cycle period of an echo obtained by the in-air radiation.

After the reference period is thus determined, conditions equivalently calibrated with the reference specific dielectric constant can be reproduced simply by matching the cycle period obtained by the in-air radiation with the reference period.

It is possible to derive the reference period on the side of a user of the electromagnetic prober, but this requires a large-scale reference dielectric material. Therefore, the derivation of the reference period is basically carried out on the side of a maker of the prober. Where reference periods are determined for respective antennas to be replaceably attached to the prober and provided to the user side, the calibration for the specific dielectric constant can accurately and easily be performed on the user side.

As the aforesaid reference dielectric, a "dried granite soil" having a specific dielectric constant $\varepsilon_r$ of 12 and a calibration distance of 50 cm is practical and less costly. Alternatively, a medium having a different specific dielectric constant may be employed as the reference dielectric material. The granite soil herein means rudaceous soil of disintegrated granite.

Where the "dried granite soil" is employed as the reference dielectric material, there is a possibility that the specific dielectric constant may vary due to the influence of the humidity in the granite soil. Therefore, it is necessary to control the specific dielectric constant of the "dried granite soil" by employing an epoxy resin material (specific dielectric constant=3.5 to 4.5) or a melamine resin material (specific dielectric constant=6.5 to 7) less liable to be influenced by the humidity and having a stable specific dielectric constant.

Where the specific dielectric constant of the "dried granite soil" is controlled by employing the epoxy resin having a predefined calibration distance as the reference dielectric material, for example, the calibration is performed so as to match the calibration distance (calibration period) of the epoxy resin. The calibration procedure is performed in the same manner as the aforesaid calibration employing the "dried granite soil".

Then, the calibration distance (calibration period) of the "dried granite soil" is measured. The specific dielectric constant of the "dried granite soil" can be controlled by confirming that a measurement value is within a predefined tolerance.

Where the reference dielectric material is constructed by employing the "dried granite soil" having a specific dielectric constant of 12 to provide a calibration distance of 50 cm, for example, the dried granite soil is filled in a wood box so as to provide the intended calibration distance and the top of the box is covered with an acryl plate for easy observation of the "granite soil".

The reference dielectric material equivalently having the predefined specific dielectric constant and the calibration distance may be provided by employing media having different specific dielectric constants in combination.

Next, an explanation will be given to how the signal processing section generates the analytic signal having the predefined relationship between the cycle period and the specific dielectric constant for the reception signal having different cycle periods according to the specific dielectric constants in the medium and outputs the analytic signal.

The cycle period T of the electromagnetic radiation passing through the medium is represented by the following expression by employing the specific dielectric constant $\in_r$, the propagation speed $C_0$ of the electromagnetic radiation in the air and the frequency f of the electromagnetic radiation.

$$T = \frac{1}{f} = \frac{\lambda \cdot \sqrt{\varepsilon_r}}{C_0}$$

Therefore, a cycle period observed for a medium having a specific dielectric constant $\in_r$ of 12 is about one half a cycle period observed for a medium having a specific dielectric constant $\in_r$ of 45, and the reception signal has a frequency variation (cycle period variation) according to the specific dielectric constants in the medium.

Provided that the cycle period of the analytic signal observed for a specific dielectric constant $\in_{r0}$ of 12 is $T_0$ and the cycle period of the analytic signal observed for a specific dielectric constant $\in_r$ of 45 is T, the signal processing section generates the analytic signal by performing the signal processing on the reception signal so that the following relationship is satisfied:

$$\frac{T}{T_0} = \frac{\sqrt{\varepsilon_r}}{\sqrt{\varepsilon_{r0}}}$$

That is, it is possible to generate the analytic signal having a linear relationship with respect to the square root of the specific dielectric constant.

Through this process, the relationship between the cycle period of the analytic signal and the specific dielectric constant is clearly defined, so that the signal processing is significantly facilitated particularly for display of a sectional image.

Analytic Signal Processing Method

Through the measurement and analysis of a phase shift and an amplitude variation of the electromagnetic radiation occurring due to a distance variation, the inventor of the present invention and his associates found that the electromagnetic radiation penetrating into the ground tends to suffer from a phase shift and an amplitude variation due to the distance variation but propagates at substantially the same frequency (cycles) and at substantially the same attenuation ratio in the ground, and reception signals of echoes of the electromagnetic radiation have the same properties.

Then, they contemplated a method for correction of a phase difference between reception signals, a method for correction of an amplitude difference between reception signals and a method for extraction of a differential signal component from amplitude-corrected reception signals, and found that the measurement can stably be performed with the correction for the distance variation by employing these methods either alone or in proper combination.

On the basis of the findings, they successfully achieved stable and accurate measurement for the probing even if a distance between the antenna of the prober and the object to be surveyed is varied. That is, there has been provided an electromagnetic prober which is adapted to non-invasively probe into a medium by holding a plurality of reception signals obtained at different probing sites and analyzing the plurality of reception signals, and includes a transmission antenna, a reception antenna for receiving echoes of electromagnetic radiation radiated from the transmission antenna, and a reception unit for generating reception signals on the basis of detection signals of the reception antenna. According to a reception signal processing method comprising the step of phase-correcting the respective reception signals with specific peak points of the respective reception signals defined as starting points, this electromagnetic prober is capable of eliminating a phase difference between the plurality of reception signals occurring due to a variation in a distance between the antenna and the medium to be probed. The electromagnetic prober is capable of performing an accurate probing operation without skill, even if the prober is of a portable type.

The reception signal processing method may further comprise the step of comparing the amplitudes of the plurality of reception signals at the phase correction starting points, and performing a computation on a predetermined one of the reception signals with the use of a first amplitude correction factor given as a constant according to the ratio of the amplitudes. With this arrangement, even if the radiated electromagnetic radiation penetrates into the medium at different incident phases due to the variation in the distance between the medium to be probed and the antenna to result in an amplitude difference between the respective reception signals, it is possible to compensate for the amplitude difference in the amplitude correction step.

The reception signal processing method may further comprise the step of performing a computation on the predetermined reception signal subjected to the phase correction with the use of a second amplitude correction factor given as a time-based function. With this arrangement, the amplitude correction can optimally be made for each phase (time) of the reception signal. The phase of the reception signal corresponds to the depth in the medium to be probed, and the attenuation ratio of the electromagnetic radiation propagating in the medium is generally constant irrespective of the amplitude of the electromagnetic radiation observed when the electromagnetic radiation is incident on the surface of the medium. Therefore, the second factor may be given, for example, as a function of the reciprocal of the attenuation ratio to amplify the level of a signal obtained at a great depth for easier judgment and analysis.

The reception signal processing method preferably comprises the step of performing a computation on a predetermined one of the reception signals with the use of a first amplitude correction factor given as a constant according to the ratio of the amplitudes of the plurality of reception signals at the phase correction starting points and a second amplitude correction factor given as a time-based function.

The computation with the use of the second amplitude correction factor is performed preferably on a portion of the reception signal following a predetermined phase, more preferably on a portion of the reception signal following the phase correction starting point. With this arrangement, a portion of the reception signal preceding the predetermined phase (the phase correction starting point) is not subjected to the amplitude correction employing the second amplitude correction factor, but an amplitude fluctuation is intentionally left, so that an operator of the electromagnetic prober can recognize a change in the lift amount of the electromagnetic prober. Thus, the operator of the prober can employ the amplitude fluctuation as a reference for stabilization of the lift amount.

The reception signal processing method may further comprise the step of extracting a differential signal component from the reception signals subjected to the amplitude correction. With this arrangement, even if a differential processing operation is performed on reception signals obtained before and after the change in the lift amount of the prober, the phase compensation and the amplitude compensation are implemented before the differential processing operation, so that a variation in the structure of the medium due to the presence of a buried object or the like can be detected as a differential signal component having a high S/N ratio. Thus, even an unskilled person can easily perform the non-invasive probing operation by employing a plurality of differential signals obtained at the respective probing sites.

Further, there has been provided a reception signal processing apparatus for an electromagnetic prober, which is adapted to non-invasively probe into a medium by holding a plurality of reception signals obtained at different probing sites and analyzing the plurality of reception signals, and includes a transmission antenna, a reception antenna for receiving echoes of electromagnetic radiation radiated from the transmission antenna, and a reception unit for generating the reception signals on the basis of detection signals of the reception antenna, the reception signal processing apparatus comprising phase correction means for phase-correcting the respective reception signals with specific peak points of the respective reception signals defined as starting points.

The reception signal processing apparatus may further comprise predefined amplitude correction means. The amplitude correction means may be adapted to compare the amplitudes of the plurality of reception signals at the phase correction starting points, and perform a computation on a predetermined one of the reception signals with the use of a first amplitude correction factor given as a constant according to the ratio of the amplitudes. Further, the amplitude correction means may be adapted to perform a computation on the predetermined reception signal subjected to the phase correction with the use of a second amplitude correction factor given as a time-based function. The amplitude correction means is preferably adapted to perform computations on a predetermined one of the reception signals with the use of a first amplitude correction factor given as a constant according to the ratio of the amplitudes of the plurality of reception signals at the phase correction starting points and a second amplitude correction factor given as a time-based function.

The computation with the use of the second amplitude correction factor is performed preferably on a portion of the reception signal following a predetermined phase, more preferably on a portion of the reception signal following the phase correction starting point.

The reception signal processing apparatus may comprise differential signal extraction means for extracting a differential signal component from the reception signals subjected to the amplitude correction.

The aforesaid reception signal processing method is adapted to analyze reception signals of echoes of electromagnetic radiation radiated from an antenna in a predefined cycle and reflected on an object for exploratory survey, and comprises the step of phase-correcting the reception signals so as to eliminate a phase difference occurring due to a variation in a distance between the antenna and a medium to be probed.

The reception signal processing method may further comprise the step of making a first amplitude correction to the plurality of reception signals subjected to the phase correction through a computation with the use of a first amplitude correction factor so as to reduce an amplitude difference between the reception signals.

The reception signal processing method may further comprise the step of making a second amplitude correction to the reception signals subjected to the phase correction by employing amplitude correction data (second amplitude correction factor) represented by a time axis and a predetermined amplification degree as weighting data. The method may further comprise the step of extracting a differential signal component from the reception signals subjected to the amplitude correction.

The medium to be probed means a medium such as the ground or a wall in which a landmine, a clay pipe or the like to be surveyed is buried, and the distance between the antenna and the medium to be probed means a distance between the surface of the antenna and the surface of the ground or the wall, i.e., a lift amount. The reception signal has an alternating waveform which can be represented by a function of a time and a signal strength, and the time axis and the signal strength correspond to the phase and the amplitude, respectively.

For the phase correction of the reception signals, starting points are specified to match the phases of the reception signals with each other. Peak points are preferably predefined as the starting points so that the reception signals each have minimum distortion (minimum harmonic and subharmonic components) and a phase difference between the reception signals can clearly be determined. The peak points may be phase points at which the signal strengths of the reception signals have a maximum value or phase points at which the signal strengths of the reception signals have a minimum absolute value (i.e., the signal strengths are zero). Besides, an extreme value condition may properly be determined to specify the peak points.

An antenna capable of radiating electromagnetic radiation of a target frequency containing minimum harmonic and subharmonic components is preferably employed as the antenna of the electromagnetic prober. With this arrangement, the reception signals have minimum distortion so that the starting points for the phase matching can easily be defined.

Assuming that the distance between the antenna and the surface of the ground is 10 cm and the electromagnetic radiation has a frequency of 1.5 GHz (wavelength of 20 cm), the first maximum point (first peak point) of the reception signal is defined as the phase adjustment starting point. Considering that the starting point corresponds to the position of the antenna surface, the minimum point (second peak point) of the reception signal following the maximum point generally corresponds to the position of the ground surface. In other words, the second amplitude peak point of the reception signal always corresponds to a position within the ground, if the frequency of the electromagnetic radiation is set lower than 1.5 GHz and a variation in the distance between the antenna and the ground surface is within 10 cm.

As described above, electromagnetic radiation waves radiated before and after the change in the lift amount penetrate into the ground and propagate at substantially the same frequency (cycles) and at substantially the same attenuation ratio through having a phase difference and an amplitude difference. Therefore, the compensation for the fluctuation of the reception signals due to the distance variation can effectively be achieved through the phase correction and the amplitude correction based on the second amplitude peak points of the reception signals.

That is, the phase compensation for two reception signals can be achieved by comparing the phases of the second amplitude peaks of the two reception signals to detect a phase difference and shifting the phase of one of the reception signals by the detected phase difference.

For the phase correction, it is necessary to retain at least one waveform cycle of the previously received reception signal, so that an arrangement is provided for performing an A/D converting (analog-to-digital converting) process on a reception signal and storing the resulting digital data.

A conventionally employed arrangement may be employed for the A/D conversion. For example, the process is performed by isochronously sampling the amplitude 512 times in a predetermined time frame containing the entire reception waveform, and converting the sampled analog amplitude signals into digital amplitude data having a resolution of 12 bits.

Where the fundamental frequency of the radiated electromagnetic radiation is extremely high (about 1 GHz), it is preferred to reduce the frequency of the reception signal through frequency conversion and sample the resulting reception signal.

Even if the distance between the antenna and the ground surface is slightly varied, the compensation for the phase difference between the reception signals is achieved by making the phase correction for matching the phases of the second amplitude peak points of the reception signals with each other, so that the complication of a sectional image generated on the basis of a multiplicity of reception signals can be suppressed.

The compensation for the distance variation can effectively be achieved simply by the phase correction of the reception signals. However, an attenuation ratio in the air is significantly different from an attenuation ratio in the ground, so that the amplitude difference between the reception signals occurs due to the variation in the incident phase on the ground surface. Therefore, the effect of the compensation for the distance variation can be enhanced by making the amplitude correction to the reception signals subjected to the phase correction for reducing the amplitude difference.

As an amplitude correction method, a first amplitude correction is made by comparing the second amplitude peak points of the reception signals and performing a computation on the entire reception signals with the use of a weighting factor (first amplitude correction factor) according to the ratio of the amplitudes.

Where the first amplitude correction is made, a greater amplitude reception signal may be subjected to the computation with the use of the weighting factor so as to be matched with a smaller amplitude reception signal. Conversely, the smaller amplitude reception signal may be subjected to the computation with the use of the weighting factor so as to be matched with the greater amplitude reception signal. In this case, the amplitude of the entire waveform can be increased.

Alternatively, the amplitude correction may be made to the entire reception signals by fixing a preceding reception signal as a reference and matching the amplitudes of the reception signals at the second peak points with each other.

By thus performing the signal processing with the use of the reception signals subjected to the phase correction and the first amplitude correction, a clear sectional image of the ground can be obtained which is effectively compensated for the distance variation.

The first amplitude correction is intended to comprehensively perform the computation on the reception signals with the use of the weighting factor. However, the correction can more accurately be achieved by making a time-based amplitude correction, because the attenuation ratios of the reception signals are varied with reception time.

That is, a second amplitude correction may be made to the reception signals by employing amplitude correction data (second amplitude correction factor) represented by a time axis and a predefined amplification degree as weighting data, whereby the amplitude difference between the reception signals due to the phase correction can further be suppressed.

The aforesaid second amplitude correction may be made with the use of a single type of amplitude correction data. It is also possible to selectively employ one of plural types of amplitude correction data having different amplification degrees with respect to the time axis, whereby the amplitude correction data can properly be selected according to the amplitudes of the reception signals for optimum amplitude correction.

The first amplitude correction and the second amplitude correction may be made either alone or in combination to the reception signals subjected to the phase correction.

The aforesaid first and second amplitude corrections may be made to the entire waveforms of the reception signals subjected to the phase correction or, alternatively, to all signal components of the reception signals following predefined phase points.

For example, all signal components of the phase-corrected reception signals following the second peak points may be subjected to the amplitude correction. This amplitude correction method obviates the need for making the amplitude correction to signal components preceding the second peak points, thereby simplifying the process.

An amplitude difference is liable to occur between the portions of the reception signals preceding the second amplitude peak points not subjected to the amplitude correction, thereby causing a depth image to unclearly flicker. However, where the prober is scanned with the first amplitude peak points of the reception signals being set on the antenna surface, the second peak points are present in the ground in the vicinity of the ground surface, so that no particular problem occurs during the survey of the buried object. Since the depth image flickers according to the variation in the distance between the antenna and the ground surface, the flicker rather serves as a reference for prevention of fluctuation of the prober during the scanning of the prober.

It is also possible to extract the differential signal component from the reception signals subjected to the amplitude correction and display the sectional image on the basis of the extracted differential signal component.

By extracting the differential signal component from the reception signals subjected to the aforesaid phase correction and amplitude correction, the differential signal component thus extracted is compensated for the fluctuation of the reception signals due to the distance variation.

That is, the differential signal component simply corresponds to a change in physical properties (a change in specific dielectric constant) due to an object buried in the ground. Particularly, noises in in-phase components can effectively be eliminated by the extraction of the differential signal component, making it possible to detect a weak signal. Therefore, a slight difference in the buried object can be detected.

The depth image may be displayed on the basis of the extracted differential signal component, so that a boundary between physically different objects can simply be shown in the depth image thus displayed. Thus, a boundary between objects having closer specific dielectric constants and a limited type of buried objects can properly be surveyed.

In this case, the depth image is liable to flicker when the differential signal component is extracted without making the amplitude correction to the portions of the reception signals preceding the second amplitude peak points. However, the flicker serves as an indication of the distance variation, and presents no problem.

Where the ground is probed, the signal processing method can compensate for a distance variation of ±5 cm from a position spaced by 5 cm apart from the surface of the ground. That is, depth errors and sensitivity reduction due to the distance variation tend to be aggravated when the distance variation exceeds about 5 cm. Therefore, the prober is preferably used with a distance variation within the aforesaid range, but has specifications sufficient for practical use to allow for accurate measurement irrespective of a skill for scanning of the prober.

Further, there has been disclosed a reception signal processing apparatus to be mounted on an electromagnetic prober which is adapted to radiate electromagnetic radiation in a predefined cycle and analyze reception signals of echoes reflected on an object for exploratory survey. The reception signal processing apparatus comprises phase correction means for phase-correcting the reception signals to eliminate a phase difference occurring due to a variation in a distance between an antenna and a medium to be probed.

The reception signal processing apparatus may be constructed by employing an analog processing circuit. Alternatively, the reception signal processing apparatus may be constructed by a digital processing circuit having a CPU and a RAM and a ROM necessary for the CPU to perform processing operations, and the aforesaid method is implemented through a program-based process performed by the CPU.

For example, the reception signal processing apparatus causes the CPU to perform an A/D converting process to isochronously sample the amplitude 512 times in a predefined time frame containing the entire reception waveform, and retain the sampled amplitude levels as digital amplitude data having a resolution of 12 bits. Thus, a single reception signal is stored as 512 amplitude data pieces sequentially arranged.

In the phase correction by the aforesaid phase correction means, specific peak points of the reception signals are defined as starting points. The phase correction may be achieved through digital processing of the reception signal data stored in the reception signal processing apparatus.

For example, the amplitude data pieces of the reception signals to be subjected to the phase correction are sequentially retrieved, and amplitude data pieces each having an absolute value, e.g., a second peak absolute value, and their data numbers are determined.

Then, the data number of the second peak point of a reception signal to be phased-shifted is matched with the data number of the second peak point of a reception signal serving as a reference, whereby the reception signal data is correlated with the reference reception signal. Amplitude data pieces of data numbers of the reception signal falling outside a range between the first data number and the last data number of the reference reception signal are deleted, and null amplitude data is allocated to data numbers of the reception signal having no amplitude data within the range between the first data number and the last data number of the reference reception signal. Thus, reception signal data including 512 amplitude data pieces is newly generated.

Through the aforesaid data processing, the phases of the reception signals at the second amplitude peak points can be matched with each other.

The reception signal processing apparatus may comprise first amplitude correction means for making an amplitude correction to the plurality of reception signals subjected to the phase correction to reduce an amplitude difference between the reception signals.

Like the phase correction means, the first amplitude correction means performs a digital processing operation on the reception signal data stored in the reception signal processing apparatus.

That is, the amplitude correction of the reception signals is achieved by causing the CPU to perform a predefined program-based computation on the amplitude data pieces of the respective data numbers sequentially arranged in the reception signal data.

For example, the first amplitude correction is achieved by comparing an amplitude at the second peak point of the reception signal to be subjected to the amplitude correction with an amplitude at the second peak point of the reference reception signal, and performing a computation on all the amplitude data pieces with the use of a weighting factor (first amplitude correction factor) according to the ratio of the amplitudes.

In the amplitude correction by the first amplitude correction means, a greater amplitude reception signal may be subjected to the computation with the use of the weighting factor so as to be matched with a smaller amplitude reception signal. Conversely, the smaller amplitude reception signal may be subjected to the computation with the use of the weighting factor so as to be matched with the greater amplitude reception signal.

The reception signal processing apparatus comprises second amplitude correction means for making an amplitude correction to the reception signals subjected to the phase correction by employing a second amplitude correction factor represented by a time axis and a predefined amplification degree (i.e., given as a time-based function) as weighting data.

Like the first amplitude correction means, the second amplitude correction means is adapted to perform a digital processing operation on the reception signal data stored in the reception signal processing apparatus.

That is, the second amplitude correction may be made to the reception signals by comparing the amplitude data pieces arranged in the order of the data numbers with the amplitude correction data, comparing the data numbers with the time data, and causing the CPU to perform a program-based computation on the amplitude data pieces of the respective data numbers with the use of the amplification degree of the second amplitude correction factor.

The first and second amplitude correction means may each be adapted to make the amplitude correction to all signal components of the reception signal following a predefined phase in the first cycle of the reception signal.

For example, the amplitude correction may be made only to signal components following the second peak point of the amplitude of the reception signal serving as the reference for the phase correction.

The reception signal processing apparatus may further comprise differential signal extraction means for extracting a differential signal component from the reception signals subjected to the amplitude correction. Like the amplitude correction means, the differential signal extraction means may perform a digital processing operation on the reception signal data stored in the reception signal processing apparatus.

That is, the differential signal component extracting operation may be performed by computing a difference between amplitude data pieces of the same data number in the reception signal data subjected to the phase correction and the amplitude correction.

In the aforesaid explanation of the reception signal processing operation, the "reception signals" do not mean the detection signals of the reception antenna, but are signals detected and outputted by a predefined reception circuit on the basis of the detection signals of the reception antenna.

Electromagnetic Radar Antenna

The antenna comprises a transmission antenna device attached to a shield case for radiating electromagnetic radiation upon reception of an impulse outputted from a transmission section. A dimensional relationship between the transmission antenna device and the shield case is determined according to the wavelength of a target frequency component so as to match the frequency of the electromagnetic radiation radiated from the transmission antenna device with the target frequency. The target frequency means a frequency predefined when the electromagnetic radar antenna is designed, and the dimensional relationship of the antenna is determined so that the radiation can be provided at the target frequency.

The electromagnetic radar antenna is adapted to radiate the electromagnetic radiation at the target frequency in a band of about 300 MHz to about 3 GHz by supplying power impulses to the transmission antenna device. The analysis of the radiation frequency component in such a very high frequency band cannot be discussed by explaining the transmission antenna device alone, but it is necessary to equivalently analyze a distribution constant circuit integrally constituted by the transmission antenna device, the shield case surrounding the transmission antenna device, a power supply line and the like.

However, the inductance component and capacitance component of the distribution constant circuit are varied by slight differences in the shapes and materials of the antenna device and the shield case. In addition, a stray capacitance due to the power supply line and the like aggravates the fluctuation factors. Further, the electromagnetic radiation per se is a transient phenomenon excited not by repetitive signals but by the impulses, so that the analysis of the equivalent distribution constant circuit is difficult.

Therefore, the inventor and his associates conducted various studies on the shape of the antenna device and the shape of the shield case so as to match the frequency component of the electromagnetic radiation radiated from the transmission antenna with the target frequency and reduce an unintended frequency component as much as possible. As a result, it was found that an output level at the target frequency is increased and the unwanted radiation component is reduced by establishing a predefined configurational and dimensional relationship between the transmission antenna device and the shield case.

In other words, the distribution constant circuit is successfully constructed as a unitary structure which is capable of amplifying the target frequency component of the electromagnetic radiation and attenuating the unintended frequency component of the electromagnetic radiation by establishing a predefined dimensional and configurational relationship between the components thereof.

When the impulses are applied to the transmission antenna, a high level output can stably be provided by preliminarily applying a DC-bias to the transmission antenna device. It is also possible to apply no bias for the application of the impulses.

According to this electromagnetic radar antenna, the unwanted radiation component is extremely mitigated, so that minor consideration is merely required against the unwanted radiation component in conformity with the regulations of the Radio Law. That is, there is no need to take special measures against the unwanted radiation component, e.g., to increase the thickness of the shield case or to cover the shield case with a thick-wall housing. Thus, the costs can be reduced and the weight of the antenna per se can be reduced to about one tenth as compared with the conventional antenna. Therefore, the antenna is advantageously used for a prober requiring portability and transportability.

Since the unwanted radiation component is mitigated, the signal-to-noise ratio (S/N ratio) of the reception signals is improved. This obviates the need for the use of a high-gain logarithmic amplifier for separately extracting a signal component close to a noise level. Therefore, a sufficient signal level and a sufficient S/N ratio can be ensured with the use of an ordinary linear amplifier, so that the circuit structure can be simplified and stabilized.

Since the reception signals have a high S/N radio and a reduced distortion, calibration for a reception base point can accurately be performed, for example, by employing the first peak point of a reception waveform. With the high S/N ratio of the reception signals, there is no possibility that weak signals are confused with a noise component to be lost. Therefore, frequency (cycle) variations occurring in the entire reception signals including echoes with time can easily be processed and outputted, so that the physical properties of a medium through which the electromagnetic radiation passes can precisely be determined.

Thus, any user can accurately perform the measurement. In addition, the probing can be carried out for detection of an object, a geological structure and water leakage which are conventionally impossible, and applications for industrial purposes and for consumer purposes are widened.

Briefly explaining the principle underlying the determination of the physical properties, the specific dielectric constant of a medium through which the electromagnetic radiation passes is proportional to the square of (light velocity/electromagnetic radiation propagation speed). Thus, the speed of the electromagnetic radiation passing through the medium (the cycle period of the electromagnetic radiation) can be calculated on the basis of received waves to determine the specific dielectric constant of the medium, whereby the determination of the physical properties and the identification of the medium can be achieved on the basis of the specific dielectric constant thus determined.

According to the electromagnetic radar antenna, the target frequency electromagnetic component out of the power impulse component supplied to the transmission antenna device is amplified, and the unintended frequency electromagnetic component is attenuated. In this case, the output level of the unintended frequency component such as a subharmonic component or a harmonic component having a frequency one half or twice the target frequency is increased by resonance occurring in the distribution constant circuit of the transmission antenna device and the shield case.

Therefore, the frequency band width may be determined so as to cause a reception section to selectively receive either of these frequency components for signal processing.

Preferably employed as materials for the transmission antenna device, a grounding conductor and the shield case are electrically conductive materials, i.e., materials which conduct an electric current with a smaller power loss.

Preferred electrically conductive materials are copper, aluminum and aluminum alloys in consideration of conductivity, mechanical strength, workability and economy.

A conductive material prepared by applying an electrically conductive paint on a surface of a non-conductive material may be employed for the shield case and the transmission antenna device.

The transmission antenna device is preferably constructed such that an electrically conductive foil is provided on a substrate such as of a phenol resin or an epoxy resin, but may be constructed in any of various ways. For example, the transmission antenna device may be formed of a copper plate, and supported in an internal space of the shield case in the vicinity of an opening of the shield case by an insulator.

Reasonably, the electromagnetic radar antenna includes an antenna board formed with a transmission antenna device for radiating electromagnetic radiation upon reception of impulses outputted from a transmission unit, and a hollow rectangular shield case covering a surface of the board formed with the transmission antenna.

The transmission antenna device includes a pair of isosceles-triangular electrically-conductive foils arranged in opposed relation in a bow-tie configuration on the antenna board. A grounding conductor of an electrically conductive foil having a predetermined width is provided in a looped rectangular configuration in symmetrical relation with respect to the front-and-back and right-and-left sides on the board. The bottom edges or side edges of the isosceles-triangular foils of the transmission antenna device each have a length which is about one half the wavelength of the target frequency radiation.

The isosceles-triangle herein includes an equilateral triangle. It is particularly preferred that the transmission antenna device includes a pair of equilateral-triangular electrically-conductive foils and the edges of the equilateral triangular foils each have a length which is about ½ of the wavelength of the target frequency radiation.

On the other hand, the length of the shield case as measured perpendicularly to the direction of the arrangement of the opposed isosceles-triangular (equilateral-triangular) elements of the transmission antenna device is substantially the same as the wavelength of the target frequency radiation, and the width of the shield case is an integral multiple of about ¼ of the wavelength of the target frequency radiation.

Of these dimensions, the width of the shield case was variably set to a length equivalent to ¼, 2/4, ¾ and 4/4 of the wavelength of the target frequency radiation, and it was found that the target frequency output level has a peak when the shield case has a specific width.

This is conceivably because the distribution constant circuit integrally constituted by the transmission antenna device, the shield case and the grounding conductor configured with reference to the wavelength of the target frequency radiation provides a maximum accumulative energy (resonant energy) with respect to the target frequency when having a predefined width. Thus, an optimum radiation level can be provided by properly changing the width.

The inventor and his associates produced a plurality of transmission antennas having the same target frequency in accordance with the aforesaid dimensional relationship, and found that the target frequencies of the electromagnetic radiation radiated from the respective antennas are excellent in reproducibility with almost no variation regardless of variations in the routing of wirings such as the power supply line. There is no variation in the target frequency from device to device, thereby obviating the need for adjusting the reception section (reception unit) for each device. Thus, the circuit construction is simplified and stabilized, and the production thereof is facilitated.

The frequency of the electromagnetic radiation radiated from the transmission antenna is a specific frequency (target frequency) ranging from about 300 MHz to about 3 GHz as described above, and belongs to a micro wave band. Therefore, where aluminum is employed as the material for the shield case, for example, the thickness of the material influences a distribution constant. The inductance component appearing when the electromagnetic radiation is distributed in the shield case increases as the thickness of the material is reduced, and reduces as the thickness of the material is increased. Therefore, it is preferred to correct the configuration and dimension of the antenna according to the thickness of the material for the shield case and the thickness of the conduction foil of the transmission antenna device. Where a shield case formed of a thin material is employed, the target frequency can easily be adjusted by increasing a correction value as compared with a case where a shield case formed of a thick material is employed.

It is preferred that a suppressive resistor for suppressing parasitic radiation of the electromagnetic component of the unintended frequency is provided between the transmission antenna device and the grounding conductor on the antenna board. By properly setting the resistance value of the suppressive resistor, the output level in the unintended frequency band is effectively reduced while the reduction of the target frequency output level is suppressed. Thus, the S/N ratio of the reception waves is further improved.

Further, an electromagnetic radiation absorber may be provided within the shield case so as to absorb and attenuate an electromagnetic component having a specific polarization plane out of the electromagnetic component excited within the shield case containing the transmission antenna device.

The inventor and his associates found that a greater amount of the unintended frequency component is contained in electromagnetic radiation having an electric field component (polarization plane) directed in the direction of the arrangement of the opposed isosceles-triangular (equilateral triangular) elements out of the electromagnetic radiation radiated from the transmission antenna device. Therefore, the unintended electromagnetic component of the radiated electromagnetic radiation can further be reduced by attenuating the electromagnetic component having the polarization plane by the electromagnetic radiation absorber. Thus, the S/N ratio of the reception waves can further be improved.

Usable as the electromagnetic radiation absorber is an ordinary absorber produced by pasting an electrically conductive radio wave reflective material on a foamed material or the like. By utilizing attenuation at the reflection, effective attenuation and absorption can be achieved.

In the electromagnetic radar antenna, a reception antenna device may be provided separately from or integrally with the transmission antenna device.

That is, the transmission antenna device and the reception antenna device having the same configuration may be provided together with the grounding conductor on the antenna board in laterally symmetrical relation, and a shield partition wall is provided for preventing electromagnetic coupling between the transmission antenna device and the reception antenna device.

In this integrated transmission and reception electromagnetic radar antenna, the electromagnetic coupling between the transmission antenna and the reception antenna is reduced by the shield partition wall provided in the shield case. Therefore, the size and weight of the transmission and reception antenna can be reduced, while the aforesaid characteristics are maintained. Further, the transmission and reception antenna is easily produced, and suitable for a portable apparatus.

With the aforesaid arrangement of the transmission antenna, the occupied bandwidth of the electromagnetic radiation radiated from the transmission antenna can be narrowed by selectively removing the frequency component other than the predefined target frequency component. The target frequency may be not lower than 300 MHz and not higher than 2 GHz, and the occupied bandwidth may be not smaller than 10 MHz and not greater than 100 MHz, and may be equivalent to not greater than 10% of the target frequency.

BRIEF DESCRIPTION OF THE DRAWINGS

FIG. 32 is a flow chart illustrating a reception signal processing method for probing by means of the electromagnetic prober;

BEST MODE FOR CARRYING OUT THE INVENTION

Figure 3:
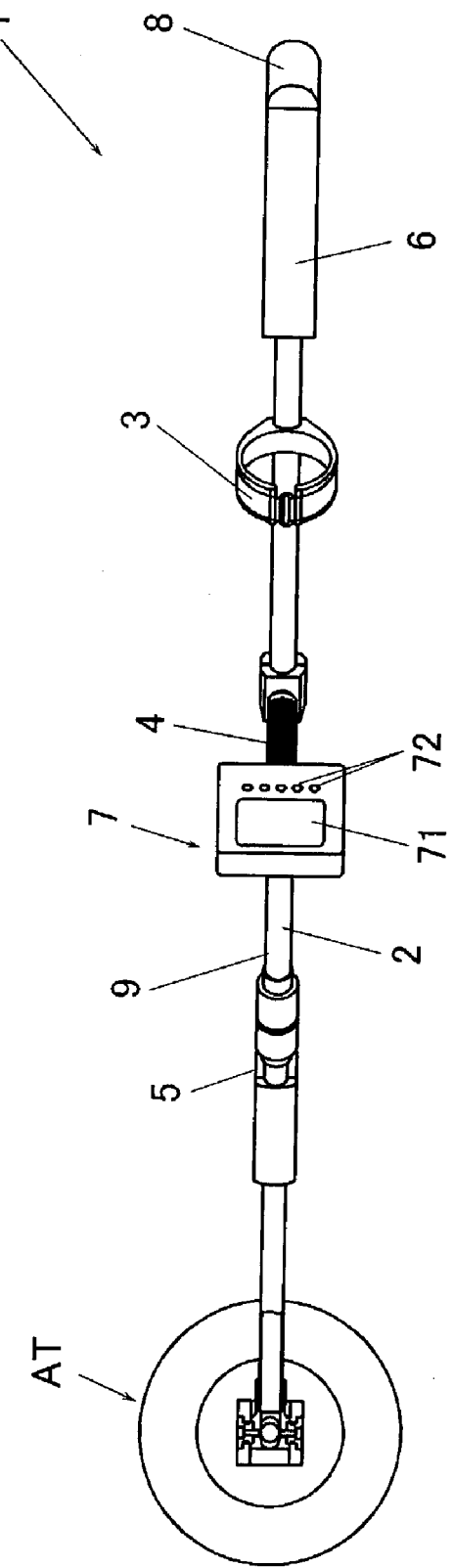
FIG. 3 is a plan view of the electromagnetic prober according to the embodiment of the present invention.
Figure 4:
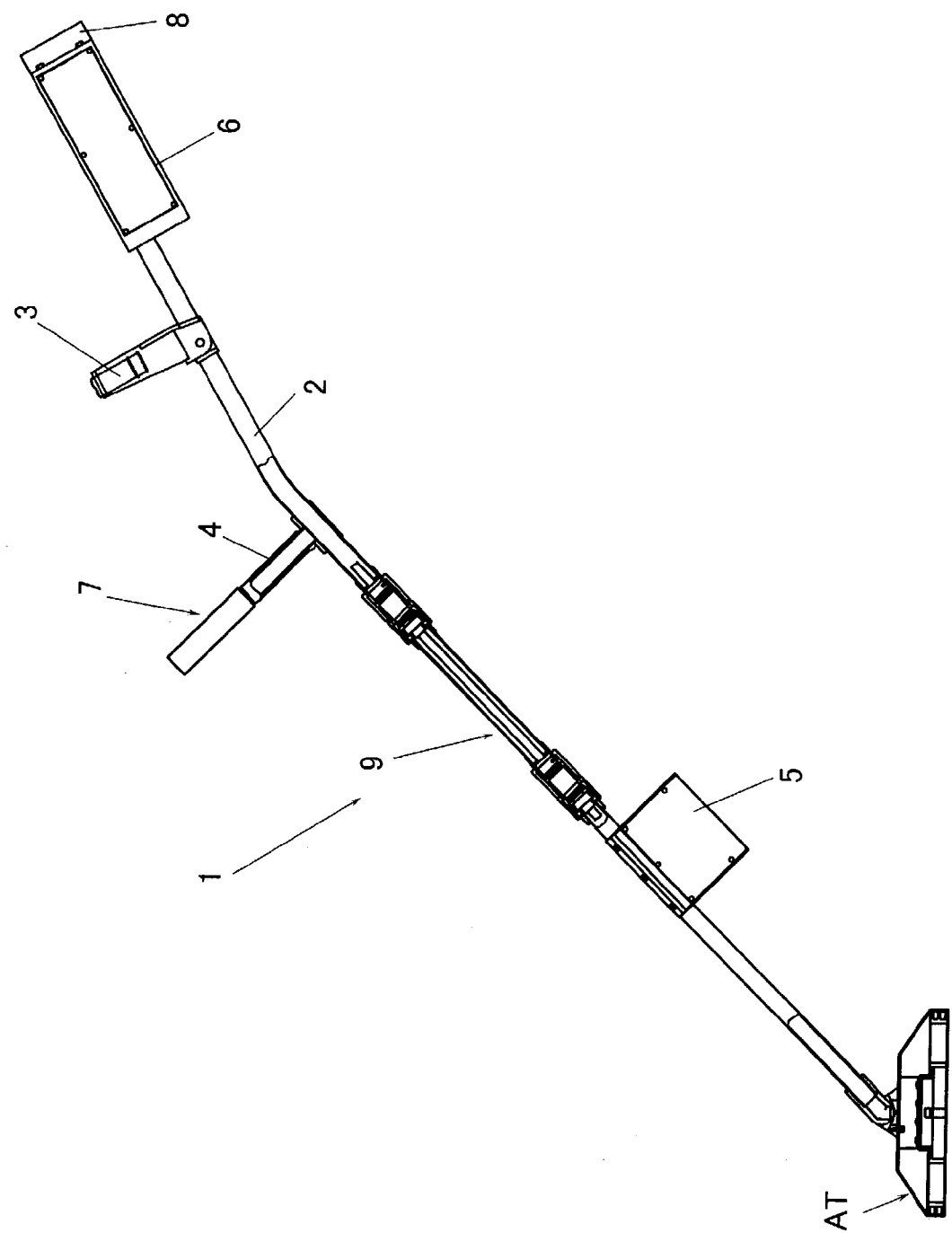
FIG. 4 is a side view of the electromagnetic prober according to the embodiment of the present invention.

According to a preferred embodiment of the present invention, an electromagnetic prober 1 is basically designed so as to be held by one hand for probing as shown in FIGS. 3 and 4, and includes an electromagnetic radar antenna AT provided at a lower end of a pipe shaft 2 having a generally chevron shape as seen from a lateral side, an arm holder 3 provided in an upper end portion for receiving an arm to be inserted therethrough, and a grip 4 to be held by one hand.

A signal processing unit 5 is provided in the shaft 2 above the electromagnetic radar antenna AT, and a central processing unit 6 having a CPU is provided at an upper end of the shaft 2. A display operation section 7 having a color liquid crystal display device and a plurality of switches is provided at an upper end of the grip 4, and configured so that probe settings and measurement results can easily be viewed.

A counter weight 8 for weight balancing is provided at an end of the central processing unit 6, so that the prober 1 can easily be held by one hand. The pipe shaft 2 includes a shaft adjusting portion 9 for variably setting the length of the pipe shaft 2, so that the length of the shaft can properly be set according to the height of an operator of the prober.

Figure 29:
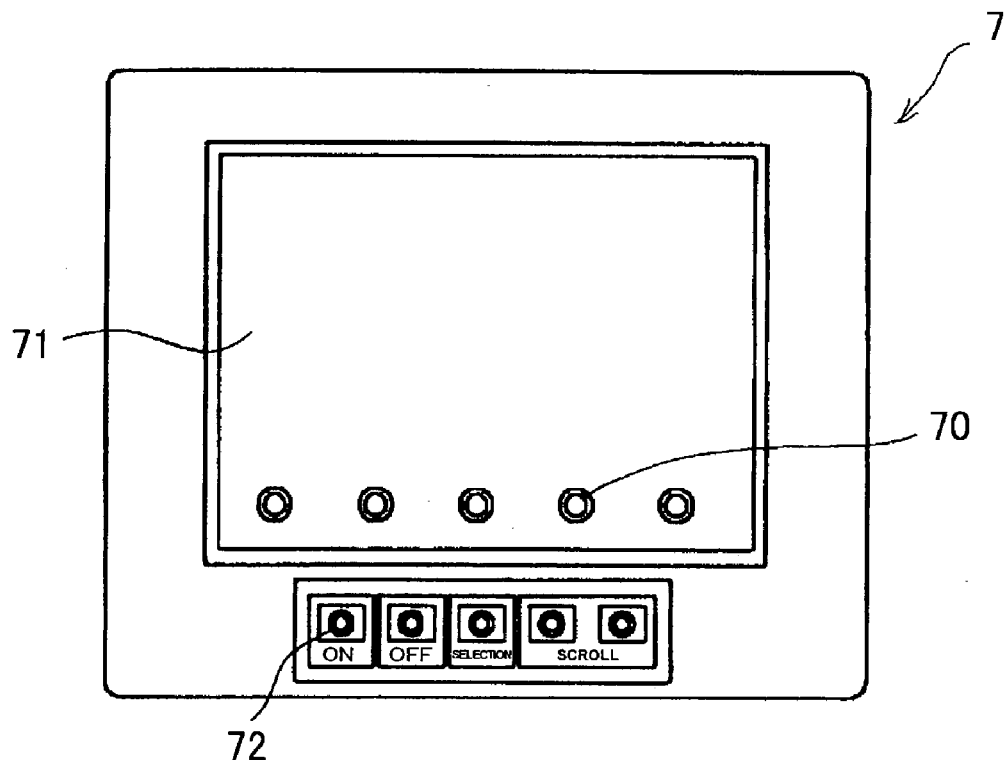
FIG. 29 is a plan view of a display device of the electromagnetic prober.

As shown in FIG. 29, the display operation section 7 of the prober 1 includes a color liquid crystal display device 71 having a touch panel 70 and a plurality of operation switches 72 for power on (start), power off (stop) and other various setting operations.

On the liquid crystal display device 71, probing results can be displayed switchably in various modes and various setting operations can be performed by operating the touch panel according to the display. The prober 1 according to this embodiment has various display modes, for example, an A-scope mode, a B-scope mode and a water leakage probing mode. These display modes are effectuated on the basis of programs implemented by the CPU of the central processing unit 6.

Figure 30:
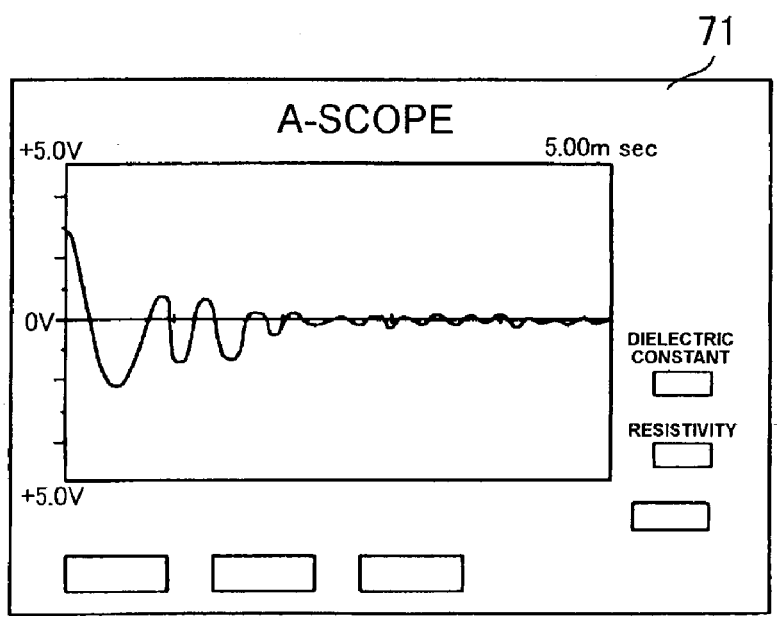
FIG. 30 is an explanatory diagram illustrating an exemplary screen image displayed in an A-scope mode.
Figure 31:
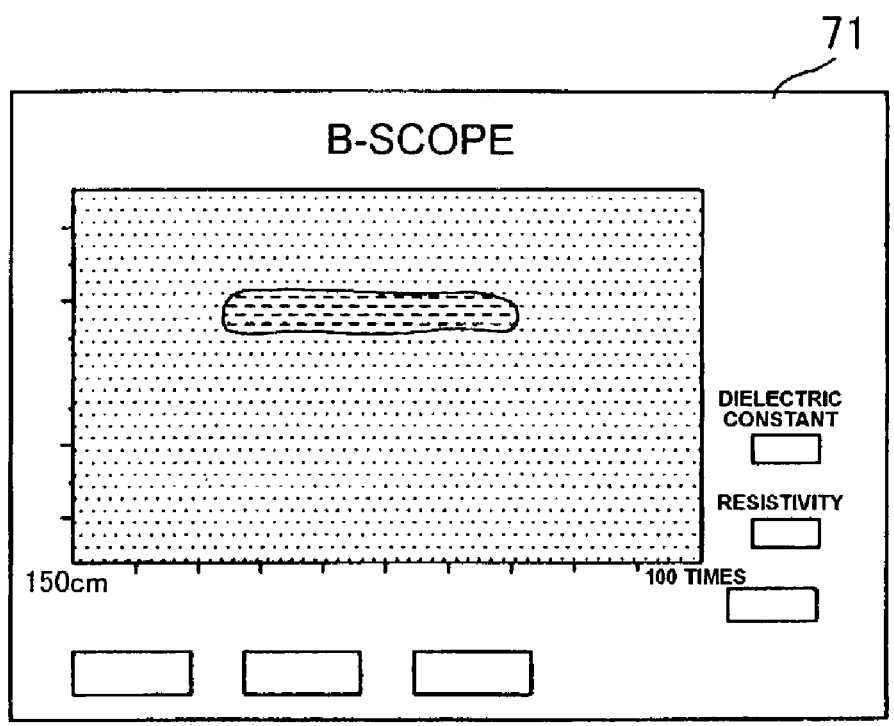
FIG. 31 is an explanatory diagram illustrating an exemplary screen image displayed in a B-scope mode.

In the A-scope mode, a reception signal (analytic signal) is displayed as a reception waveform with respect to a time axis and an amplitude axis as shown in FIG. 30.

In the B-scope mode, reception signals (analytic signals) are processed to determine specific dielectric constants (cycle periods of the reception signals) along the depth, and a color-coded depth image is displayed in a screen according to the specific dielectric constants with the number of times of scanning (scanning distance) and the depth plotted as abscissa and ordinate, respectively.

In the water leakage probing mode, an A-scope waveform diagram 11 representing the A-scope waveform of the reception signal (analytic signal) with the time axis longitudinally directed, a dielectric constant distribution diagram 12 representing dielectric constants at respective depth levels in a medium along the depth in the ground on a color-bar-coded basis, and a water leakage judgment diagram 13 indicating the presence or absence of water leakage in respective ranges along the depth in the ground are displayed on the liquid crystal display device 71. Further, an average dielectric constant in a range specified by a cursor 14, maximum and minimum dielectric constants in all the ranges, various measuring conditions, a total depth to a position specified by the cursor 14 and the number of times of measurement are also displayed in the screen in the water leakage probing mode.

Figure 5:
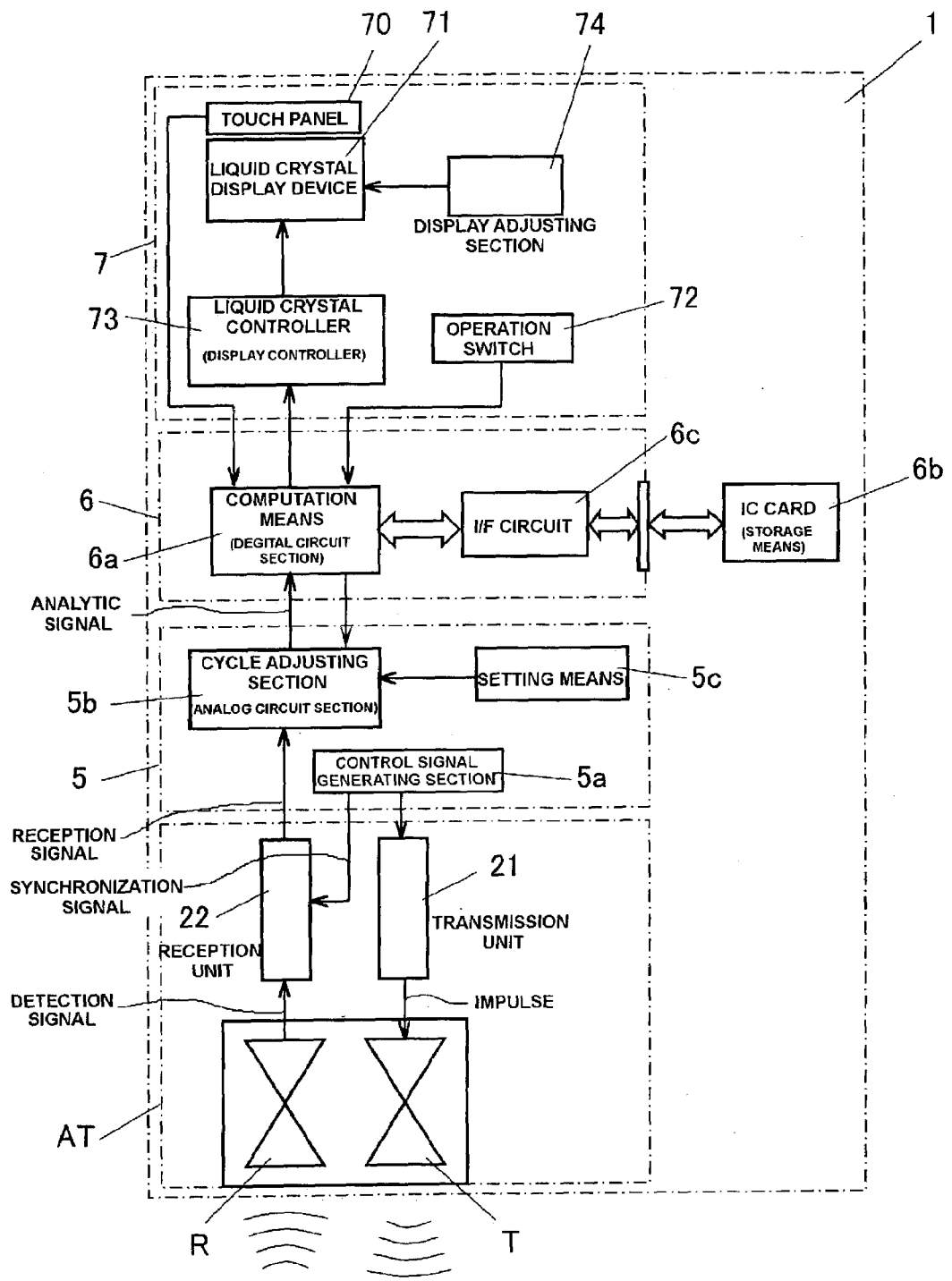
FIG. 5 is a block diagram of the major construction of the electromagnetic prober according to the embodiment of the present invention.

FIG. 5 is a block diagram illustrating the basic construction of an electrical circuit of the prober 1. As shown, the prober 1 includes an antenna unit AT, a signal processing section 5 (signal processing unit), a central processing section 6 (central processing unit) having computation means 6a and storage means 6b, and the display operation section 7. A reception unit 22 and the signal processing section 5 constitute a reception signal processing section for generating an analytic signal on the basis of a detection signal of the antenna. The central processing section 6 constitutes an analytic processing section.

In the antenna AT, a transmission unit 21 (transmission circuit), the reception unit 22 (reception circuit), and a transmission antenna T and a reception antenna R provided on the same board are incorporated in a shield case to be described later. In the antenna unit AT, the transmission antenna T for radiating electromagnetic radiation in a predefined cycle and the reception antenna R for receiving an echo of the radiate electromagnetic radiation are integrally incorporated in adjoining relation. The transmission unit 21 and the reception unit 22 may be constituents of the signal processing section 5.

The transmission unit 21 is adapted to apply an impulse and a bias to the transmission antenna T. A control signal is supplied to the transmission unit 21 from a control signal generating section 5a (signal processing circuit) of the signal processing section 5 to apply the impulse and the bias to the transmission antenna T. In this embodiment, the control signal is supplied to the transmission unit 21 so that a multiplicity of identical electromagnetic waves (e.g., 2048 electromagnetic waves) are radiated from the transmission antenna at a predefined interval for generation of a single reception waveform. The reception unit 22 is adapted to sample echoes corresponding to the multiplicity of impulses (transmission electromagnetic waves) under delay control of sampling points for the generation of the single reception signal waveform.

The reception unit 22 is adapted to perform a preprocessing operation on the detection signal captured by the reception antenna R for amplifying and outputting a reception signal having a frequency reduced through frequency conversion of the detection signal captured by the reception antenna R with the use of a reception synchronization signal transmitted from the signal processing unit 5. This is because the prober 1 according to this embodiment is intended for mainly probing into a medium having a specific dielectric constant of about 3 to about 50 and requires an analytic signal having a linear relationship between the square root of a specific dielectric constant and the cycle period of a reception signal, and it is assumed that the antenna detection signal has a frequency of about 500 MHz to about 1.5 GHz, making it difficult to perform the signal processing directly on the detection signal. In this embodiment, therefore, the frequency of the antenna detection signal (echo) is reduced prior to a process in a cycle adjusting section 5b, and the preprocessing operation is performed in the reception unit 22 to provide an analytic signal having a cycle period according to the specific dielectric constant in the medium.

Figure 6:
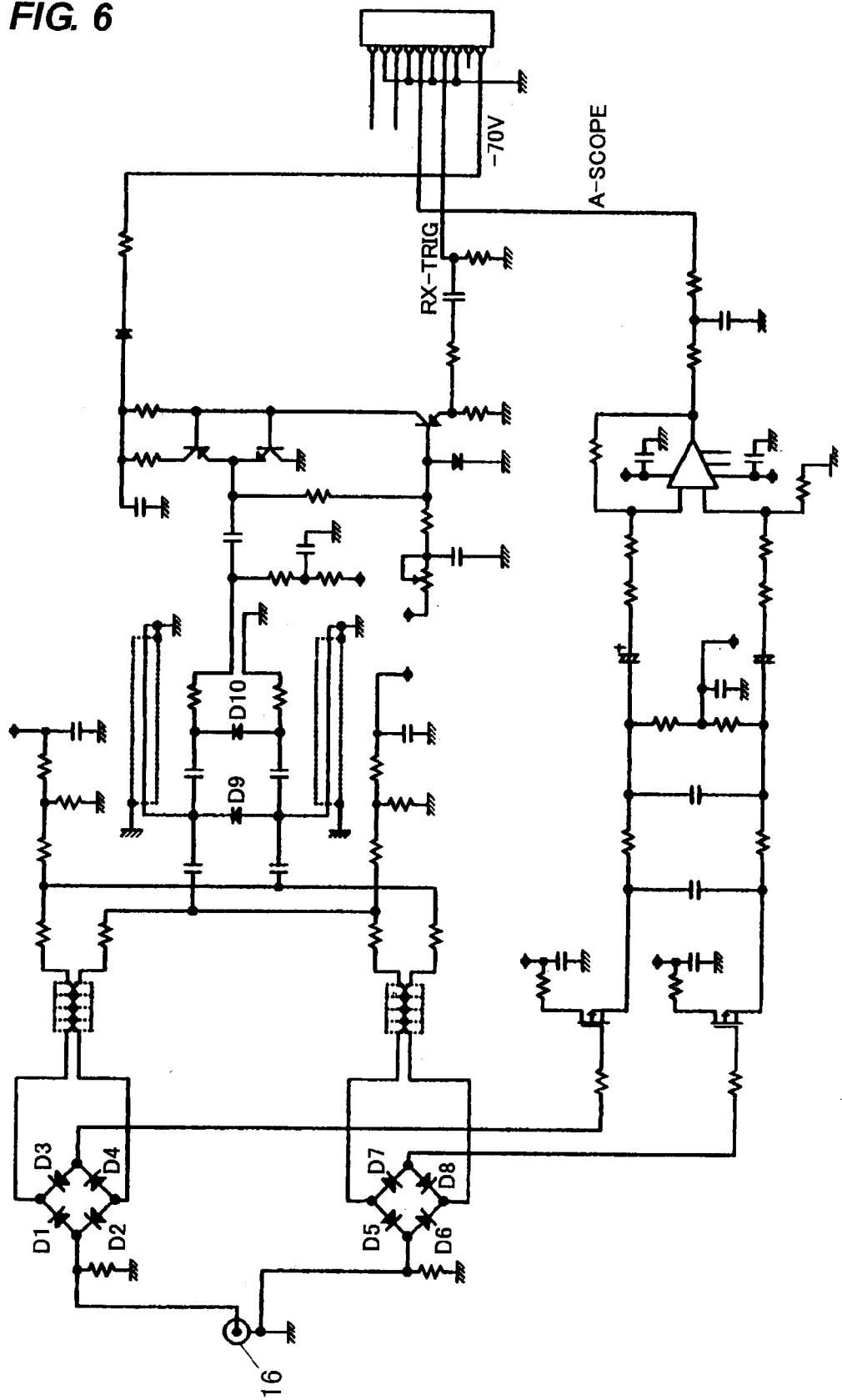
FIG. 6 is a diagram of the construction of a reception circuit of a reception unit.

As shown in FIG. 6, the reception unit 22 is a detection circuit including an inputting section (RX-TRIG) for inputting a reception synchronization signal, an inputting section 16 for inputting the detection signal of the reception antenna R, a pair of conversion bridges D1 to D4 and D5 to D8 for sampling the detection signal of the reception antenna, diodes D9 and D10 for generating conversion pulses (see FIG. 8) to be supplied to the conversion bridges on the basis of the reception synchronization signal S2, and an A-SCOPE outputting section for outputting the reception signal frequency-converted to not higher than several MHz.

Figure 7:
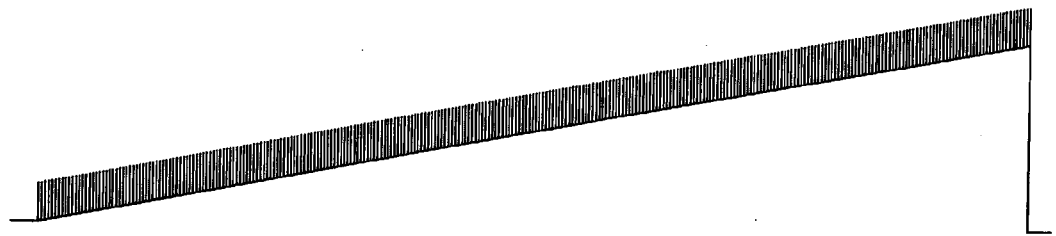
FIG. 7 is a waveform diagram of a sampling signal supplied to the reception unit.

The reception synchronization signal is employed as a control signal for the sampling and, more specifically, is provided by superposing a multiplicity of isochronal pulse signals corresponding to the multiplicity of transmission impulses on a triangular signal as shown in FIG. 7.

In FIG. 6, high-speed Schottky barrier diodes are employed as the diodes D1 to D4 and the diodes D5 to D8. Further, this embodiment features that the operation points of the modulation bridges respectively constituted by the diodes D1 to D4 and the diodes D5 to D8 are automatically changed according to the frequency of the detection signal of the reception antenna by employing the high-speed Schottky barrier diodes as the diodes D9, D10 for generating conversion pulses from the reception synchronization signal S2. The conventional electromagnetic prober which employs step recovery diodes capable of generating steep conversion pulses of several nanoseconds to one nanosecond (nsec) or shorter as the diodes D9 and D10 are advantageous in that the detection signal of the antenna can be reproduced with a relatively high fidelity. In the inventive electromagnetic prober designed so that the frequency of the echo received by the reception antenna is significantly fluctuated according to the dielectric constant in the medium, a waveform indicative of an echo at a relatively great depth appears in the A-scope waveform when the frequency of the echo (the frequency of the detection signal of the reception antenna) is high or the dielectric constant in the medium is small, but only a 3- to 4-cycle waveform appears in the A-scope waveform when the frequency of the echo is low or the dielectric constant in the medium is great. Therefore, the probing is permitted only to a smaller depth level.

Figure 8:
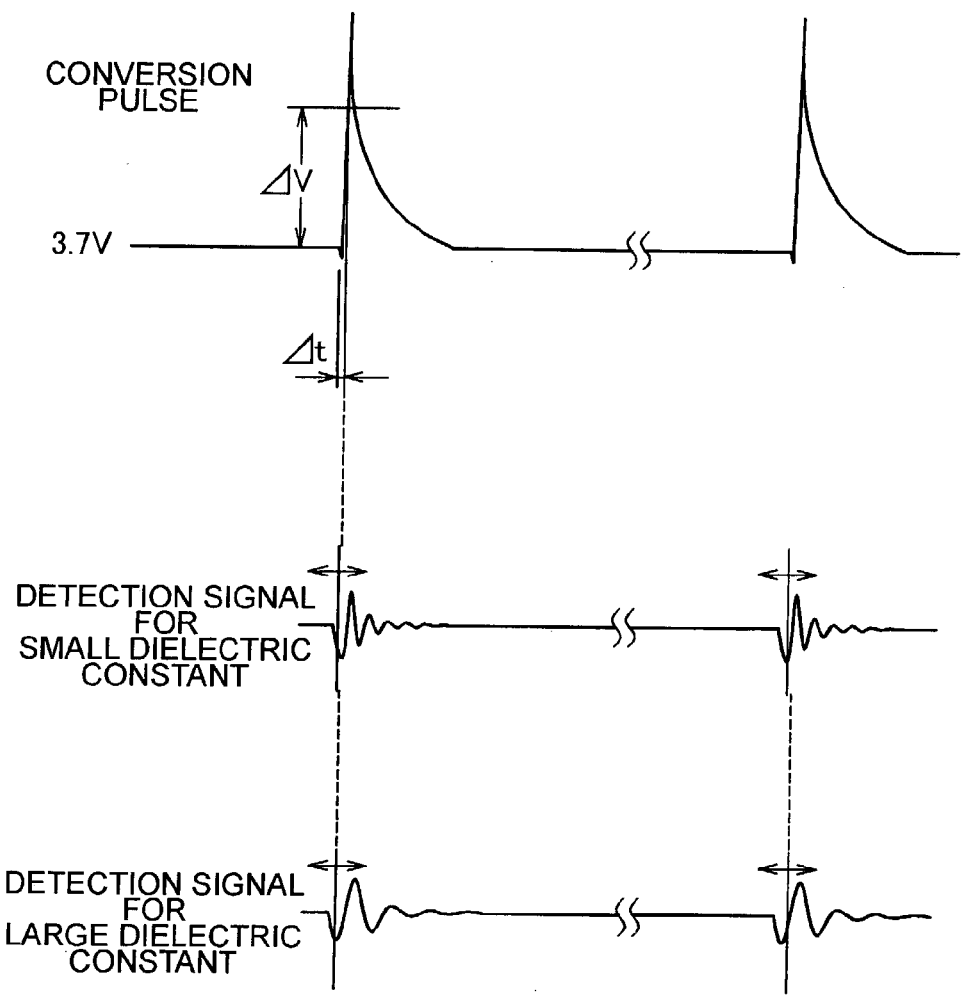
FIG. 8 is a waveform diagram for explaining a correlation between a sampling pulse supplied to a diode bridge and a detection signal of an antenna.
Figure 9:
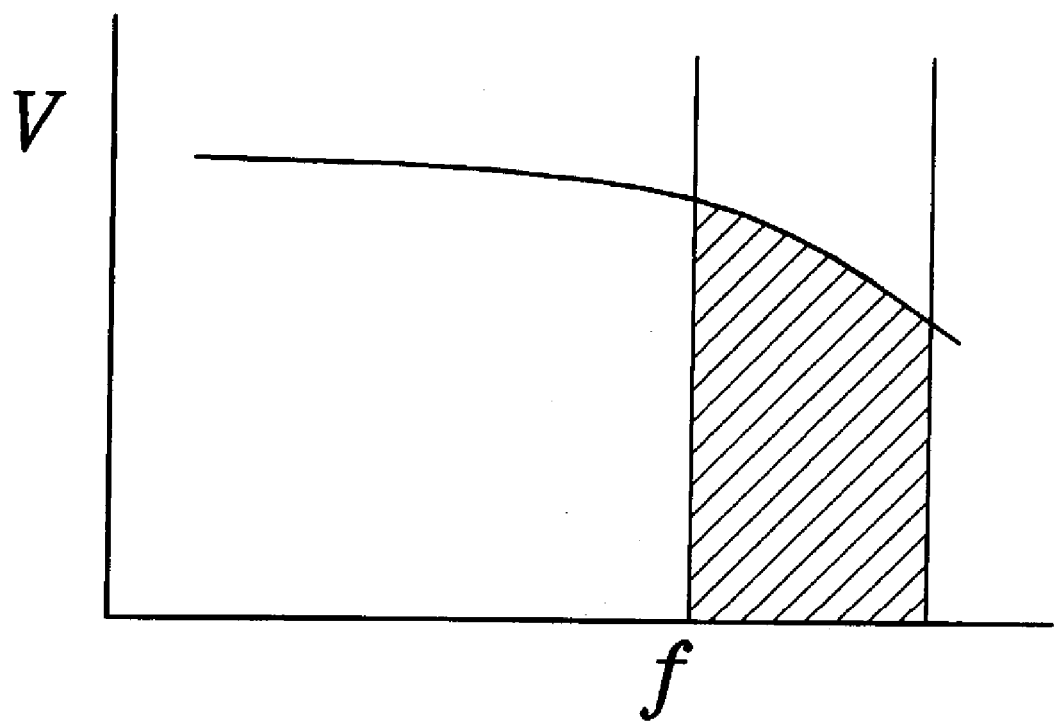
FIG. 9 is a graph illustrating the frequency characteristic of a diode employed in a detection circuit.
Figure 10:
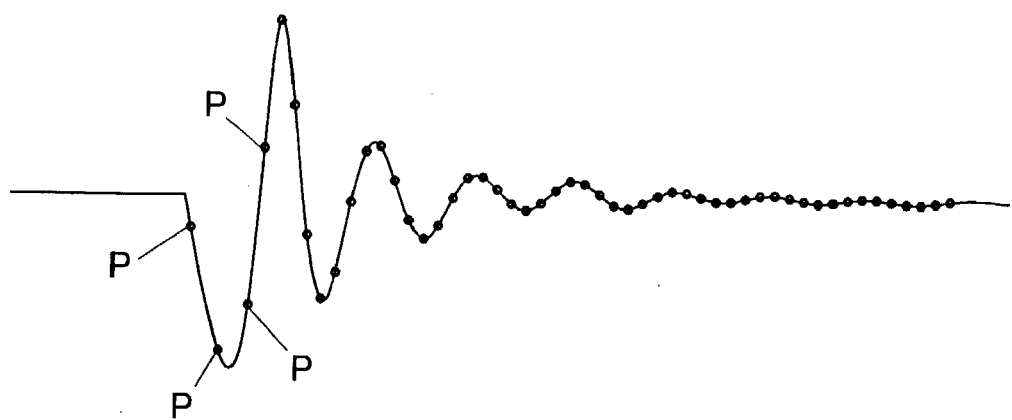
FIG. 10 is a waveform diagram illustrating sampling timing where the frequency of the detection signal of the antenna is relatively high.
Figure 11:
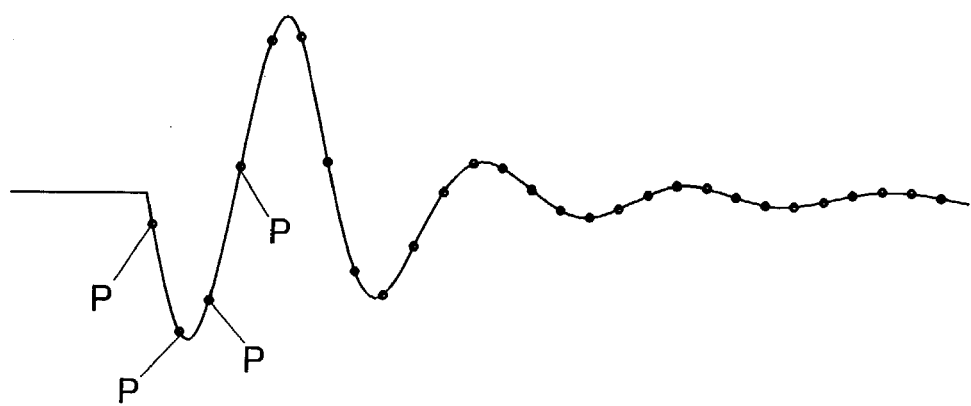
FIG. 11 is a waveform diagram illustrating sampling timing where the frequency of the detection signal of the antenna is relatively low.
Figure 12:
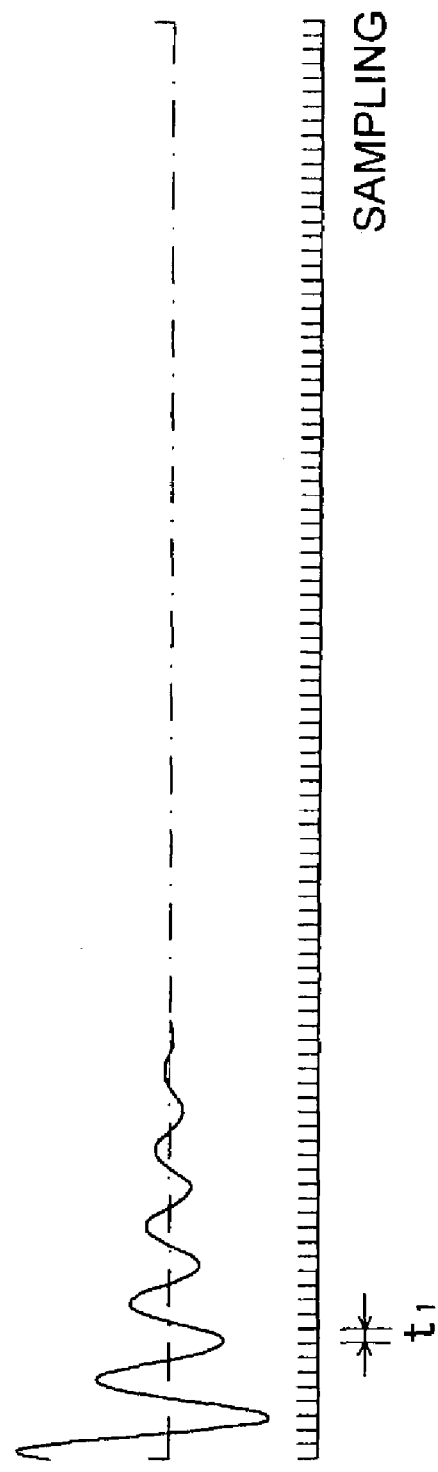
FIG. 12 is an explanatory diagram illustrating a reception signal sampling state in the case of a medium having a low specific dielectric constant.

In this embodiment, the Schottky barrier diodes D9 and D10 are employed for the generation of the conversion pulses so that a time Δt required to reach an activation level ΔV of the diodes D1 to D8 at a rising edge of a conversion pulse is automatically changed as shown in FIG. 8, and the diodes D1 to D8 of the conversion bridges are utilized in a frequency range (hatched in FIG. 9) where the operation points thereof are changed according to the frequency of the detection signal of the reception antenna. In practice, the diodes D1 to D8 are empirically selected so that the conversion bridges can perform the aforesaid operation. This arrangement makes the operation points of the modulation bridges vague, so that the sampling points are automatically changed according to the value of the dielectric constant as shown in FIG. 8. When the frequency of the detection signal of the reception antenna is high, time intervals between sampling points P are reduced as shown in FIG. 10. When the frequency of the detection signal of the reception antenna is low, time intervals between sampling points P are automatically increased as shown in FIG. 11. Then, a linear relationship is established between the cycle period of the reception signal (A-SCOPE output) outputted from the reception unit 22 and the square root of the dielectric constant in the medium.

Where an echo obtained by in-air radiation is received by the conventional electromagnetic prober and a reception signal is displayed as a waveform with respect to a predefined time axis and amplitude axis, an attenuated waveform as shown in FIG. 12 is obtained. On the other hand, where an echo from a medium having a specific dielectric constant $\in_r$ is received, the propagation speed of the electromagnetic radiation is reduced as compared with the in-air radiation. If the reception signal is displayed with the same time axis as in FIG. 12, the time required for the attenuation is prolonged as shown in FIG. 13.

However, the reception unit 22 positively utilizes the frequency characteristics of the Schottky barrier diodes (SBD) and non-linear ON characteristics in combination in this embodiment as described above, whereby a signal having a predefined relationship between the specific dielectric constant in the medium and the cycle period is preliminarily outputted. As described above, the detection signal is sampled at a time interval determined by the SBD characteristics according to the inclination (ΔV/t) of the detection signal output level V to the time t, and a peak value or an average value are held. Thus, a series of operations are performed for generating the reception signal having a reduced frequency.

Figure 13:
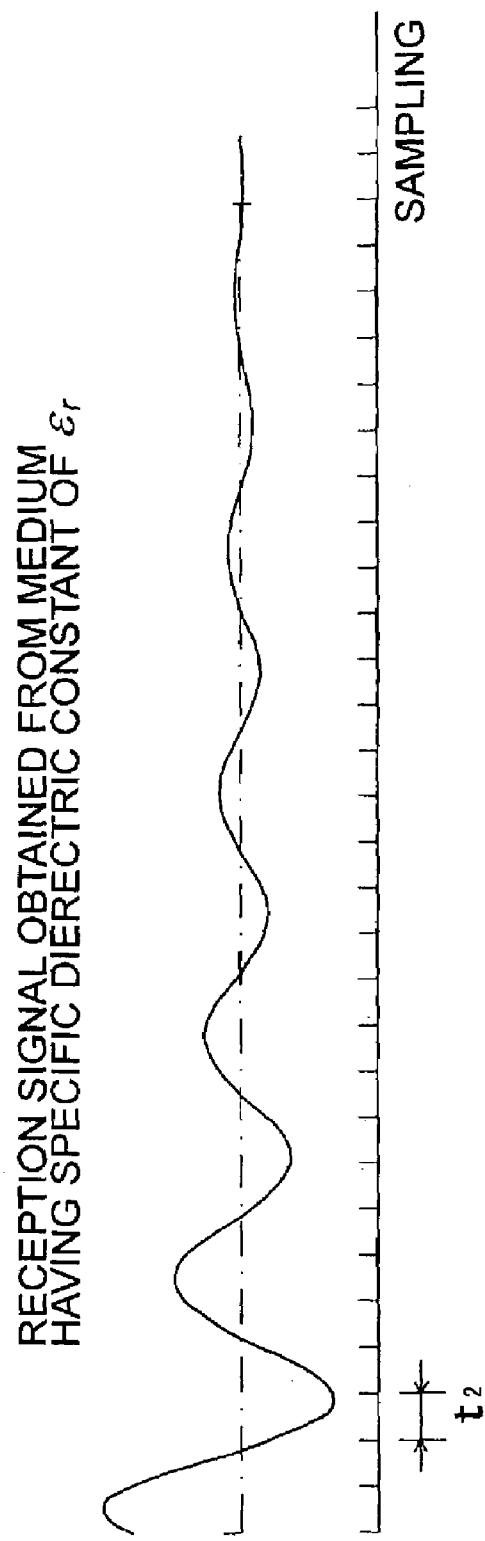
FIG. 13 is an explanatory diagram illustrating a reception signal sampling state in the case of a medium having a high specific dielectric constant.

As shown in FIGS. 12 and 13, the sampling time intervals (t1, t2) are changed according to the cycle period of the detection signal by utilizing the SBD characteristics, whereby an analytic signal having a reduced frequency can be obtained without any inconvenience, e.g., without termination of the sampling during the attenuation of the signal, even in the case of a reception signal obtained from a medium having a higher specific dielectric constant. In this embodiment, the reception signal is generated through an analog process upon reception of the control signal transmitted from the signal processing circuit 5a of the signal processing section 5 by the reception unit 22. Alternatively, the generation of the reception signal may be achieved through a digital process.

The signal processing unit 5 includes an analog circuit section 5b connected to the antenna unit AT for performing an analog signal processing operation, setting means 5c for setting the circuit constant of the analog circuit section 5b to a predefined level, and the control signal generating section 5a which outputs a pulse signal to the transmission unit 21 of the antenna AT for generation of impulses upon reception of a control signal transmitted from the central processing unit 6 and outputs a reception synchronization signal to the reception unit 22 of the antenna AT upon reception of a control signal transmitted from the central processing unit 6.

The analog circuit section 5b preprocesses the reception signal transmitted from the reception unit 22 and outputs the preprocessed signal as an analytic signal to the central processing unit 6. In this embodiment, the analog circuit section 5b functions as the cycle adjusting section (frequency conversion circuit) for performing a cycle adjusting operation on the reception signal transmitted from the reception unit 22 through frequency conversion to generate the analytic signal. The setting means 5c is adapted to variably set the frequency conversion constant of the cycle adjusting section 5b. The respective components of the signal processing section 5 are connected to the control signal generating section 5a, and operative upon reception of necessary control signals and the like.

The cycle adjusting section 5b receives the analog reception signal transmitted from the reception unit 22, and changes the cycle period of the reception signal according to the setting of the setting means 5c for changing a correlation between the cycle period of the reception signal and the time axis. In this embodiment, these adjusting operations are mainly performed on an analog basis. That is, the analytic signal outputted from the cycle adjusting section 5b is displayed on the display section 7 via the computation means 6a, and a sweeping speed is changed along the time axis of the analytic signal by adjusting a semi-fixed resistor as the setting means 5c for the adjustment of the cycle period, i.e., for calibration for the specific dielectric constant.

The central processing unit 6 includes a digital circuit section 6a (computation means) for causing the CPU to perform a program-based process, and an I/F circuit 6c for transmission and reception of data with respect to an IC card 6b (storage means) for storing data such as reception signals.

The digital circuit section 6a is adapted to perform a digital processing operation, and has an analog/digital converting section to which an analog reception signal is inputted as the analytic signal from the signal processing section 5. The digital circuit section functions to convert the analog analytic signal transmitted from the signal processing section 5 into digital data, so that the reception signal transmitted from the signal processing unit 5 is A/D-converted (analog-to-digital-converted) and stored as digital data. Then, the digital circuit section performs a program-based process on the stored reception signal data for necessary signal processing. Thus, the analytic signal is computed on the basis of measurement condition data stored in the storage means 6b for generation of analytic data. The computation means 6a transmits the signal-processed data to the display section 7 and causes the display section 7 to display the data. For example, the analytic signal is subjected to a computation according to a display mode set in the prober 1 for the generation of the analytic data, and the results of the probing is displayed on the basis of the generated analytic data.

The digital circuit section 6a stores a reference dielectric constant, a reference cycle period and other necessary sample data in the IC card 6b as an external storage medium via the I/F circuit 6c, and reads the stored data from the IC card for signal processing. The central processing section 6 is programmed so as to display a setting screen on the display device 71 by operating the operation switches 72 in a predefined manner and set the reference dielectric constant and the reference cycle period in the setting screen by using the operation switches 72. This provides reference dielectric constant setting means and reference cycle period setting means.

The IC card 6b is constituted by a RAM powered by a button battery for data retention or an EEPROM requiring no backup power source, and has a memory capacity of 2 MB, 4 MB, 8 MB or 16 MB depending on the amount of data to be stored therein.

In this embodiment, a reception signal processing apparatus is mainly constituted by the central processing unit 6, and phase correction means, amplitude correction means and differential signal extraction means are implemented by program-based processes to be performed by the digital circuit section 6a of the central processing unit 6.

The amplitude is isochronously sampled 512 times in a predefined time frame containing the entire reception signal waveform and stored as digital data having a resolution of 12 bits through the program-based A/D converting process performed by the digital circuit section (reception signal processing apparatus) 6a. Thus, single reception signal data is stored as 512 amplitude data pieces sequentially arranged.

A phase correction by the phase correction means is achieved by causing the CPU to perform a program-based process on the reception signal data stored in the digital circuit section 6a. That is, the sequentially arranged amplitude data pieces in the reception signal data to be subjected to the phase correction are sequentially retrieved, and amplitude data pieces each having the second peak absolute value and their data numbers are determined.

Then, the data number at the second peak point of a reception signal to be phase-shifted is matched with the data number at the second peak point of a reference reception signal, whereby the reception signal data is correlated with the reference reception signal. Amplitude data pieces of data numbers of the reception signal falling outside a range between the first data number and the last data number of the reference reception signal are deleted, and null amplitude data is allocated to data numbers of the reception signal having no amplitude data within the range between the first data number and the last data number of the reference reception signal. Thus, reception signal data including 512 amplitude data pieces is newly generated.

Through the aforesaid data processing, the phases of the reception signals at the second amplitude peak points can be matched with each other.

Like the phase correction means, first and second amplitude correction means are implemented by causing the CPU to perform program-based processes on the reception signal data stored in the digital circuit section 72a.

In this embodiment, a first amplitude correction is made by comparing an amplitude at the second peak point of a reception signal E to be subjected to the amplitude correction with an amplitude at the second peak point of a reference reception signal $E_0$, and performing a computation on amplitude data pieces following the second peak point with the use of a weighting factor according to the ratio of the amplitudes.

Further, amplitude correction data represented by the time axis and a predefined amplification degree is preliminarily stored in the digital circuit section 6a, and a second amplitude correction is made by correlating the time axis of the amplitude correction data with the data numbers and performing a computation on amplitude data pieces following the second peak point with the use of the predefined amplification degree.

Like the phase correction means, the differential signal extraction means is implemented by performing a program-based process on the reception signal data stored in the digital circuit section 6a.

In this embodiment, a differential signal component is extracted by computing a difference between each pair of amplitude data pieces at the same data number in the reception signal data subjected to the phase correction and the amplitude correction.

The display operation section 7 includes the liquid crystal display device 71, a liquid crystal controller 73 for driving the liquid crystal display device 71 upon reception of a control signal of the digital circuit section 6a, and the touch panel 70 and the operation switches 72 provided on the surface of the liquid crystal display device 71, and a display controlling section 74 for adjusting display positions on the display device 71.

For portability and transportability, a battery (not shown) is employed as a power source for driving the respective circuits.

Next, an embodiment of the antenna unit AT employed in the electromagnetic prober 1 will be described in detail with reference to the drawings.

Construction of Antenna Unit

Next, an embodiment of the antenna unit AT employed in the inventive electromagnetic prober will be described in detail with reference to the drawings. The antenna unit AT according to the present invention has a rectangular box shape, and is covered with a disk-shaped housing. Electromagnetic radiation to be radiated from the antenna unit AT has a target frequency $f_0$ and a wavelength of $\lambda_0$.

Figure 36:
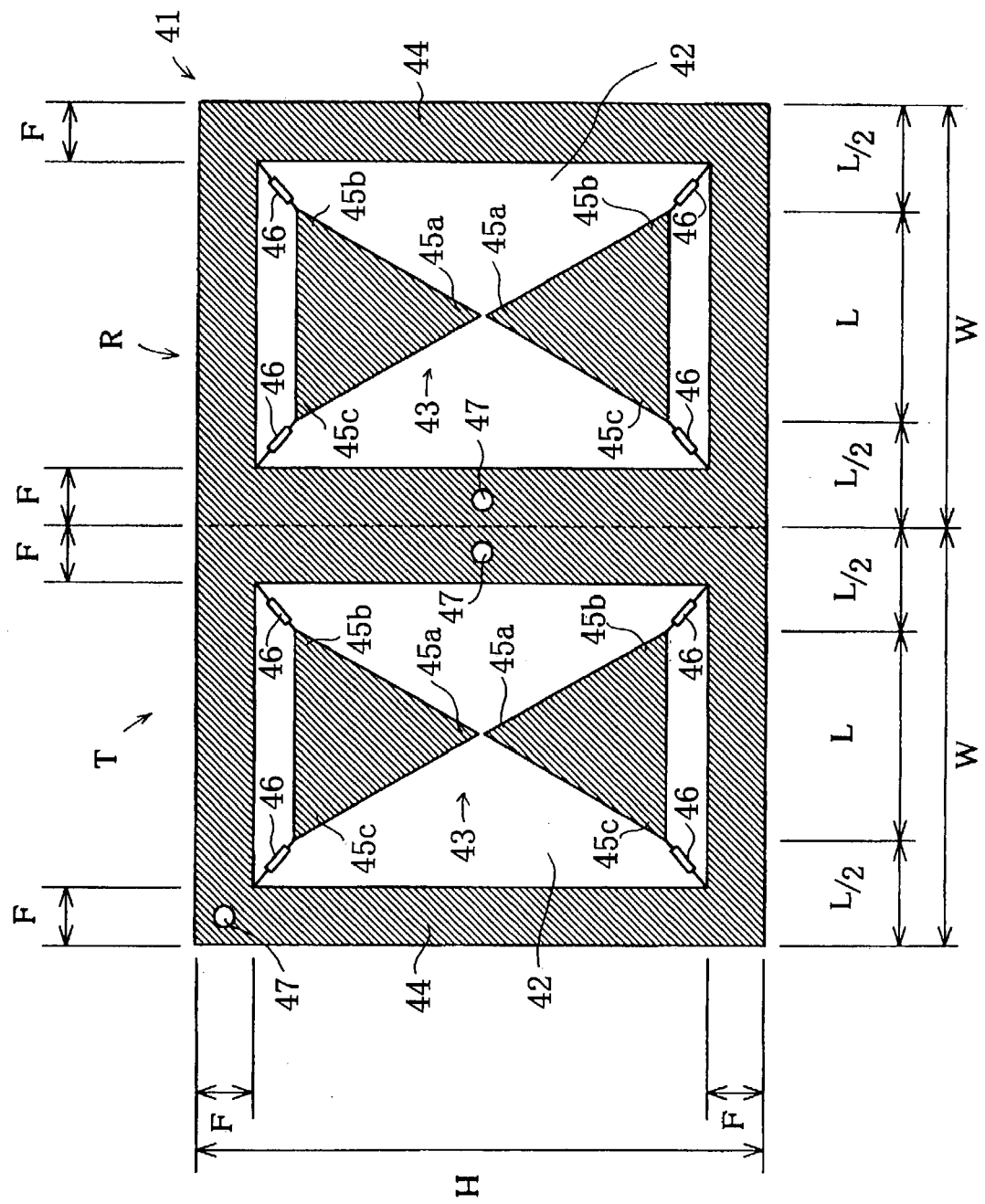
FIG. 36 is a plan view of an antenna board of an antenna unit employed in the prober according to the present invention.

As shown in FIG. 36, an antenna board 41 is of a rectangular shape having a length H and a width $2W(=2\lambda_0)$. A transmission antenna T and a reception antenna R having the same configuration are integrally provided on the same board in laterally symmetrical relation. For explanation of the antenna board 41, the transmission antenna T will be described which accounts for half the total size of the board. The antenna board 41 is produced by etching away an unnecessary portion of a copper foil formed on the surface of a substrate 42 of a glass epoxy resin to leave a transmission antenna device 43 and a grounding conductor 44.

In the transmission antenna T, the transmission antenna device 43 includes antenna elements 45, 45 each formed of an equilateral-triangular copper foil having an edge length L and arranged in a bow-tie configuration with vertices 45a, 45a thereof opposed to each other in a center portion of the substrate 42 having a length H and a width $W(=\lambda_0)$. The grounding conductor (copper foil) 44 has a width F and is provided in a rectangular looped configuration symmetrical with respect to the front-and-back and right-and-left sides on the substrate 42 along the periphery of the substrate as surrounding the transmission antenna device 43. The antenna elements 45, 45 are isolated from each other with the vertices 45a, 45a thereof slightly spaced from each other. Power supply lines to be described later are respectively soldered to the vertices 45a, 45a.

The edge length L of each of the antenna elements 45 is equal to ½ of the width W of the substrate 42, i.e., ½ of the wavelength $\lambda_0$. Suppressive resistors 46 for suppressing parasitic vibrations are provided between the grounding conductor 44 and the vertices 45b, 45b, 45c, 45c of the antenna elements 45 by soldering.

The width F of the grounding conductor 44 is not particularly limited, as long as the grounding conductor is symmetrically provided on the substrate 42. In consideration of the conductivity when the substrate 42 is attached to the shield case to be described later, the width F is greater than the width of a bent mounting face of the shield case.

The length H of the transmission antenna T is not particularly limited, but is set greater than the total length of the transmission antenna device 43 plus twice the width F of the grounding conductor 44.

Openings 47 formed in the grounding conductor 44 are screw insertion holes for fixing the antenna board 41 to the shield case 48 as will be described later.

Figure 37:
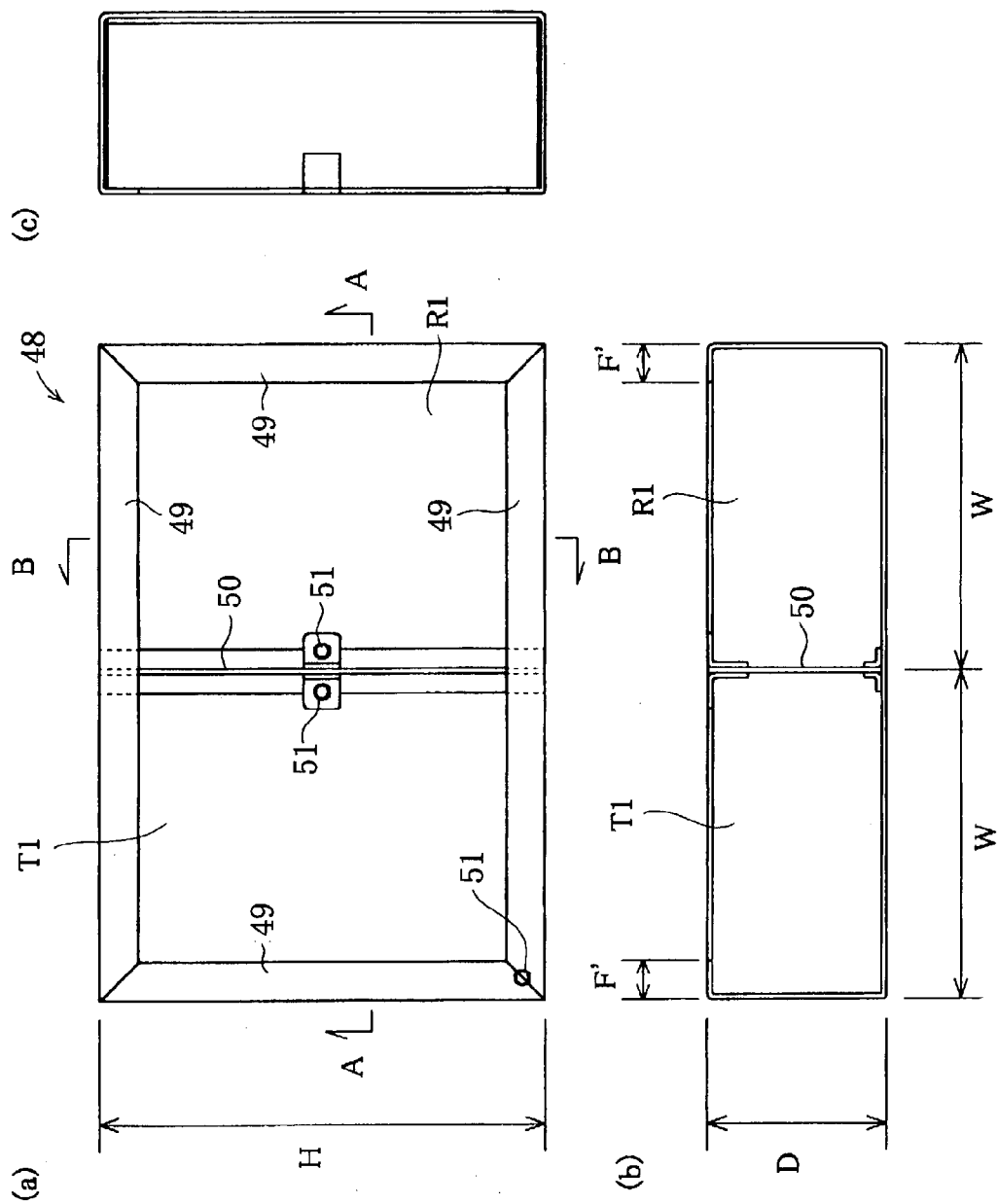
FIG. 37 illustrates a shield case to be attached to the antenna board, wherein (a), (b) and (c) are a plan view, a front view and a side view thereof, respectively.

As shown in FIG. 37, the shield case 48 is formed of an aluminum material having a thickness t of 1.2 mm, and has a rectangular box shape having a length H, a width $2W(=2\lambda_0)$ and a depth D. A bent portion 49 having a width F' is provided along the entire peripheral edge of an upper opening. The antenna board 41 is fixed to the bent portion 49 with the grounding conductor 44 thereof being in electrically conductive contact with the bent portion. The width F' of the bent portion 49 is set smaller than the width F of the grounding conductor 44.

The depth D is set to any of lengths of $\lambda_0/4$, $2\lambda_0/4$, $3\lambda_0/4$ and $4\lambda_0/4$ which are integral multiples of $\lambda_0/4$ wherein $\lambda_0$ is a wavelength at the target frequency $F_0$. The width D may be set to any of these lengths so as to maximize an output level at the target frequency $f_0$.

An aluminum shield plate (shield partition wall) 50 for reducing electromagnetic coupling between the transmission antenna T and the reception antenna R is provided longitudinally across the depth in a middle portion of the shield case 48. Thus, the shield case 48 is partitioned into a transmission side T1 and a reception side R1 by the shield plate 50.

In this embodiment, the shield plate 50 has a thickness t1 of 2 mm. Screws are inserted in screw holes 51 for fixing the antenna board 41.

Figure 38:
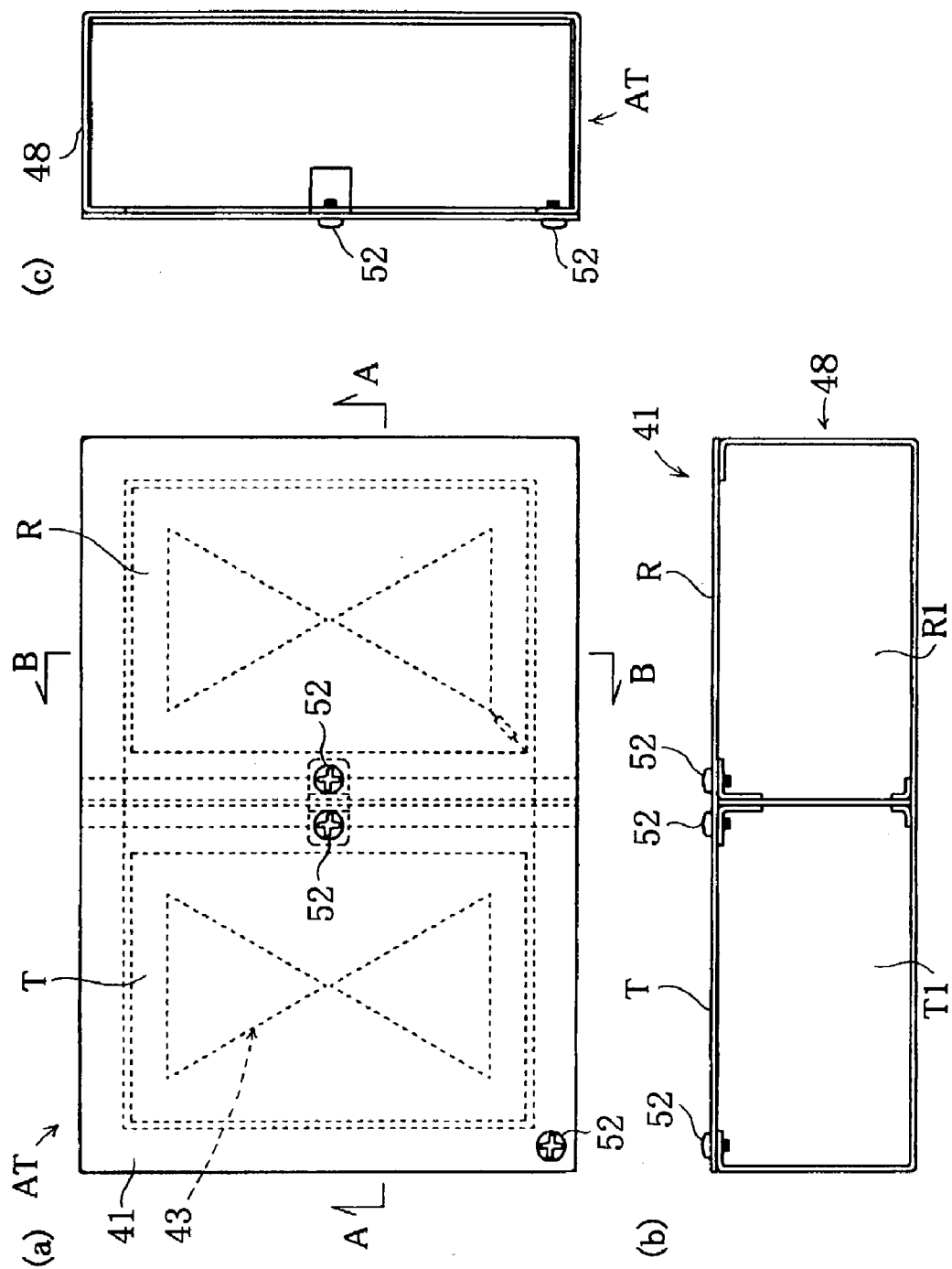
FIG. 38 illustrates the antenna unit employed in the prober according to the present invention, wherein (a), (b) and (c) are a plan view, a front view and a side view thereof, respectively.

FIG. 38(a) is a top view illustrating a state where the electromagnetic radar antenna AT, i.e., the antenna board 41, is attached to the shield case 48, and FIGS. 38(b) and 38(c) are sectional views as seen in an arrow direction A—A and in an arrow direction B—B, respectively, in FIG. 38(a).

The antenna board 41 is fixed to the screw holes 51 of the shield case 48 by three screws 52, so that a surface of the antenna board 41 formed with the transmission antenna device 43 and the grounding conductor 44 faces downward. Thus, the antenna board 41 is fixed with the grounding conductor 44 thereof being in electrically conductive contact with the bent portion 49 and the shield plate 50.

Thus, the transmission antenna T of the antenna board 41 is positioned as covering an opening of the transmission side T1 of the shield case 48, and the reception antenna R of the antenna board 41 is positioned as covering an opening of the reception side R1 of the shield case 48.

That is, the antenna AT is adapted to radiate electromagnetic radiation excited by the antenna board 41 integrated with the shield case 48 forwardly through the antenna board 41.

In this embodiment, the transmission and reception units, electromagnetic radiation absorbers and power supply lines are simultaneously incorporated before the antenna board 41 is fixed to the shield case 48.

A procedure for incorporating these components will hereinafter be described with reference to an exploded perspective view in FIG. 39.

Figure 39:
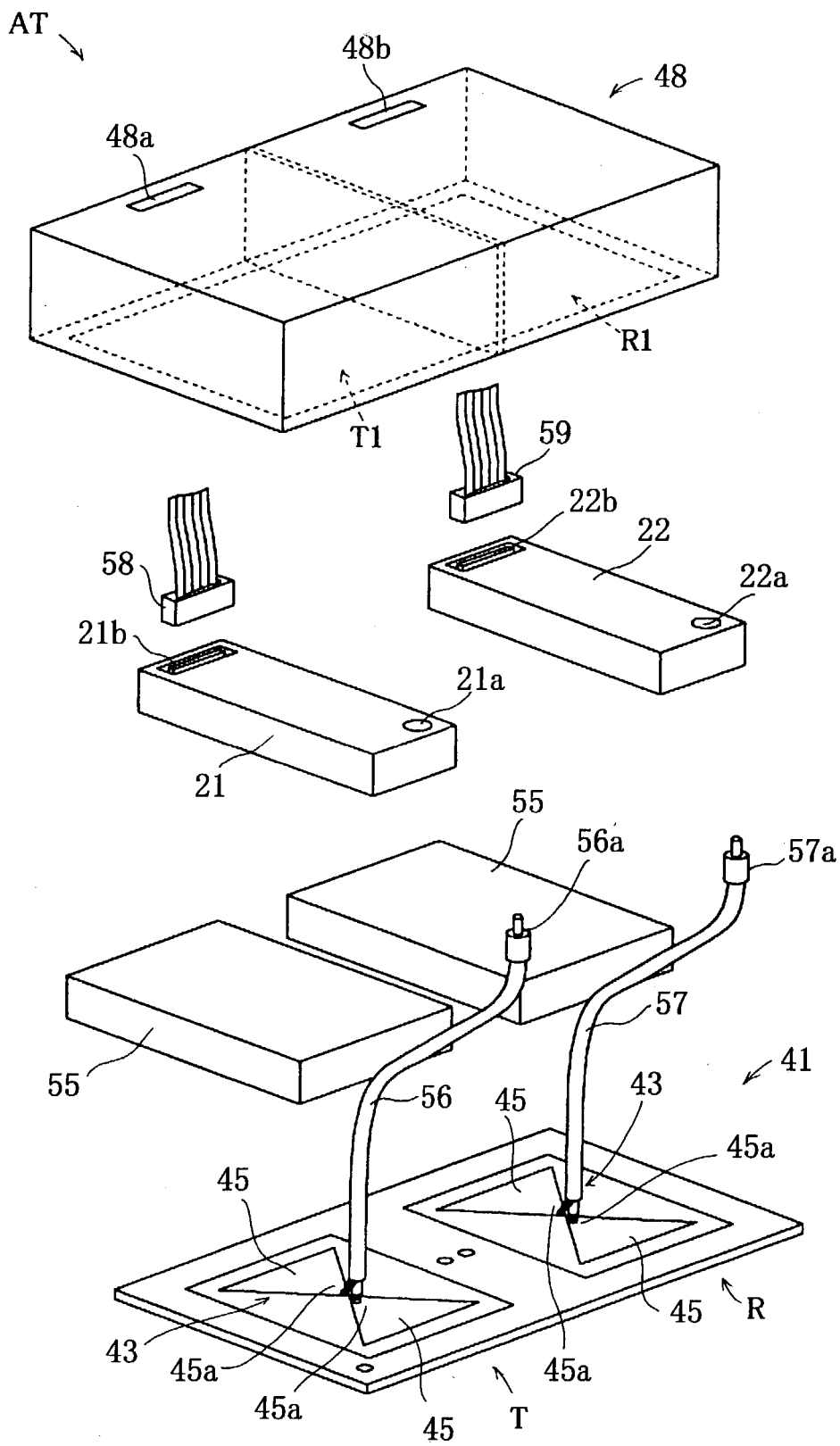
FIG. 39 is an exploded perspective view illustrating the internal construction of the antenna unit.

As shown in FIG. 39, the transmission unit 21, the reception unit 22 and electromagnetic radiation absorbers 55, 55 are accommodated in the shield case 48 on the transmission side T1 and the reception side R1 shielded from each other by the shield plate 50, and the antenna board 41 is fixed to the shield case as lidding the shield case.

A power supply line 56 and a power supply line 57 are respectively connected to the vertices 45a, 45a of the antenna elements 45 of the transmission antenna T and the reception antenna R of the antenna board 41.

That is, a coaxial cable is employed as the power supply line 56, and has a core line soldered to the vertex 45a of one of the antenna elements 45 and a shield line soldered to the opposed vertex 45a of the other antenna element 45. A pin connector 56a for high frequency is provided on the other end of the power supply line 56, and connected to a connector 21a on the side of the transmission unit 21 for supplying a DC bias and impulses to the transmission antenna device 43 from the transmission unit 21. The transmission unit 21 includes a connector 21b to be connected to a connector 58 for receiving power supply and control signals from a separate signal processing unit (not shown).

Similarly, a coaxial cable is employed as the power supply line 57, and has a core line soldered to the vertex 45a of one of the antenna elements 45 and a shield line soldered to the opposed vertex 45a of the other antenna element 45. A pin connector 57a for high frequency is provided on the other end of the power supply line 57, and connected to a connector 22a on the side of the reception unit 22 for transmitting reception signals captured by the reception antenna R to the reception unit 22. The reception unit 22 includes a connector 22b to be connected to a connector 59 for receiving reception synchronization signals and power supply from a separate signal processing unit (not shown) and outputting frequency-converted reception signals.

The shield case 48 has openings 48a, 46b through which wirings extend from the transmission unit 21 and the reception unit 22 so as to be connected to the control section.

The electromagnetic radar antenna AT according to the present invention thus has a light-weight structure such that the antenna board 41 is attached to the shield case 48 formed of the thin aluminum material and the transmission unit 21 and the reception unit 22 are accommodated in the shield case and, therefore, the weight thereof is much reduced as compared with the conventional antenna which places a priority on measures against unwanted radiation.

The structure which provides resonance by the antenna board 41 and the shield case 48 is free from a signal coupling failure (a failure in detection of natural waves), thereby ensuring stable transmission and reception.

Figure 40:
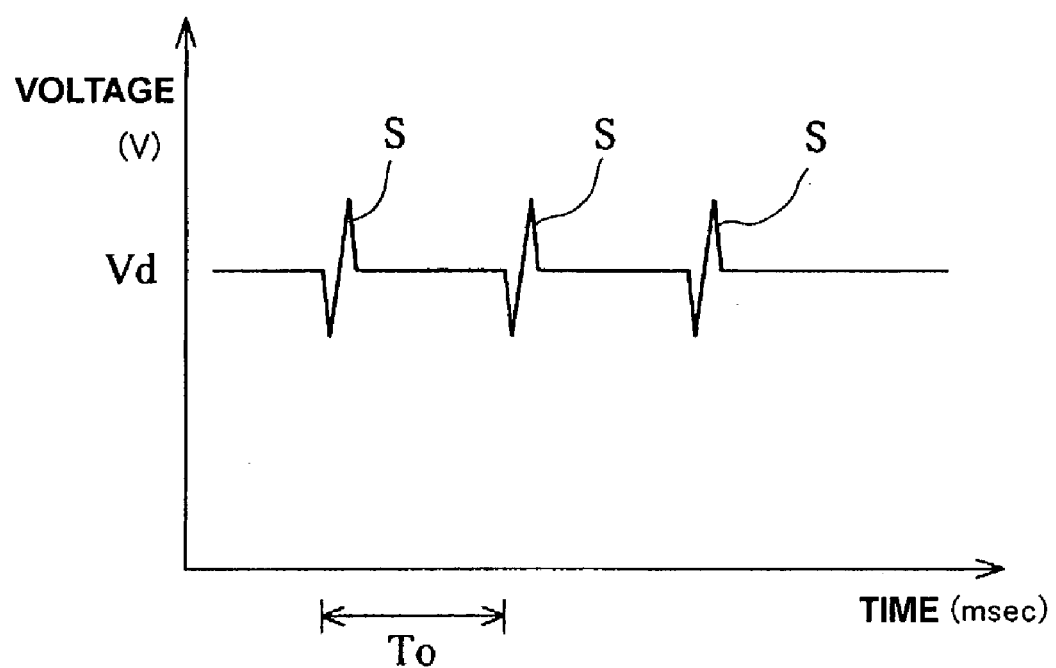
FIG. 40 is a schematic waveform diagram of a power supply signal supplied to a transmission antenna.

FIG. 40 illustrates a signal transmitted to the transmission antenna device 43 from the transmission unit 21 via the power supply line 56 with a time axis and a voltage level plotted as abscissa and ordinate, respectively.

In this embodiment, a DC bias is applied to the power supply line 56 so that the core line has a voltage Vd with respect to the shield line. That is, a DC bias current is applied via the opposed antenna elements 45, the suppressive resistors 46 and the grounding conductor 44.

In this state, impulses S are applied between the antenna elements 45 and 45 in a predefined cycle $T_0$ via the power supply line 56, whereby the electromagnetic radiation is radiated from the antenna board 41 integrated with the shield case 48.

By the application of the DC bias, the DC bias voltage is controlled to be driven in an impulsive manner on the side of the transmission unit 21 to apply impulses to the transmission antenna device 43. Therefore, the circuit structure can be simplified.

Figure 41:
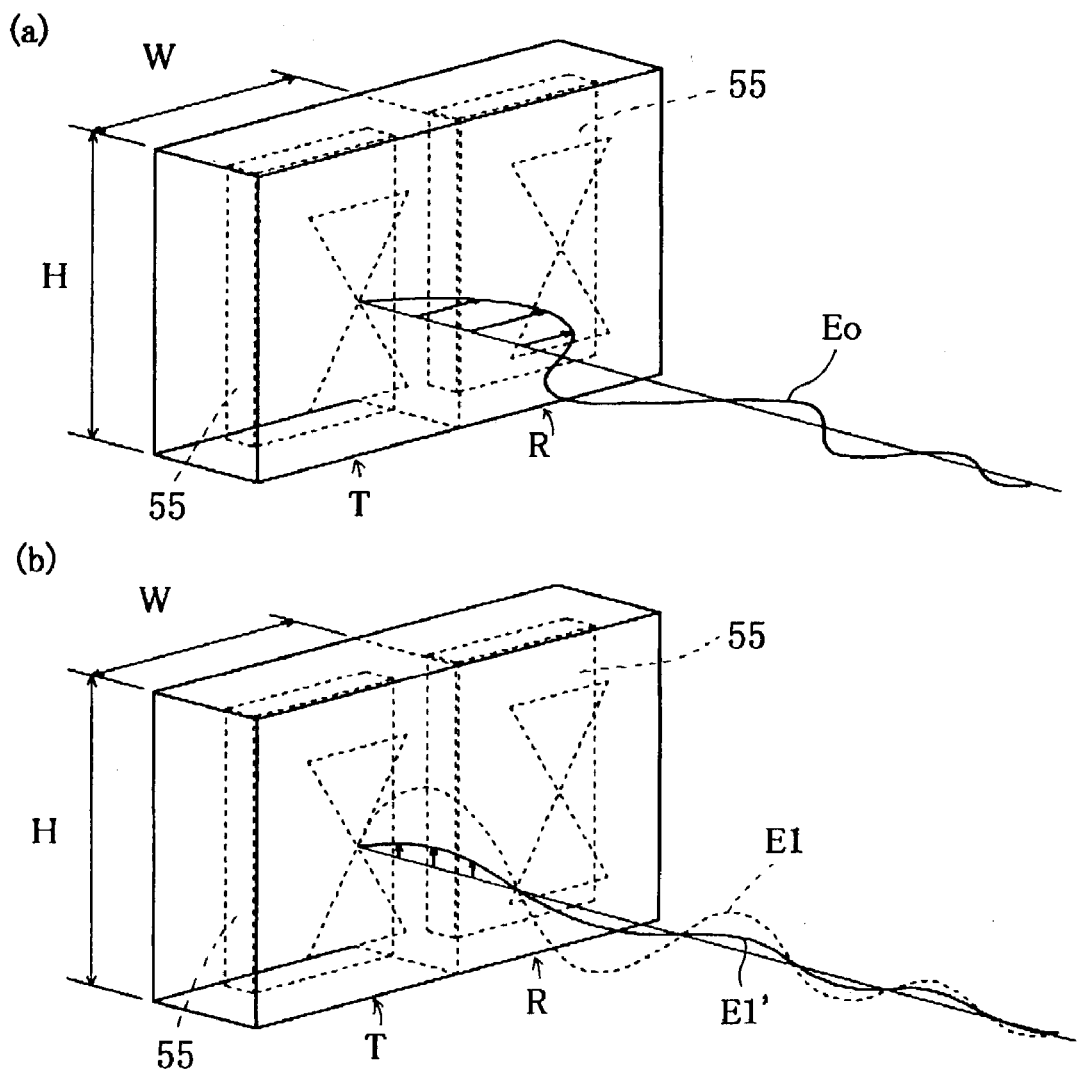
FIG. 41 is an explanatory diagram illustrating how an electromagnetic radiation absorber absorbs the electromagnetic radiation having a specific polarized wave component.

FIG. 41 schematically illustrates a state where a specific electromagnetic component radiated from the transmission antenna T is absorbed by the electromagnetic radiation absorber 55.

Ordinary electromagnetic radiation absorbers produced by pasting an electrically conductive radio wave reflective material on a foamed material are employed as the electromagnetic radiation absorbers 55, which achieve effective attenuation by utilizing attenuation at reflection on the reflective material. The electromagnetic radiation absorbers 55 have maximum attenuation characteristics for the electromagnetic radiation in a specific polarization plane according to the orientation of the mounted electromagnetic radiation absorbers 55.

In this embodiment, the electromagnetic radiation absorber 55 is provided so that a polarized wave component $E_0$ having an electric field along the width W of the shield case 48 as shown in FIG. 41(*a*) is not absorbed but a polarized wave component E1 having an electric field along the length H of the shield case 48 as indicated by a broken line in FIG. 41(*b*) is attenuated to a polarized wave component E1' as indicated by a solid line in FIG. 41(*b*). That is, electromagnetic radiation containing the polarized wave component E1 along the length H of the shield case 48 contains an unwanted frequency component having frequencies difference from the target frequency $f_0$. By absorbing the unwanted frequency component for removal thereof, unwanted radiation can further be reduced.

Figure 42:
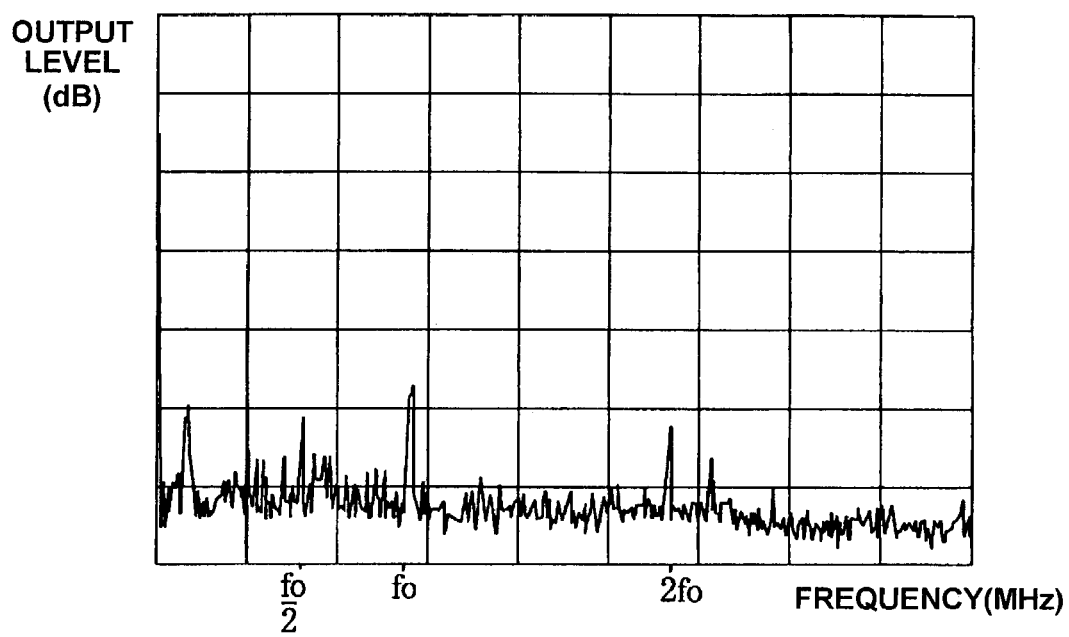
FIG. 42 is a frequency spectrum diagram of the electromagnetic radiation radiated from the antenna unit.

FIG. 42 illustrates the results of measurement of electromagnetic radiation radiated from the transmission antenna T and captured by the reception antenna R in the electromagnetic radar antenna AT according to this embodiment with the use of a frequency spectrum analyzer, and indicates that a component at the target frequency $f_0$ is dominant with the other unwanted frequency component effectively attenuated. Since frequency components radiated at higher levels are discrete, a frequency component, for example, at a frequency of $f_0/2$ or $2f_0$ different from the target frequency $f_0$ may be received and subjected to a necessary measuring process by properly selecting a reception band width on the reception unit side.

Figure 43:
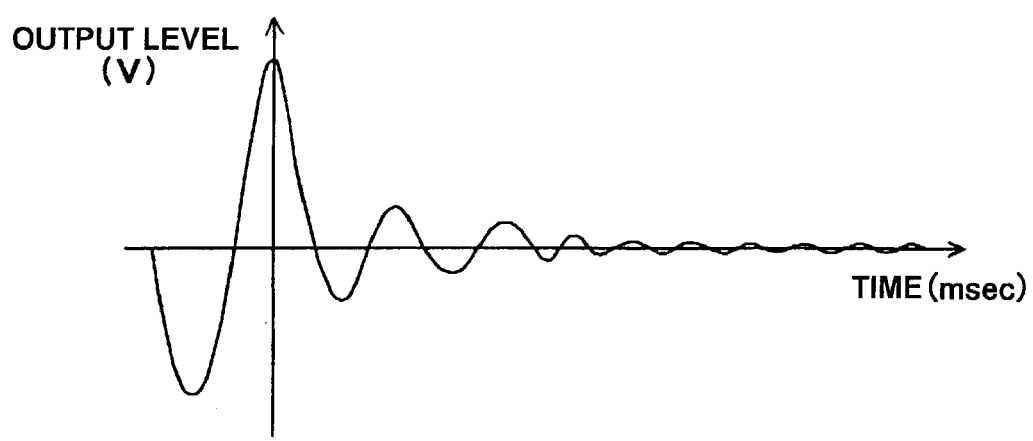
FIG. 43 is an explanatory diagram illustrating the reception waveform of an echo (analytic signal waveform)

FIG. 43 is a waveform diagram obtained by amplifying an echo of the electromagnetic radiation radiated from the electromagnetic radar antenna AT according to this embodiment and received on the antenna board 41 by the reception unit 22. As shown, the unwanted frequency component is drastically reduced, so that an attenuation waveform of a generally sinusoidal pattern based on the target frequency $f_0$ and free from a distortion can be provided and even a minute amplitude is accurately demodulated.

Figure 44:
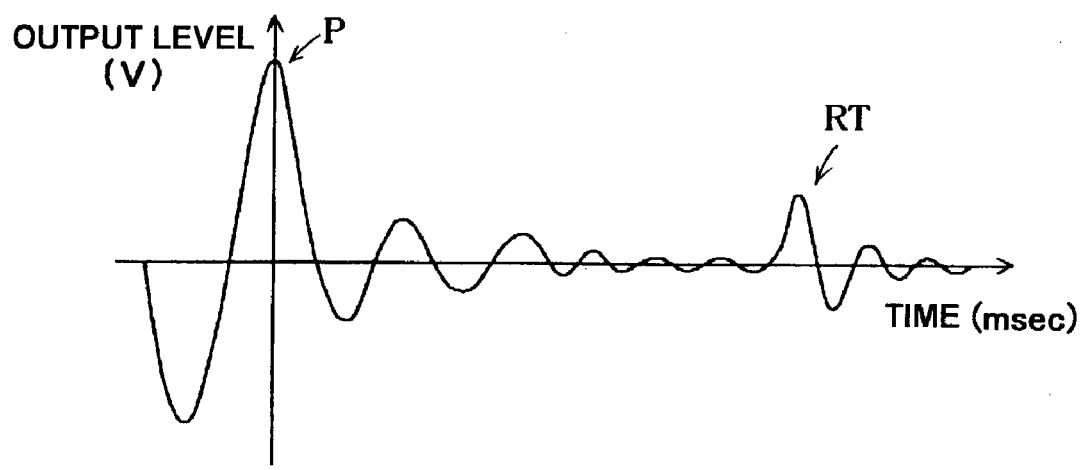
FIG. 44 is a diagram of the reception waveform of the echo including an echo reflected on an object.

FIG. 44 illustrates a reception waveform of an echo of the electromagnetic radiation radiated from the electromagnetic radar antenna AT according to this embodiment and reflected on an object. As shown, the reception signal is free from an unwanted frequency component superposed thereon and excellent in S/N ratio, so that the base point, end point and cycle variation of the echo RT can clearly be detected. Further, a peak point P (the first peak point, the second peak point or the like) of the reception waveform can easily be detected, making it possible to accurately perform calibration and measurement.

Calibration of Reception Circuit of Prober and Calibration for Specific Dielectric Constant When a probing operation is performed with the use of the aforesaid prober 1, the circuit constant of the high frequency circuit is varied due to an ambient temperature, a humidity and other conditions to influence the cycle period of the reception signal waveform. Therefore, the calibration of the prober 1 for the specific dielectric constant should first be performed under the probing conditions. To this end, an explanation will next be given to how to calibrate the prober 1 for the specific dielectric constant.

Figure 14:
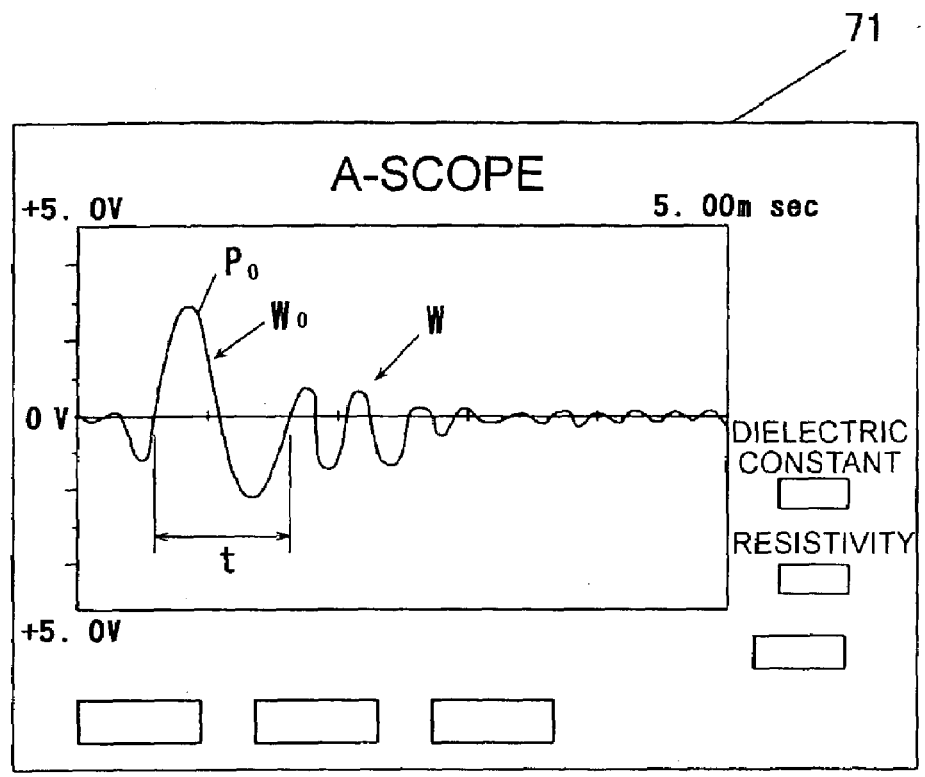
FIG. 14 is a diagram of a screen image displayed on a display device of the prober when calibration for the specific dielectric constant is performed.

First, electromagnetic radiation is radiated from the transmission antenna T in the air and received by the reception antenna R, and an analytic signal generated by the signal processing section 5 is displayed in the A-scope mode on the display device 71 as shown in FIG. 14.

The setting means 5c (signal cycle adjuster) is adjusted so that the cycle period of a surface echo $W_0$ in the analytic signal is matched with a reference period t predetermined for a reference specific dielectric constant. Thus, the cycle period of the analytic signal for the reference specific dielectric constant is correlated with the time axis to complete the calibration for the specific dielectric constant.

Where a screen image is to be displayed in the A-scope mode of the prober 1 so that the time axis has a maximum time span of 5 msec and a time point of 5 msec corresponds to a maximum display depth of 1.5 m for a specific dielectric constant $\in_r$ of 12, for example, an echo from a reference dielectric material having a reference specific dielectric constant ($\in_r$=12) and a calibration distance (50 cm) is monitored, and a reception waveform ranging from the starting point is adjusted so that a depth from which the echo is received corresponds to 50 cm in the A-scope mode. At this time, the cycle period of the surface echo $W_0$ is determined as a calibration value (e.g., 0.75 msec). Then, the cycle period of a surface echo obtained when the electromagnetic radiation is radiated in the air is adjusted to a calibration value of 0.75 msec, whereby the calibration can be achieved so that the reference dielectric constant to be employed for the A-scope mode and processes in the prober 1 is adjusted to 12.

After the calibration for the specific dielectric constant, the display adjusting section 74 is adjusted so that the first amplitude peak point $P_0$ of the surface echo $W_0$ in the analytic signal W is matched with the starting point (left end) of the time axis. Thus, the starting point of the analytic signal for the probing analysis is clearly defined by generally matching the starting point of the analytic signal W with the electromagnetic radiation radiated from the transmission antenna T.

The calibration of the prober 1 for the specific dielectric constant is achieved through the aforesaid calibration and adjustment processes, so that the prober 1 is ready for the probing.

After the calibration for the specific dielectric constant is thus performed, an analytic signal is generated by frequency-converting the reception signal received by the reception antenna R according to the setting of the setting means 5c by the cycle adjusting section 5b, and a probing analysis process is performed with the use of analytic data obtained by performing the computations on the generated analytic signal by the computation means 6a.

In other words, where the echo is received from the medium having a specific dielectric constant $\in_r$ of 12, the cycle period of the analytic signal and the time axis displayed on the display device 71 are correlated with each other, so that a time base for the signal processing in the signal processing section 6 is clearly defined.

Since the calibration for the specific dielectric constant according to the present invention is very easy, the probing operation can be performed further accurately by regularly performing the calibration after the probing operation is performed for a predetermined period.

In the reception unit 22, the cycle period of the analytic signal with respect to the reference dielectric constant is employed as a reference, and an analytic signal having a cycle period generally proportional to the square root of the specific dielectric constant is generated for a reception signal obtained from a medium having a different specific dielectric constant, as described above.

In the computation means 6a, a process necessary for displaying the results of the probing is performed on the analytic signal according to measurement condition data stored in the storage means 6b to generate analytic data and output the analytic data to the display section 7.

Thus, various information necessary for the judgment of the probing results can be displayed on the basis of the analytic data, so that a buried object can easily be estimated.

In this embodiment, the reception unit 22 generates an analytic signal having a cycle period generally proportional to the square root of the specific dielectric constant. Alternatively, an analytic signal having a reduced frequency may be generated by the reception unit 22, and analytic data having a cycle period generally proportional to the square root of the specific dielectric constant may be generated by the computation means 6a.

According to the aforesaid calibration method for the specific dielectric constant, the calibration can easily be performed simply by matching the cycle period of the analytic signal obtained by the in-air radiation with the reference period, thereby ensuring accurate probing. Since the correlation between the specific dielectric constant and the depth is clearly defined, the probing state can easily be estimated on the basis of a sectional image, thereby improving the operability for the probing. Further, where the antenna unit AT is replaced with an antenna unit having a different radiation frequency for the probing, the calibration for the specific dielectric constant can immediately be performed on the basis of a reference period preliminarily provided by a maker.

Figure 15:
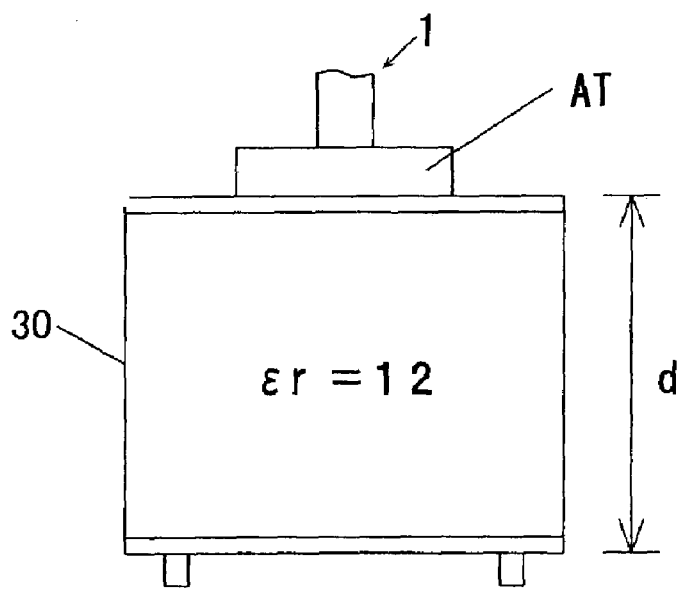
FIG. 15 is a front view illustrating a reference dielectric (dried granite soil)

With reference to FIG. 15, an explanation will next be given to how to derive the reference period which serves as a base for the aforesaid calibration for the specific dielectric constant. It is assumed that the time t required for the electromagnetic radiation to travel the calibration distance in a medium having the reference specific dielectric constant (calibration distance back-and-forth propagation time) is preliminarily calculated.

As shown in FIG. 15, electromagnetic radiation is radiated from the antenna AT of the prober 1 in contact with a reference dielectric material 30 of "dried granite soil" having a specific dielectric constant $\in_r$ of 12 and a calibration distance d of 50 cm, and a reception signal is displayed as an analytic signal on the display device 71.

Figure 16:
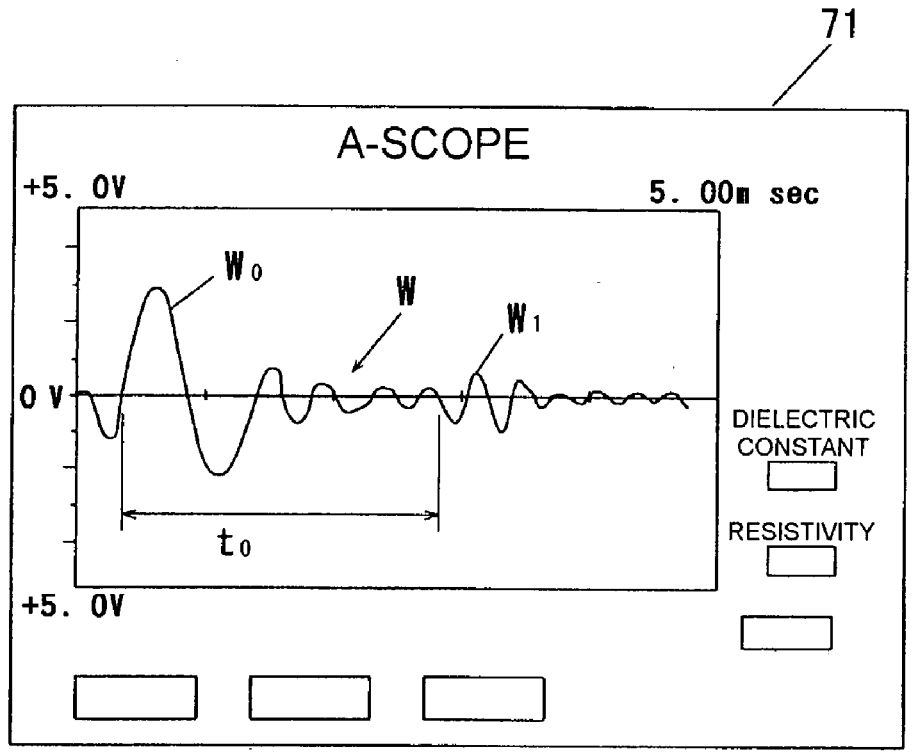
FIG. 16 is a diagram of a display screen image for explaining a process for matching a calibration distance on the basis of an analytic signal for the reference dielectric.

FIG. 16 illustrates the analytic signal W, which contains a surface echo $W_0$ and an echo $W_1$ at the calibration distance d (50 cm).

The setting means 5c of the cycle adjusting section 5b is adjusted so that a period $t_0$ between the surface echo $W_0$ and the echo W1 is matched with the calibration distance propagation time t. Thus, the specific dielectric constant calibration based on a specific dielectric constant $\in_r$ of 12, i.e., the calibration for a correlation between the cycle period of the analytic signal W and the time axis, is completed.

Figure 17:
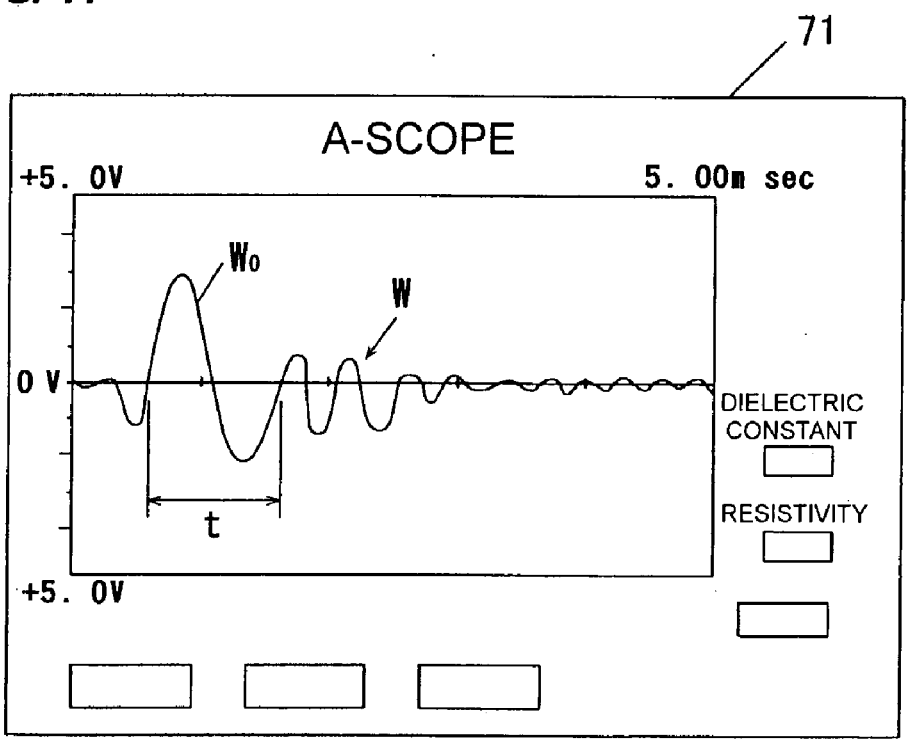
FIG. 17 is a diagram of a display screen image for explaining a process for matching the cycle period of a surface echo of the analytic signal obtained by the in-air radiation with a reference period.

With the calibration for the specific dielectric constant thus completed, the in-air radiation is carried out, and the cycle period t of the surface echo in the analytic signal is read from the time axis as shown in FIG. 17 for determination of the reference period t.

Where the starting point of the echo W1 is vague in FIG. 16, the starting point can easily be determined by performing a surface wave processing operation (in a surface wave processing mode of the prober 1) in the signal processing section 6 for extracting a differential signal component from analytic signals W.

Figure 18:
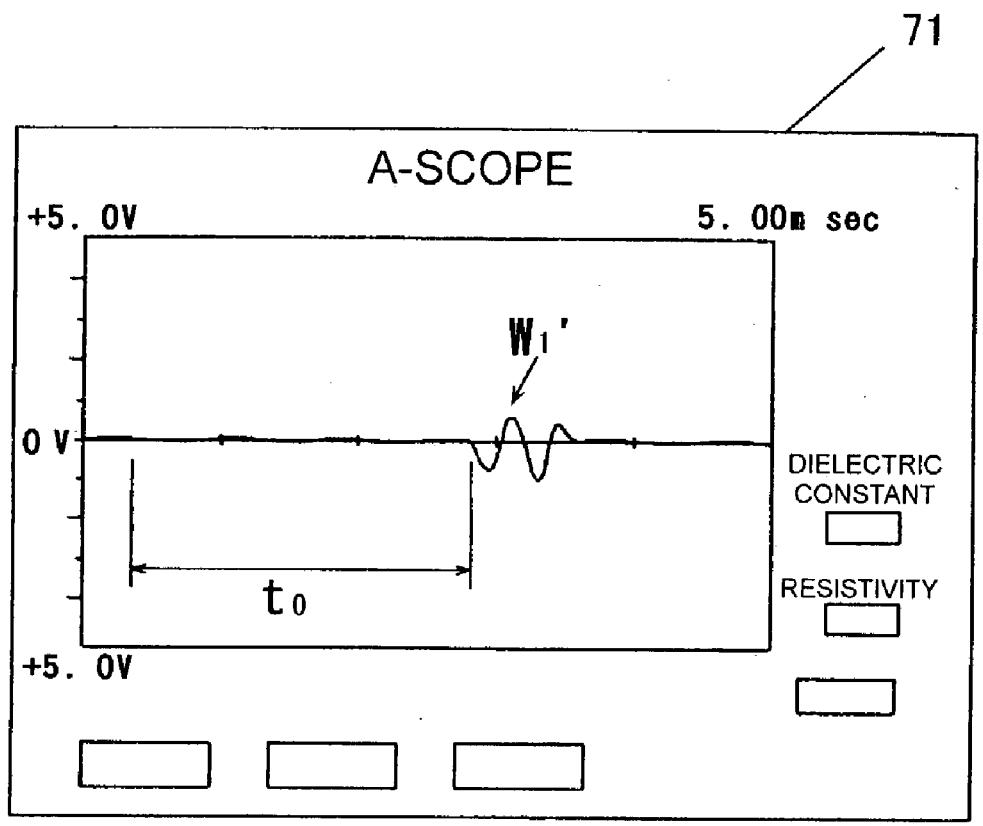
FIG. 18 is a diagram of a display screen image for explaining a process for the matching of the calibration distance by surface wave processing.

That is, the differential signal component obtained through the surface wave processing operation is displayed as an analytic signal W' as shown in FIG. 18, and a metal plate or the like is moved toward and away from a position at the calibration distance d of the reference dielectric material 30 (a lower surface of the reference dielectric material 30). Since an echo W1' is displayed as a variable factor, the starting point can easily be determined by observing the analytic signal W' obtained at this time. Therefore, the period between the starting point of the surface echo $W_0$ and the starting point of the echo W1' is adjusted to $t_0$. Thus, the calibration can easily be performed.

As described above, the reference period as the base for the calibration for the specific dielectric constant can easily be derived with the use of the less expensive reference dielectric material 30 such as "dried granite soil".

It is merely necessary to prepare the reference dielectric material 30 on the side of the maker of the prober 1 but not on a user side. Therefore, the calibration can assuredly be performed on the user side simply by expressly providing the reference period in a manual or the like.

Next, an explanation will be given to how to control the specific dielectric constant of the reference dielectric material 30 of the "dried granite soil".

Figure 19:
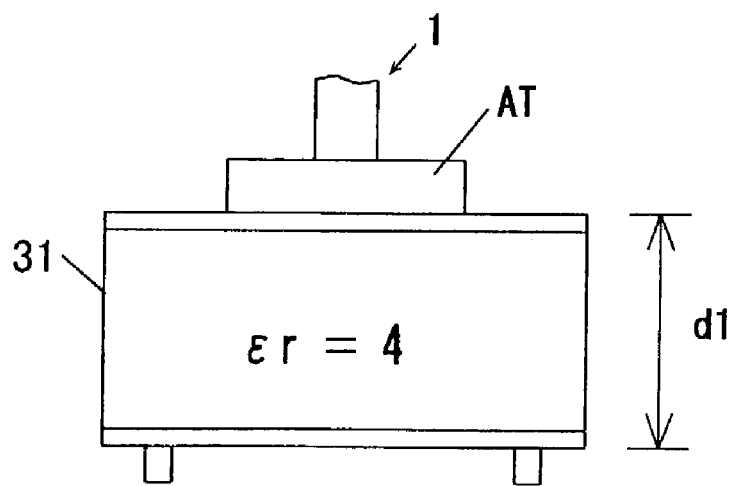
FIG. 19 is a front view illustrating a reference dielectric (epoxy resin)

As shown in FIG. 19, electromagnetic radiation is radiated from the antenna AT of the prober 1 in contact with a reference dielectric material 31 of an epoxy resin having a specific dielectric constant $\in_r$ of 4.0 and a calibration distance d1 of 20 cm, and a reception signal is displayed as an analytic signal on the display device 71.

Figure 20:
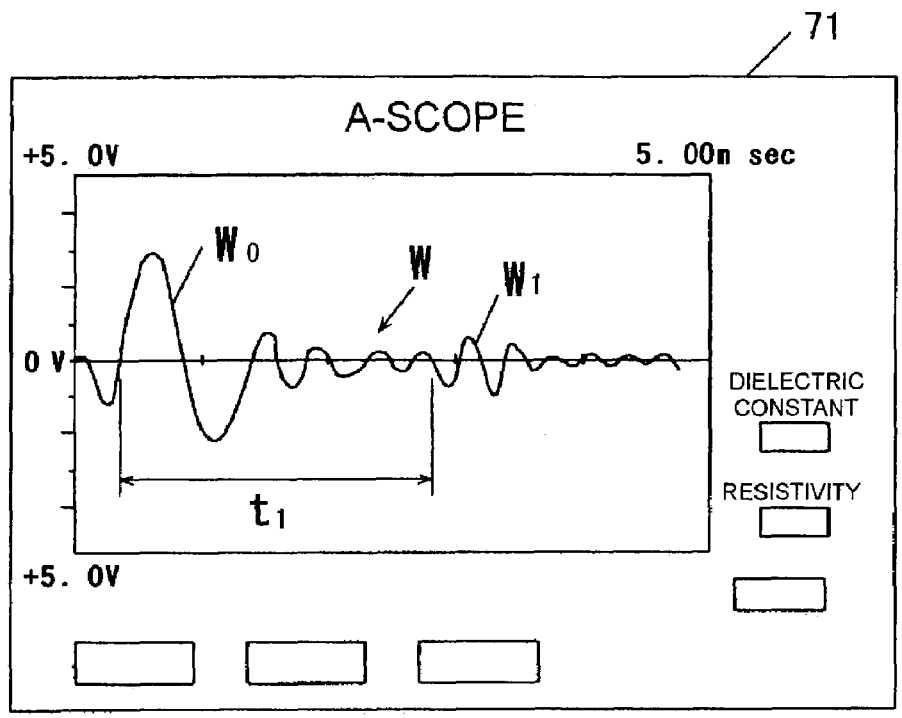
FIG. 20 is a diagram of a display screen image for explaining a process for the matching of the calibration distance on the basis of the analytic signal for the reference dielectric.

FIG. 20 illustrates the analytic signal W, which contains a surface echo $W_0$ and an echo W1 at the calibration distance (50 cm).

The setting means 5c of the cycle adjusting section 5b is adjusted so that a period $t_0$ between the surface echo $W_0$ and the echo W1 is matched with the calibration distance propagation time t. Thus, the specific dielectric constant calibration based on a specific dielectric constant $\in_r$ of 4.0, i.e., the calibration for a correlation between the cycle period of the analytic signal W and the time axis, is achieved.

With the calibration thus achieved on the basis of a specific dielectric constant $\in_r$ of 4.0, electromagnetic radiation is radiated from the antenna AT of the prober 1 in contact with the reference dielectric material 30 of the "dried granite soil" having a specific dielectric constant $\in_r$ of 12 and a calibration distance d of 50 cm as shown in FIG. 15, and a reception signal is displayed as an analytic signal on the display device 71.

The analytic signal W contains a surface echo $W_0$ and an echo W1 at the calibration distance (50 cm).

A period $t_0$ between the surface echo $W_0$ and the echo W1 is read from the time axis, and a difference between the period $t_0$ and the calibration distance propagation time t for a specific dielectric constant $\in_r$ of 12 is determined. If the difference is within a predefined tolerance, it is judged that the specific dielectric constant of the reference dielectric material 30 is maintained.

If the difference exceeds a predefined value, the difference is adjusted so as to fall within the tolerance by drying the granite soil of the reference dielectric material 30.

Where the period between the surface echo $W_0$ and the echo W1 contained in the analytic signal is read from the time axis, the display adjusting section 74 is adjusted to move the analytic signal to a position at which the period can easily be read. Further, the processes in the cycle adjusting section 5b and the setting means 5c may be performed on a digital basis.

Figure 21:
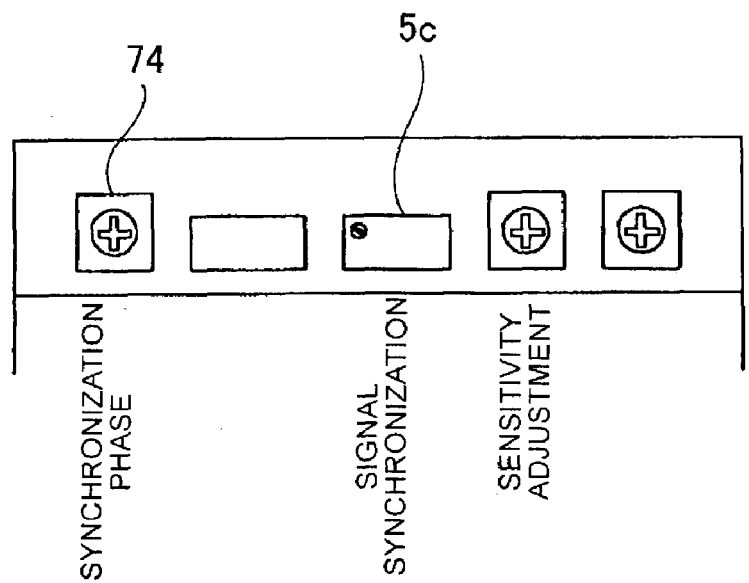
FIG. 21 is a representation of a central processor for performing calibration.
Figure 22:
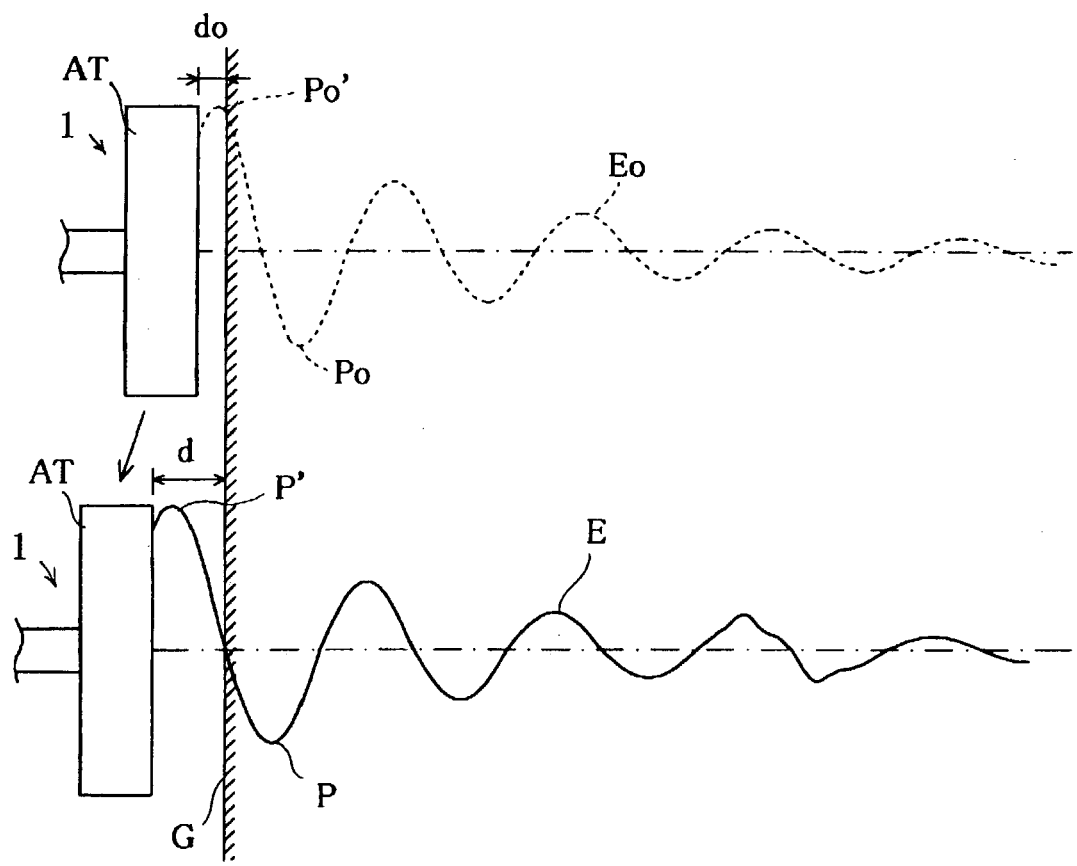
FIG. 22 is a waveform diagram of analytic signal waveforms observed before and after a distance variation occurs.
Figure 23:
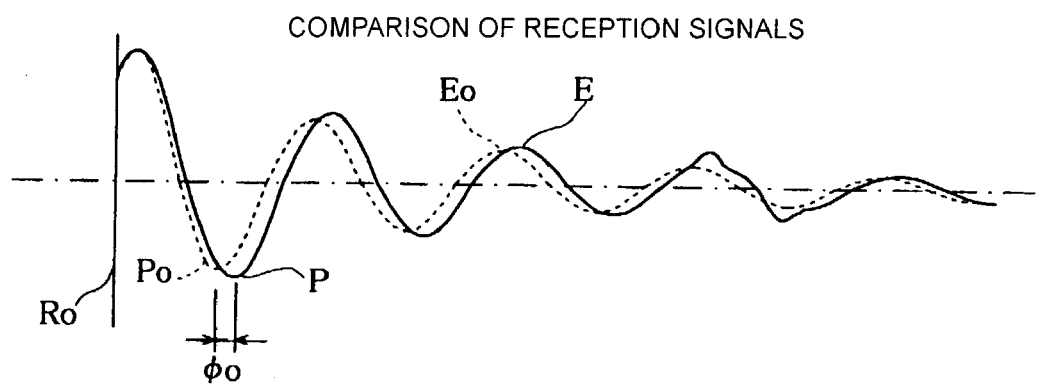
FIG. 23 is a waveform diagram obtained by superposing the waveforms shown in FIG. 22 with their initial reception points coinciding with each other.
Figure 24:
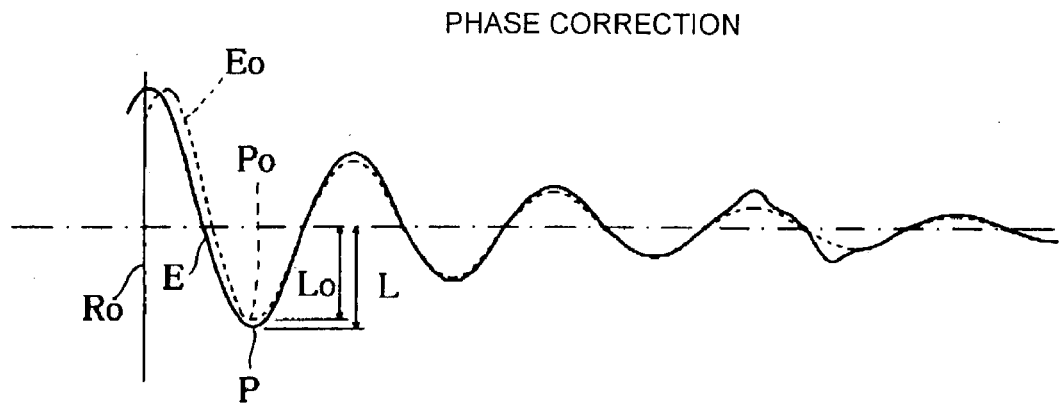
FIG. 24 is a waveform diagram illustrating a state observed when the waveforms shown in FIG. 23 are subjected to a phase correction.
Figure 25:
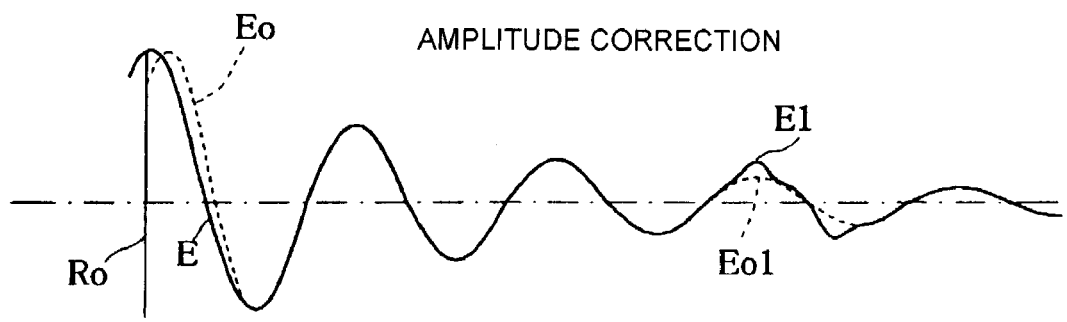
FIG. 25 is a waveform diagram illustrating a state observed when the waveforms shown in FIG. 24 are subjected to an amplitude correction.
Figure 26:
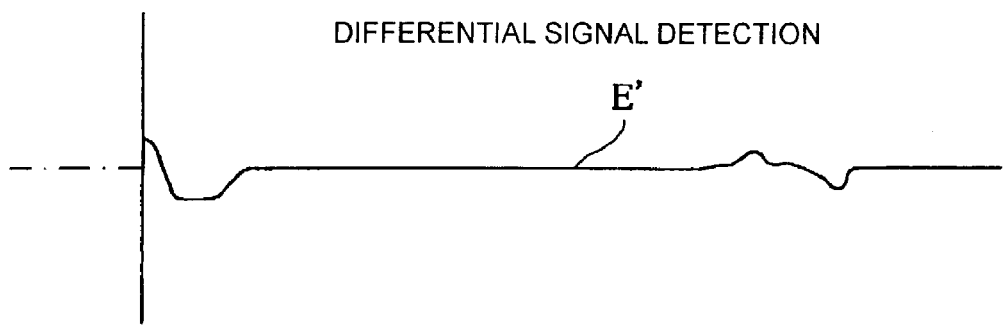
FIG. 26 is a waveform diagram illustrating a differential signal component of the waveforms shown in FIG. 25.
Figure 27:
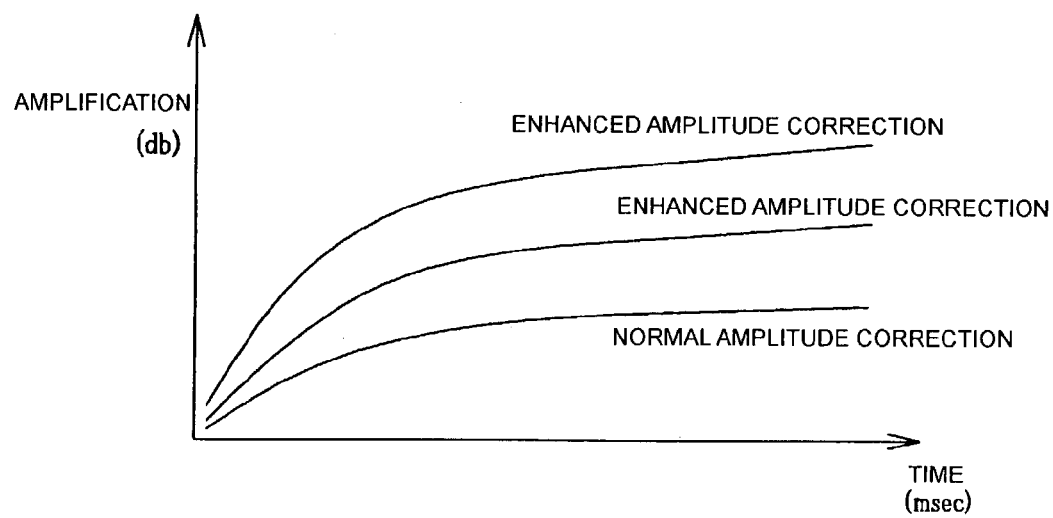
FIG. 27 is a graph illustrating amplitude correction data for the amplitude correction.
Figure 28:
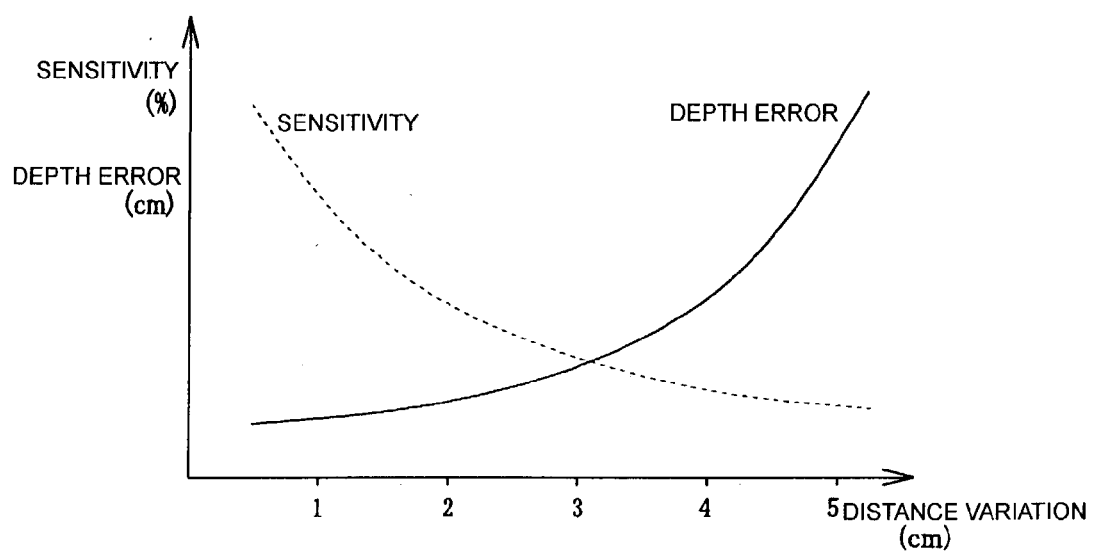
FIG. 28 is a graph illustrating a depth error and reduction in sensitivity occurring due to the distance variation.

The setting means 5c and the display adjusting section 74 which perform the calibration for the specific dielectric constant and the like can be calibrated by means of the semi-fixed resistor and the like provided in the central processing unit 7 as shown in FIG. 21, and the semi-fixed resistor can easily be adjusted with the use of a tool such as a screwdriver. The setting means 5c is constituted by a signal cycle adjuster as shown in FIG. 21, and the display adjusting section 75 is constituted by a synchronization phase adjuster as shown in FIG. 21.

Operation of Prober and Reception Signal Processing Operation

Next, a reception signal processing operation to be performed in the prober 1 will be described with reference to waveform diagrams in FIGS. 22 to 26, a block diagram in FIG. 5 and a flow chart in FIG. 32.

Figure 33:
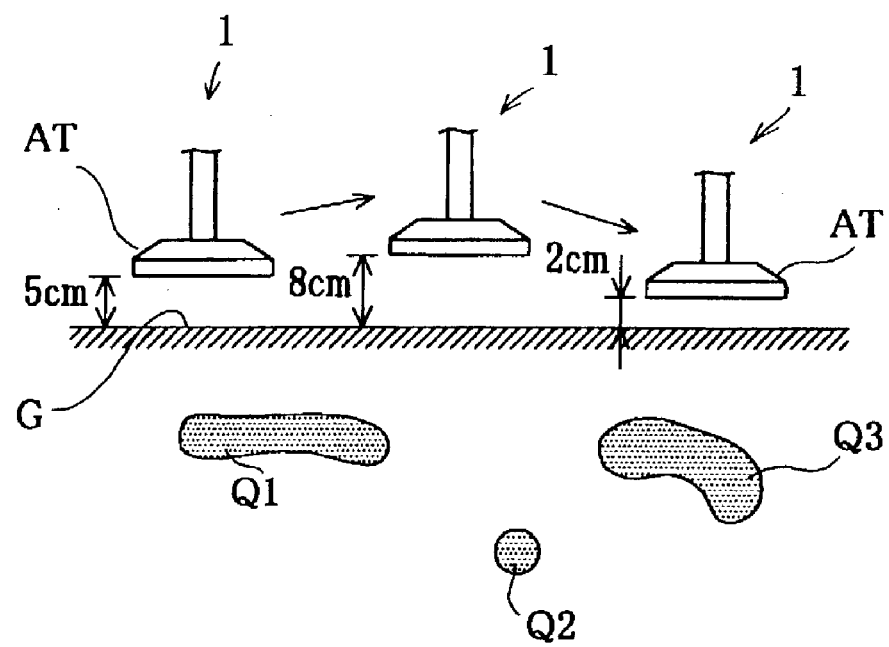
FIG. 33 is an explanatory diagram illustrating a scanning state with a distance variation.

As shown in FIG. 33, a distance between the antenna AT of the prober 1 and a ground surface G is sequentially changed, for example, to 5 cm→8 cm→2 cm during scanning for probing.

(1) The scanning of the prober 1 is started with the prober 1 spaced about 5 cm from the ground surface as shown in FIG. 33.

(2) Electromagnetic radiation is outputted from the transmission antenna T, and a reception signal captured by the reception antenna R and frequency-converted by the reception unit 22 is transmitted to the analog circuit section 5b of the signal processing unit 5. The analog circuit section 5b performs a preprocessing operation for a digital process, and then transmits the reception signal and the like to the central processing unit 6. The amplitude of the reception signal (which herein means the analytic signal) is isochronously sampled 512 times in a predefined time frame by the digital circuit section 6a of the central processing unit 6, and then digital data obtained by A/D-converting the sampled amplitude levels at a resolution of 12 bits is stored as an initial reception signal $E_0$ (see Step 100 in FIG. 32).

(3) In the digital circuit section 6a, the stored initial reception signal $E_0$ or reception signal E is set as a reference signal $E_0$. Where only the initial reception signal $E_0$ is stored at the start of the probing, the initial reception signal $E_0$ is set as the reference signal $E_0$ (see Step 102 in FIG. 32).

(4) An echo of electromagnetic radiation subsequently outputted is read as a reception signal E, and stored in the digital circuit section 6a (see Step 103 in FIG. 32).

(5) Where the amplitude of the reception signal E is lower than a predefined level, the digital circuit section 6a selects an enhanced amplitude correction process. Where the amplitude is not lower than the predefined level, a normal amplitude correction process is selected (see Steps 105 to 107 in FIG. 32).

(6) The digital circuit section 6a detects a phase difference $\phi_0$ between the second peak point $P_0$ of the reference signal $E_0$ and the second peak point P of the reception signal E, and adjusts the phase of the reception signal E so as to match the phases at the second peak points with each other (see Step 108 in FIG. 32).

(7) Then, the amplitude levels $L_0$ and L of the reference signal $E_0$ and the reception signal E at the second peak points are determined, and the normal amplitude correction process or the enhanced amplitude correction process selected in Step 106 or 107 is performed for amplitude correction of the reception signal E.

That is, a computation is performed according to (Reception signal E)×($L_0$/L)×(normal or enhanced amplitude correction) (Step 109 in FIG. 32).

(8) The digital circuit section 6a extracts a differential signal component of the reception signal E subjected to the amplitude correction with respect to the reference signal $E_0$, generates B-scope image data on the basis of the extracted differential signal component and displays the data on the display section 7 (see Steps 110, 111 in FIG. 32).

Where the probing process is performed after Step 112, the process returns to Step 102, and the same process sequence is repeated.

The setting of the reference signal $E_0$ in Step 102 may be changed according to the scanning speed (horizontal moving speed) of the prober 1. That is, where the scanning speed is low, an immediately preceding reception signal is set as the reference signal $E_0$. Where the scanning speed is high, a reception signal obtained a predefined number of times before may be set as the reference signal $E_0$ for the signal processing. Thus, a probing image can properly be displayed according to a scanning distance.

Figure 34:
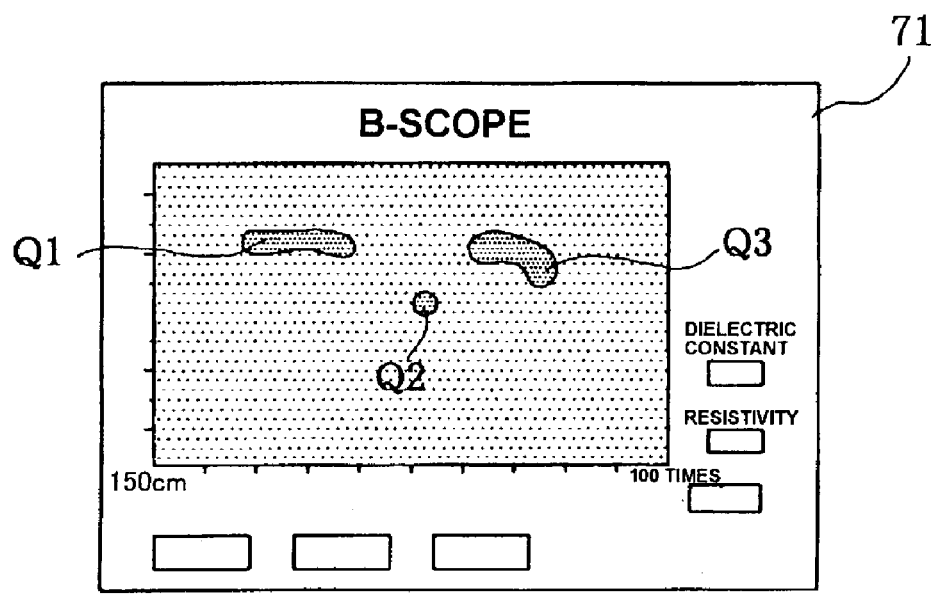
FIG. 34 illustrates an exemplary display image displayed for depth display by utilizing the differential signal component of the reception signal.

FIG. 34 illustrates an exemplary B-scope image obtained through the above probing process. This sectional image is free from complicated vertical image expansion due to the distance variations, so that only the outlines of buried objects Q1 to Q3 having different specific dielectric constants are distinctively displayed for easy analysis of the sectional image by visual inspection.

Figure 35:
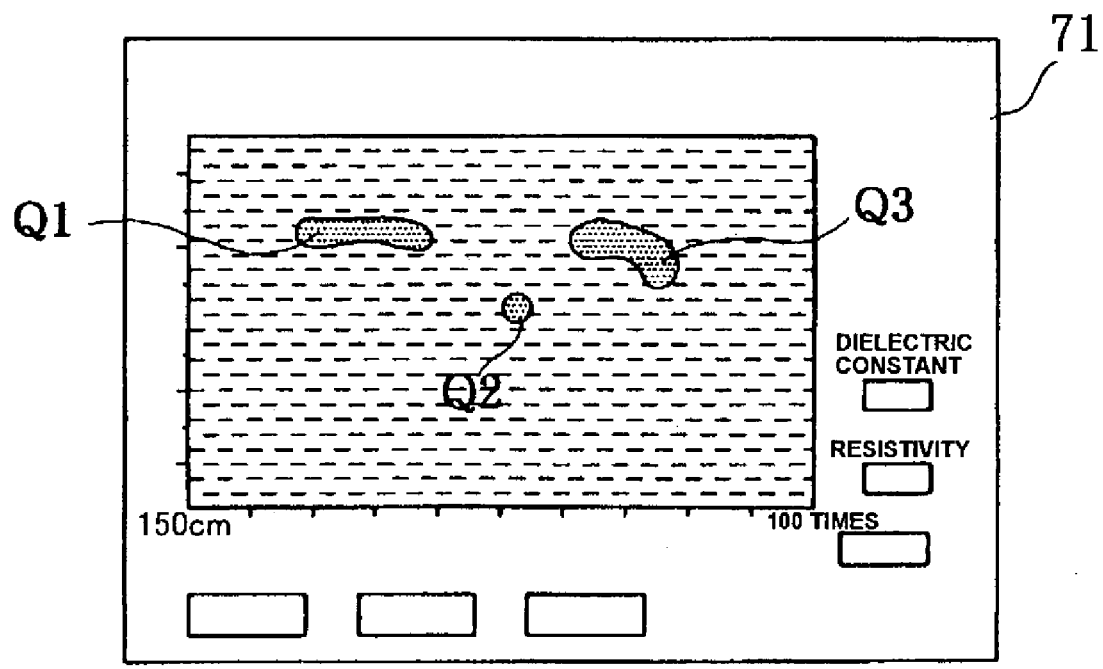
FIG. 35 illustrates an exemplary display image displayed for depth display by utilizing the reception signal (analytic signal) subjected to the amplitude correction.

On the other hand, FIG. 35 illustrates an exemplary image displayed with the reception signal E subjected to the amplitude correction without the differential signal extraction. In this ground sectional image, images of the buried objects are stably displayed without vertical image fluctuation due to the distance variations.

Measurement of In-medium Dielectric Constant

Next, how to measure an average specific dielectric constant at each depth level in a medium (in the ground) will be described as an application of the aforesaid electromagnetic prober. This specific dielectric constant measuring method may include the following steps (a) to (d). These steps can be implemented by the computation means 6a of the central processing unit 6, and the reception signal waveform (analytic signal waveform) out of the analytic data set stored in the storage means 6b is employed as basic data for the computation. In this embodiment, the electromagnetic prober 1 calibrated in the aforesaid manner performs the dielectric constant measurement by employing the analytic signal subjected to the phase and amplitude correction processes by the signal processing section 5.

(a) The step of detecting all peak points (positive peaks and negative peaks) of an electromagnetic radiation propagating waveform (analytic waveform).

(b) The step of sequentially measuring the widths of time-based ranges defined between positive peaks and zero-cross points and between negative peaks and zero-cross points, and determining a change in propagation cycle period, i.e., a change in dielectric constant, from the following expression:

Specific Dielectric Constant=(Measured Cycle Period/Reference Cycle Period)$^2$×Reference Calibration Specific Dielectric Constant wherein the specific dielectric constant is an average value in each of the ranges.

(c) The step of determining a dominant frequency for verification of a propagation cycle period in each of the ranges by performing a frequency spectrum analysis with signal components in the other ranges nullified and normalizing the analysis through calculation of sum of squares of maximum spectra (excluding DC components), and confirming a correlation of $\Delta f = \Delta \in_r$.

(d) The step of displaying the specific dielectric constants determined for the respective ranges as a dielectric constant distribution diagram prepared by color-bar-coding the specific dielectric constants along the depth in a geological structure.

More specifically, a $2^{10}$-discrete Fourier analysis provides 512 discrete cycles, so that a deviation from measurable cycles determined by the reference cycle period (10 discrete cycles with a reference cycle period of 0.5 msec in a maximum time frame of 5 msec and, therefore, a deviation from the discrete cycles is determined with respect to the specific dielectric constant) is determined to evaluate a linear correlation with respect to the dielectric constant for the confirmation of the correlation.

The dielectric constants (specific dielectric constants) thus determined are color-bar-coded to be displayed as a dielectric constant distribution diagram or a depth diagram along the depth in the geological structure, whereby even an unskilled person can easily judge in-ground conditions, dielectric constants and geological structures. Further, where a cursor is provided on a color bar for searching into the analyzed ranges, an average dielectric constant in any of the ranges, the total depth and the like can simultaneously be monitored, so that the electromagnetic probing can drastically be simplified and improved in function.

Figure 1:
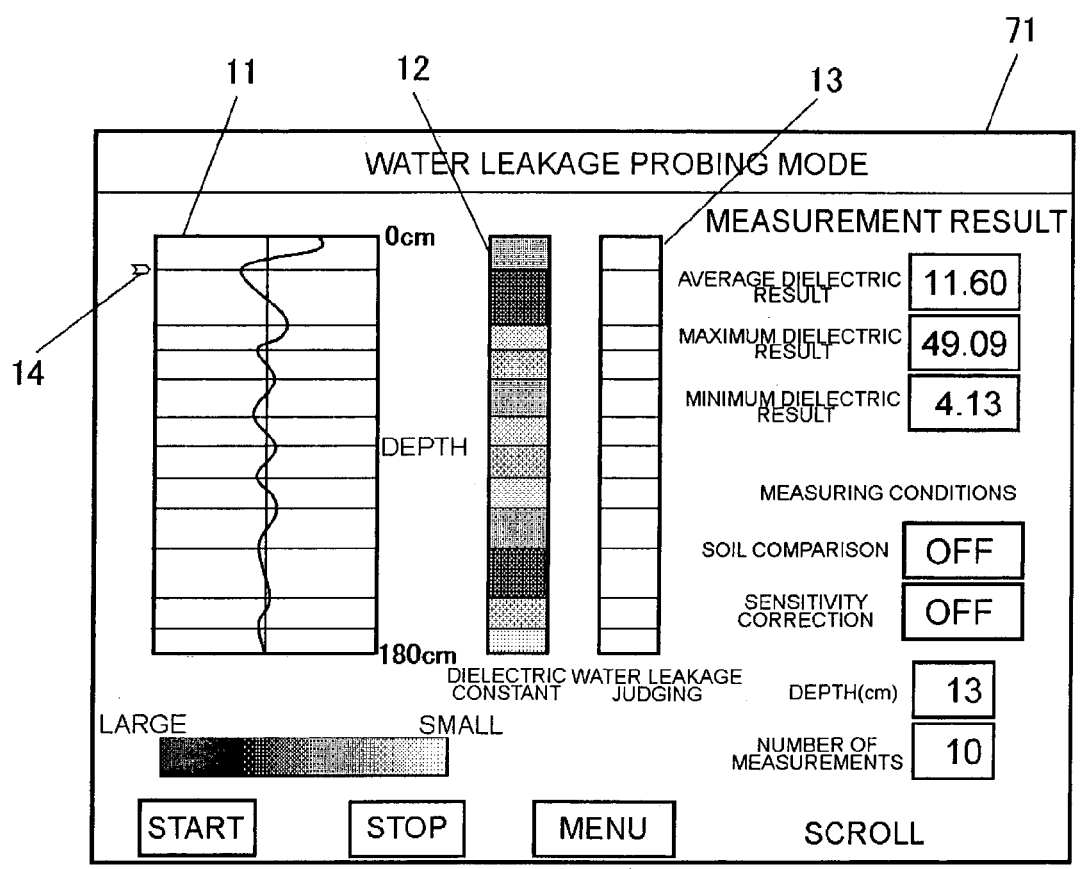
FIG. 1 is a diagram of a screen image displayed in a water leakage probing mode of an electromagnetic prober according to an embodiment of the present invention.
Figure 2:
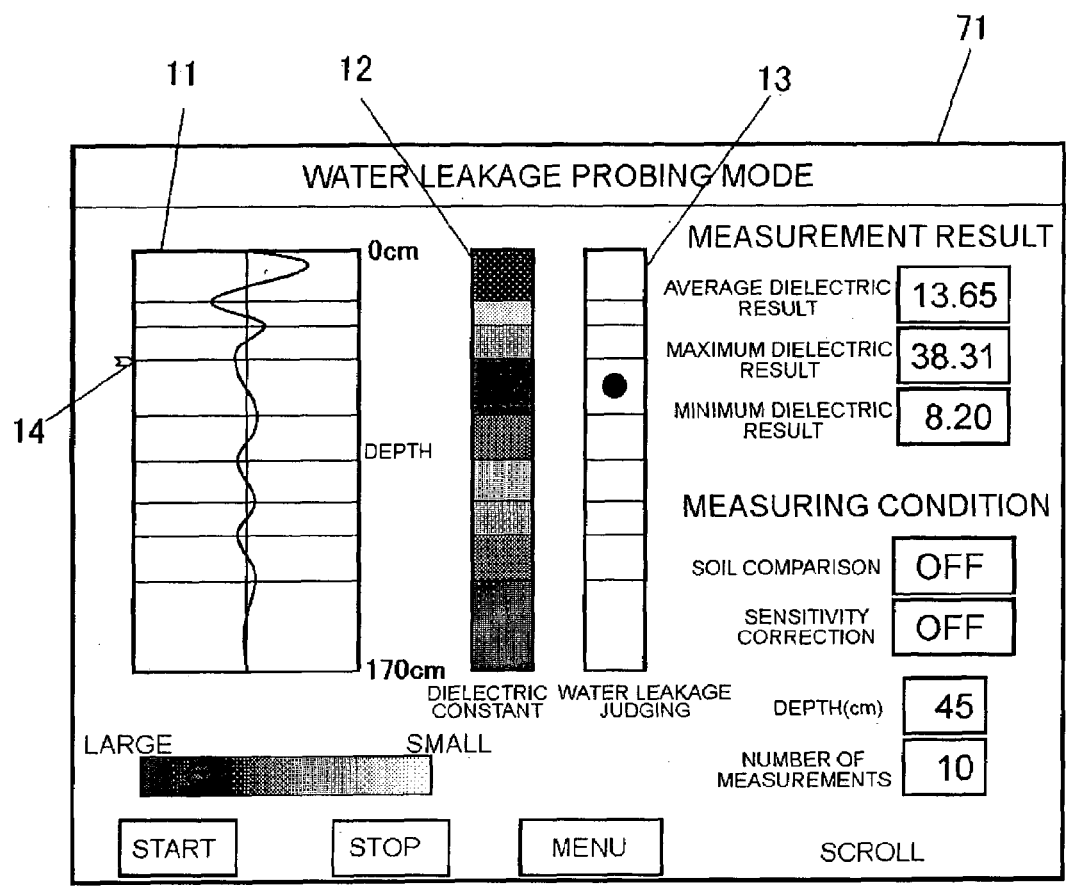
FIG. 2 is a diagram of a screen image displayed in the water leakage probing mode of the electromagnetic prober according to the embodiment of the present invention.

FIGS. 1 and 2 illustrate exemplary screens displayed in a display mode for in-ground water leakage probing on the basis of the results of the measurement and evaluation of the specific dielectric constants described above. In this example, an analytic signal displayed as an A-scope waveform is divided into a plurality of time-based ranges at all positive and negative amplitude peak points. The time-based ranges (regions) each have a time width Δt between a positive peak point and a negative peak point. Therefore, an average cycle period in each of the time-based ranges can be defined as twice the time width Δt.

Where the prober 1 is calibrated so that a reference cycle period is set at $f_0$ for a reference constituent specific dielectric constant of 12, the average dielectric constants $\in_r$ in depth ranges of the in-ground medium corresponding to the respective time-based ranges are calculated from the following expression based on the above expression.

$$\text{Specific dielectric constant } \in_r = (2\Delta t/f_0)^2 \times 12$$

Then, the specific dielectric constants thus measured are color-coded according to the values thereof, and a dielectric constant distribution diagram 12 is displayed adjacent the A-scope waveform diagram 11. The dielectric constant distribution diagram 12 has the same height as the A-scope waveform diagram 11, and is divided into a plurality of ranges along the depth, like the A-scope waveform diagram 11. Average dielectric constants in depth ranges of the medium corresponding to the respective time-based ranges are distinctively color-coded. A water leakage judgment diagram 13 is displayed adjacent the dielectric constant distribution diagram 12. A range having a specific dielectric constant (e.g., 40 to 50 or greater) is judged to have an increased dielectric constant due to water leakage from a sewage pipe, and a water leakage judgment mark is displayed in this range.

In these diagrams 11, 12 and 13, a cursor (horizontal line) is provided on any of separation points between the ranges and vertically operative with the use of an operation switch 72 to select a specific one of the ranges, and an average dielectric constant in the selected range is displayed in an upper right corner of the screen. With the dielectric constants in the respective ranges in the ground thus determined, a distance (depth) to a position specified by the cursor can be calculated, so that the calculation means 6a calculates the depth to the cursor position and displays the result of the calculation in a lower right corner of the screen. A total depth is displayed at a lower right corner of the A-scope waveform diagram 11. In FIGS. 1 and 2, the total depths are 180 cm and 170 cm, respectively. These are the results of the automatic frequency conversion performed by the reception unit 22.

The invention claimed is:

1. A method of measuring a dielectric constant in a medium for an electromagnetic prober for non-invasively probing into the medium by radiating electromagnetic radiation from a transmission antenna, receiving echoes by a reception antenna, generating an analytic signal on the basis of a detection signal and analyzing the analytic signal, the analytic signal having an alternating waveform which has an amplitude varying with time with its time axis corresponding to a depth in the medium, the method comprising: dividing the analytic signal into a plurality of time-based ranges; and performing a predefined computation on average cycle periods in the respective time-based ranges of the analytic signal for calculating average dielectric constants in depth ranges of the medium corresponding to the respective time-based ranges, wherein a reference cycle period is preliminarily determined for a reference dielectric constant, and the average dielectric constants in the depth ranges of the medium corresponding to the respective time-based ranges are calculated on the basis of the average cycle periods in the respective time-based ranges, the reference cycle period and the reference dielectric constant.

2. An in-medium dielectric constant measuring method for an electromagnetic prober as set forth in claim 1, wherein the average cycle periods in the respective time-based ranges of the analytic signal waveform and square roots of the average dielectric constants in the depth ranges of the medium corresponding to the respective time-based ranges have a linear relationship.

3. An in-medium dielectric constant measuring method for an electromagnetic prober as set forth in claim 1, wherein the electromagnetic radiation radiated from the transmission antenna has an occupied bandwidth narrowed by selectively removing a frequency component other than a component of a predefined target frequency, wherein the target frequency is not lower than 300 MHz and not higher than 2 GHz, and the occupied bandwidth is not smaller than 10 MHz and not greater than 100 MHz and is equivalent to not higher than 10% of the target frequency.

4. An in-medium dielectric constant measuring method for an electromagnetic prober as set forth in claim 1, wherein a signal processing circuit for generating the analytic signal is preliminarily adjusted so that the analytic signal waveform has the reference cycle period when a homogeneous medium having the reference dielectric constant is electromagnetically probed.

5. An in-medium dielectric constant measuring method for an electromagnetic prober as set forth in claim 1, further comprising the step of displaying the calculated average dielectric constants in the respective depth ranges as a dielectric constant distribution diagram prepared by color-coding the average dielectric constants along the depth in the medium on a display device.

6. An in-medium dielectric constant measuring method for an electromagnetic prober as set forth in claim 1, wherein positions of amplitude peaks of the analytic signal waveform are detected, and the analytic signal is divided at the peak positions.

7. An electromagnetic prober comprising: a transmission antenna for radiating electromagnetic radiation; a reception antenna for receiving echoes; a reception signal processing section for generating an analytic signal on the basis of a detection signal of the reception antenna; and an analytic processing section for performing a predefined analyzing process on the basis of the analytic signal, the analytic signal having an alternating waveform which has an amplitude varying with time with its time axis corresponding to a depth in a medium; wherein the analytic processing section comprises in-medium dielectric constant calculation means which divides the analytic signal into a plurality of time-based ranges and performs a predefined computation on average cycle periods in the respective time-based ranges of the analytic signal for calculating average dielectric constants in depth ranges of the medium corresponding to the respective time-based ranges, wherein the analytic processing section further comprises reference dielectric constant setting means for setting a reference dielectric constant, and reference cycle period setting means for setting a reference cycle period for the reference dielectric constant, wherein the in-medium dielectric constant calculation means calulates the average dielectric constants in the depth ranges of the medium corresponding to the respective time-based ranges on the basis of the average cycle periods in the respective time-based ranges and a correlation between the set reference cycle period and the set of reference dielectric constant.

8. An electromagnetic prober as set forth in claim 7, wherein the reception signal processing section establishes a linear relationship between the average cycle periods in the respective time-based ranges of the analytic signal waveform generated thereby and square roots of the average dielectric constants in the depth ranges of the medium corresponding to the respective time-based ranges.

9. An electromagnetic prober as set forth in claim 7, wherein the transmission antenna is provided with an electromagnetic radiation absorber for selectively removing a frequency component other than a component of a predefined target frequency so as to narrow an occupied bandwidth of the radiated electromagnetic radiation, wherein the target frequency is not lower than 300 MHz and not higher than 2 GHz, and the occupied bandwidth is not smaller than 10 MHz and not greater than 100 MHz and is equivalent to not higher than 10% of the target frequency.

10. An electromagnetic prober as set forth in claim 7, wherein the reception signal processing section is adjustable so that the analytic signal waveform has the reference cycle period when a homogeneous medium having the reference dielectric constant is electromagnetically probed.

11. An electromagnetic prober as set forth in claim 7, further comprising a display device for displaying the calculated average dielectric constants in the respective depth ranges as a dielectric constant distribution diagram prepared by color-coding the average dielectric constants along the depth in the medium.

12. An electromagnetic prober as set forth in claim 7, wherein the in-medium dielectric constant calculation means detects positions of amplitude peaks of the analytic signal waveform and divides the analytic signal at the peak positions.

13. A method of measuring an in-medium dielectric constant for an electromagnetic prober comprising a transmission antenna for radiating electromagnetic radiation and a reception antenna for receiving echoes of the radiated electromagnetic radiation, the method comprising the steps of:

detecting all peak positions of an electromagnetic radiation propagation waveform; and sequentially measuring widths of time-based ranges defined between the respective peak positions, each of the widths being a Measured Cycle Period; and determining a change in dielectric constant from the following expression:

Specific Dielectric Constant=(Measured Cycle Period/Reference Cycle Period)$^2$×Reference Calibration Specific Dielectric Constant.

14. An in-medium dielectric constant measuring method for an electromagnetic prober as set forth in claim 13, further comprising the step of determining a dominant frequency for verification of a propagation cycle period in each of the ranges by performing a frequency spectrum analysis with signal components in the other ranges nullified and normalizing the analysis through calculation of sum of squares of maximum spectra (excluding DC components), and confirming a correlation between the dominant frequency and the calculated specific dielectric constant.

15. An in-medium dielectric constant measuring method for an electromagnetic prober as set forth in claim 13, further comprising the step of displaying the specific dielectric constants determined for the respective ranges as a dielectric constant distribution diagram prepared by color-bar-coding the specific dielectric constants along the depth in a geological structure.

* * * * *